(12) United States Patent
Helweg

(10) Patent No.: US 8,195,553 B2
(45) Date of Patent: *Jun. 5, 2012

(54) PRICE CHARTING SYSTEM AND TECHNIQUE

(75) Inventor: Mark W. Helweg, Raleigh, NC (US)

(73) Assignee: MicroQuant, LLC, Wichita Falls, TX (US)

( * ) Notice: Subject to any disclaimer, the term of this patent is extended or adjusted under 35 U.S.C. 154(b) by 256 days.

This patent is subject to a terminal disclaimer.

(21) Appl. No.: 12/272,942

(22) Filed: Nov. 18, 2008

(65) Prior Publication Data

US 2009/0216684 A1 Aug. 27, 2009

Related U.S. Application Data

(63) Continuation of application No. 09/536,328, filed on Mar. 24, 2000, now Pat. No. 7,461,023.

(51) Int. Cl.
*G06Q 40/00* (2012.01)
(52) U.S. Cl. .................. 705/36 R; 705/35
(58) Field of Classification Search .............. 705/35, 705/36 R
See application file for complete search history.

(56) References Cited

U.S. PATENT DOCUMENTS

| 5,454,104 A | 9/1995 | Steidlmayer et al. |
| 6,012,042 A | 1/2000 | Black et al. |
| 6,014,643 A | 1/2000 | Minton |
| 6,061,662 A | 5/2000 | Makivic |
| 6,078,904 A | 6/2000 | Rebane |
| 6,321,212 B1 | 11/2001 | Lange |
| 6,839,686 B1 | 1/2005 | Galant |
| 7,047,218 B1 | 5/2006 | Wallman |
| 7,461,023 B1 | 12/2008 | Helweg |
| 2003/0093347 A1 | 5/2003 | Gray |
| 2005/0160021 A1 | 7/2005 | Nesmith et al. |

OTHER PUBLICATIONS

"Reuters and John Bollinger's Acme Analytics Corp.Announce Content Agreement; Bollinger Stock Performance Charts to be Offered on Reuters Investor". PR Newswire, New York: Sep. 28, 1999. p. 1.
"Introducing IQ Chart, Professional-Quality Stock Analysis Software for the Internet Investor Business Editors" Business Wire. New York: Aug. 4, 1998. p. 1.
Santoli, Michael. "The striking price: About that chart below". Barron's. New York, N.Y.: Feb. 7, 2000. vol. 80, Iss. 6; p. MW10 (1 page).
Computer printout of http://www.bollingerbands.com/bbands.asp. Title, Bollinger Bands Tutorial #1.
J. Peter Steidlmayer, "Steidlmayer on Markets a New Approach to Trading". John Wiley & Sons, Inc., (May 24, 1989).

*Primary Examiner* — Lalita M Hamilton
(74) *Attorney, Agent, or Firm* — Scott M. Oldham, Esq.; Hahn Loeser + Parks LLP

(57) ABSTRACT

The invention is directed to a market price charting method for displaying both current and historical price activity in terms of valuation rather than absolute price. The invention allows users to quantify the degree in which a market is overbought or oversold. Results may be displayed electronically or on a hard copy for viewing or used in additional analysis of a market.

20 Claims, 52 Drawing Sheets

| 1 | 2 | 3 | 4 | 5 | 6 | 7 | 8 | 9 | 10 | 11 |
|---|---|---|---|---|---|---|---|---|---|---|
| Date | Open | High | Low | Close | Floating Axis | Volatility Unit | Value Open | Value High | Value Low | Value Close |
| 990831 | 46.437 | 46.500 | 44.250 | 45.000 | 47.894 | 0.455 | -3.202 | -3.063 | -8.009 | -6.360 |
| 990901 | 45.500 | 47.625 | 45.375 | 47.375 | 47.575 | 0.445 | -4.663 | 0.113 | -4.944 | -0.449 |
| 990902 | 46.750 | 47.250 | 46.375 | 47.000 | 46.950 | 0.445 | -0.449 | 0.674 | -1.292 | 0.113 |
| 990903 | 48.000 | 48.750 | 47.812 | 48.125 | 46.800 | 0.368 | 3.266 | 5.307 | 2.754 | 3.606 |
| 990907 | 48.500 | 48.812 | 47.312 | 47.312 | 47.006 | 0.325 | 4.597 | 5.557 | 0.941 | 0.941 |
| 990908 | 46.937 | 47.000 | 45.687 | 46.000 | 47.200 | 0.288 | -0.914 | -0.695 | -5.262 | -4.173 |
| 990909 | 45.562 | 46.750 | 45.500 | 46.500 | 47.125 | 0.243 | -6.444 | -1.545 | -6.700 | -2.576 |
| 990910 | 47.000 | 47.125 | 45.812 | 45.875 | 47.056 | 0.260 | -0.215 | 0.265 | -4.784 | -4.542 |
| 990913 | 45.937 | 46.375 | 45.062 | 45.125 | 46.544 | 0.268 | -2.267 | -0.630 | -5.537 | -5.302 |
| 990914 | 45.125 | 45.250 | 44.312 | 44.500 | 45.887 | 0.245 | -3.110 | -2.600 | -6.428 | -5.661 |
| 990915 | 44.750 | 45.250 | 43.937 | 44.500 | 45.537 | 0.245 | -3.212 | -1.172 | -6.530 | -4.233 |
| 990916 | 45.000 | 45.937 | 44.562 | 45.500 | 45.362 | 0.250 | -1.448 | 2.299 | -3.200 | 0.551 |
| 990917 | 45.437 | 45.750 | 44.937 | 45.625 | 45.137 | 0.230 | 1.303 | 2.663 | -0.870 | 2.120 |
| 990920 | 46.000 | 46.125 | 45.000 | 45.062 | 45.106 | 0.223 | 4.017 | 4.579 | -0.476 | -0.198 |
| 990921 | 44.875 | 45.625 | 44.125 | 44.500 | 45.125 | 0.245 | -1.019 | 2.041 | -4.080 | -2.550 |
| 990922 | 44.562 | 44.812 | 43.750 | 44.000 | 45.062 | 0.235 | -2.129 | -1.065 | -5.584 | -4.520 |
| 990923 | 44.000 | 44.250 | 42.250 | 42.437 | 44.662 | 0.260 | -2.548 | -1.586 | -9.279 | -8.559 |
| 990924 | 42.625 | 43.125 | 42.000 | 42.625 | 44.106 | 0.273 | -5.436 | -3.601 | -7.730 | -5.436 |
| 990927 | 43.125 | 43.875 | 42.750 | 43.625 | 43.656 | 0.273 | -1.950 | 0.803 | -3.326 | -0.115 |
| 990928 | 43.125 | 44.000 | 41.812 | 43.750 | 43.262 | 0.300 | -0.458 | 2.459 | -4.835 | 1.625 |
| 990929 | 43.625 | 44.875 | 43.250 | 43.500 | 43.219 | 0.323 | 1.260 | 5.136 | 0.097 | 0.872 |
| 990930 | 43.625 | 44.125 | 42.937 | 43.500 | 43.275 | 0.290 | 1.207 | 2.931 | -1.165 | 0.776 |

Figure 4

| 1 | 2 | 3 | 4 | 5 | 6 | 7 | 8 | 9 | 10 |
|---|---|---|---|---|---|---|---|---|---|
| Date | Open | High | Low | Close | Floating Axis | Relative Open | Relative High | Relative Low | Relative Close |
| 990831 | 46.437 | 46.500 | 44.250 | 45.000 | 47.894 | -1.457 | -1.394 | -3.644 | -2.894 |
| 990901 | 45.500 | 47.625 | 45.375 | 47.375 | 47.575 | -2.075 | 0.050 | -2.200 | -0.200 |
| 990902 | 46.750 | 47.250 | 46.375 | 47.000 | 46.950 | -0.200 | 0.300 | -0.575 | 0.050 |
| 990903 | 48.000 | 48.750 | 47.812 | 48.125 | 46.800 | 1.200 | 1.950 | 1.012 | 1.325 |
| 990907 | 48.500 | 48.812 | 47.312 | 47.312 | 47.006 | 1.494 | 1.806 | 0.306 | 0.306 |
| 990908 | 46.937 | 47.000 | 45.687 | 46.000 | 47.200 | -0.263 | -0.200 | -1.513 | -1.200 |
| 990909 | 45.562 | 46.750 | 45.500 | 46.500 | 47.125 | -1.563 | -0.375 | -1.625 | -0.625 |
| 990910 | 47.000 | 47.125 | 45.812 | 45.875 | 47.056 | -0.056 | 0.069 | -1.244 | -1.181 |
| 990913 | 45.937 | 46.375 | 45.062 | 45.125 | 46.544 | -0.607 | -0.169 | -1.482 | -1.419 |
| 990914 | 45.125 | 45.250 | 44.312 | 44.500 | 45.887 | -0.762 | -0.637 | -1.575 | -1.387 |
| 990915 | 44.750 | 45.250 | 43.937 | 44.500 | 45.537 | -0.787 | -0.287 | -1.600 | -1.037 |
| 990916 | 45.000 | 45.937 | 44.562 | 45.500 | 45.362 | -0.362 | 0.575 | -0.800 | 0.138 |
| 990917 | 45.437 | 45.750 | 44.937 | 45.625 | 45.137 | 0.300 | 0.613 | -0.200 | 0.488 |
| 990920 | 46.000 | 46.125 | 45.000 | 45.062 | 45.106 | 0.894 | 1.019 | -0.106 | -0.044 |
| 990921 | 44.875 | 45.625 | 44.125 | 44.500 | 45.125 | -0.250 | 0.500 | -1.000 | -0.625 |
| 990922 | 44.562 | 44.812 | 43.750 | 44.000 | 45.062 | -0.500 | -0.250 | -1.312 | -1.062 |
| 990923 | 44.000 | 44.250 | 42.250 | 42.437 | 44.662 | -0.662 | -0.412 | -2.412 | -2.225 |
| 990924 | 42.625 | 43.125 | 42.000 | 42.625 | 44.106 | -1.481 | -0.981 | -2.106 | -1.481 |
| 990927 | 43.125 | 43.875 | 42.750 | 43.625 | 43.656 | -0.531 | 0.219 | -0.906 | -0.031 |
| 990928 | 43.125 | 44.000 | 41.812 | 43.750 | 43.262 | -0.137 | 0.738 | -1.450 | 0.488 |
| 990929 | 43.625 | 44.875 | 43.250 | 43.500 | 43.219 | 0.406 | 1.656 | 0.031 | 0.281 |
| 990930 | 43.625 | 44.125 | 42.937 | 43.500 | 43.275 | 0.350 | 0.850 | -0.338 | 0.225 |

Figure 7

| 1 | 2 | 3 | 4 | 5 | 6 | 7 | 8 | 9 | 10 | 11 |
|---|---|---|---|---|---|---|---|---|---|---|
| | | | | | Floating | Volatility | Value | Value | Value | Value |
| Date | Open | High | Low | Close | Axis | Unit | Open | High | Low | Close |
| 990831 | 46.437 | 46.500 | 44.250 | 45.000 | 47.894 | 0.455 | -3.202 | -3.063 | -8.009 | -6.360 |
| 990901 | 45.500 | 47.625 | 45.375 | 47.375 | 47.575 | 0.445 | -4.663 | 0.113 | -4.944 | -0.449 |
| 990902 | 46.750 | 47.250 | 46.375 | 47.000 | 46.950 | 0.445 | -0.449 | 0.674 | -1.292 | 0.113 |
| 990903 | 48.000 | 48.750 | 47.812 | 48.125 | 46.800 | 0.368 | 3.266 | 5.307 | 2.754 | 3.606 |
| 990907 | 48.500 | 48.812 | 47.312 | 47.312 | 47.006 | 0.325 | 4.597 | 5.557 | 0.941 | 0.941 |
| 990908 | 46.937 | 47.000 | 45.687 | 46.000 | 47.200 | 0.288 | -0.914 | -0.695 | -5.262 | -4.173 |
| 990909 | 45.562 | 46.750 | 45.500 | 46.500 | 47.125 | 0.243 | -6.444 | -1.545 | -6.700 | -2.576 |
| 990910 | 47.000 | 47.125 | 45.812 | 45.875 | 47.056 | 0.260 | -0.215 | 0.265 | -4.784 | -4.542 |
| 990913 | 45.937 | 46.375 | 45.062 | 45.125 | 46.544 | 0.268 | -2.267 | -0.630 | -5.537 | -5.302 |
| 990914 | 45.125 | 45.250 | 44.312 | 44.500 | 45.887 | 0.245 | -3.110 | -2.600 | -6.428 | -5.661 |
| 990915 | 44.750 | 45.250 | 43.937 | 44.500 | 45.537 | 0.245 | -3.212 | -1.172 | -6.530 | -4.233 |
| 990916 | 45.000 | 45.937 | 44.562 | 45.500 | 45.362 | 0.250 | -1.448 | 2.299 | -3.200 | 0.551 |
| 990917 | 45.437 | 45.750 | 44.937 | 45.625 | 45.137 | 0.230 | 1.303 | 2.663 | -0.870 | 2.120 |
| 990920 | 46.000 | 46.125 | 45.000 | 45.062 | 45.106 | 0.223 | 4.017 | 4.579 | -0.476 | -0.198 |
| 990921 | 44.875 | 45.625 | 44.125 | 44.500 | 45.125 | 0.245 | -1.019 | 2.041 | -4.080 | -2.550 |
| 990922 | 44.562 | 44.812 | 43.750 | 44.000 | 45.062 | 0.235 | -2.129 | -1.065 | -5.584 | -4.520 |
| 990923 | 44.000 | 44.250 | 42.250 | 42.437 | 44.662 | 0.260 | -2.548 | -1.586 | -9.279 | -8.559 |
| 990924 | 42.625 | 43.125 | 42.000 | 42.625 | 44.106 | 0.273 | -5.436 | -3.601 | -7.730 | -5.436 |
| 990927 | 43.125 | 43.875 | 42.750 | 43.625 | 43.656 | 0.273 | -1.950 | 0.803 | -3.326 | -0.115 |
| 990928 | 43.125 | 44.000 | 41.812 | 43.750 | 43.262 | 0.300 | -0.458 | 2.459 | -4.835 | 1.625 |
| 990929 | 43.625 | 44.875 | 43.250 | 43.500 | 43.219 | 0.323 | 1.260 | 5.136 | 0.097 | 0.872 |
| 990930 | 43.625 | 44.125 | 42.937 | 43.500 | 43.275 | 0.290 | 1.207 | 2.931 | -1.165 | 0.776 |

Figure 21

|          | S     | ED    | CC    | CL    | GC    | LH    | US    | SP    | SF    | AXP   | GM    | HWP  |
|----------|-------|-------|-------|-------|-------|-------|-------|-------|-------|-------|-------|------|
| Over +12 | 0.1%  | 0.2%  | 0.1%  | 0.2%  | 0.2%  | 0.1%  | 0.1%  | 0.0%  | 0.3%  | 0.2%  | 0.2%  | 0.2  |
| Over +11 | 0.3%  | 0.4%  | 0.4%  | 0.4%  | 0.4%  | 0.2%  | 0.2%  | 0.1%  | 0.7%  | 0.5%  | 0.4%  | 0.4  |
| Over +10 | 0.7%  | 0.8%  | 0.9%  | 0.7%  | 0.8%  | 0.5%  | 0.6%  | 0.3%  | 1.2%  | 1.0%  | 0.8%  | 0.9  |
| Over +9  | 1.4%  | 1.5%  | 1.8%  | 1.3%  | 1.5%  | 1.0%  | 1.2%  | 0.8%  | 2.2%  | 1.8%  | 1.6%  | 1.6  |
| Over +8  | 2.5%  | 3.0%  | 3.3%  | 2.4%  | 2.6%  | 2.1%  | 2.3%  | 1.7%  | 3.6%  | 3.1%  | 3.0%  | 2.8  |
| Over +7  | 4.3%  | 5.3%  | 5.4%  | 4.3%  | 4.2%  | 3.9%  | 4.2%  | 3.5%  | 5.7%  | 5.2%  | 5.0%  | 4.9  |
| Over +6  | 7.0%  | 8.7%  | 8.3%  | 7.4%  | 6.7%  | 6.9%  | 7.1%  | 6.5%  | 8.7%  | 8.2%  | 8.0%  | 8.1  |
| Over +5  | 10.9% | 13.3% | 12.1% | 11.9% | 10.2% | 11.3% | 11.3% | 11.2% | 12.7% | 12.5% | 12.2% | 12.5 |
| -8 to +8 | 95.2% | 94.3% | 93.8% | 94.7% | 94.2% | 95.7% | 95.5% | 96.8% | 92.7% | 94.1% | 94.5% | 94.8 |
| -7 to +7 | 91.7% | 90.1% | 89.5% | 91.0% | 90.5% | 92.3% | 92.0% | 93.7% | 88.2% | 90.3% | 90.5% | 91.1 |
| -6 to +6 | 86.1% | 84.1% | 83.5% | 85.1% | 85.2% | 86.9% | 86.2% | 88.6% | 81.9% | 84.8% | 84.5% | 85.3 |
| -5 to +5 | 77.9% | 75.7% | 75.2% | 76.7% | 77.7% | 78.9% | 77.9% | 80.7% | 73.3% | 76.9% | 76.0% | 77.1 |
| -4 to +4 | 67.0% | 65.1% | 64.4% | 65.8% | 67.7% | 68.0% | 66.6% | 69.7% | 62.5% | 66.4% | 64.9% | 66.4 |
| -3 to +3 | 53.3% | 52.3% | 51.1% | 52.3% | 54.9% | 54.3% | 52.7% | 55.4% | 49.6% | 53.2% | 51.2% | 52.8 |
| -2 to +2 | 37.1% | 36.8% | 35.6% | 36.4% | 39.0% | 38.0% | 36.4% | 38.5% | 34.6% | 37.3% | 35.3% | 36.7 |
| -1 to +1 | 19.0% | 19.2% | 18.2% | 18.7% | 20.4% | 19.6% | 18.5% | 19.7% | 17.7% | 19.3% | 17.9% | 19.0 |
| Under -5 | 11.0% | 10.7% | 12.5% | 11.3% | 11.9% | 9.8%  | 10.7% | 8.1%  | 13.8% | 10.4% | 11.6% | 10.3 |
| Under -6 | 6.8%  | 6.9%  | 8.1%  | 7.4%  | 8.0%  | 6.2%  | 6.6%  | 4.9%  | 9.3%  | 6.7%  | 7.4%  | 6.5  |
| Under -7 | 3.9%  | 4.2%  | 4.9%  | 4.7%  | 5.2%  | 3.8%  | 3.7%  | 2.7%  | 5.9%  | 4.2%  | 4.4%  | 3.9  |
| Under -8 | 2.1%  | 2.4%  | 2.8%  | 2.8%  | 3.2%  | 2.2%  | 2.0%  | 1.4%  | 3.6%  | 2.5%  | 2.4%  | 2.2  |
| Under -9 | 1.0%  | 1.2%  | 1.4%  | 1.6%  | 1.9%  | 1.2%  | 1.0%  | 0.7%  | 2.0%  | 1.4%  | 1.2%  | 1.2  |
| Under -10| 0.5%  | 0.6%  | 0.7%  | 0.8%  | 1.0%  | 0.6%  | 0.4%  | 0.3%  | 1.1%  | 0.7%  | 0.6%  | 0.6  |
| Under -11| 0.2%  | 0.3%  | 0.2%  | 0.4%  | 0.6%  | 0.3%  | 0.2%  | 0.2%  | 0.5%  | 0.4%  | 0.3%  | 0.3  |
| Under -12| 0.1%  | 0.1%  | 0.1%  | 0.2%  | 0.3%  | 0.1%  | 0.1%  | 0.1%  | 0.2%  | 0.2%  | 0.1%  | 0.2  |

Figure 24

| | SP80 | SP90 |
|---|---|---|
| Over +12 | 0.0% | 0.0% |
| Over +11 | 0.1% | 0.1% |
| Over +10 | 0.3% | 0.3% |
| Over +9 | 0.8% | 0.8% |
| Over +8 | 1.8% | 1.7% |
| Over +7 | 3.5% | 3.6% |
| Over +6 | 6.5% | 6.7% |
| Over +5 | 11.0% | 11.5% |
| -8 to +8 | 96.8% | 96.8% |
| -7 to +7 | 93.7% | 93.6% |
| -6 to +6 | 88.5% | 88.6% |
| -5 to +5 | 80.5% | 80.8% |
| -4 to +4 | 69.5% | 69.8% |
| -3 to +3 | 55.1% | 55.6% |
| -2 to +2 | 38.2% | 38.8% |
| -1 to +1 | 19.5% | 19.8% |
| Under -5 | 8.6% | 7.6% |
| Under -6 | 5.0% | 4.7% |
| Under -7 | 2.7% | 2.7% |
| Under -8 | 1.4% | 1.5% |
| Under -9 | 0.7% | 0.7% |
| Under -10 | 0.4% | 0.3% |
| Under -11 | 0.2% | 0.1% |
| Under -12 | 0.2% | 0.1% |

Figure 30

| Trend-Following System (Figure 29a) | | | | |
|---|---|---|---|---|
| | | | Value Chart Price | Price Action Profile |
| Date | Trade | Price | Price Level | Analysis |
| 23-Jul-99 | Buy | 502.25 | +9.61 | 1.37% of the time |
| 28-Jul-99 | Sell | 449.5 | -6.51 | 6.78% of the time |
| 3-Aug-99 | Buy | 499.25 | +9.56 | 1.37% of the time |

| Trend-Following System Enhanced by Value Charts (Figure 29b) | | | | |
|---|---|---|---|---|
| | | | Value Chart Price | Price Improvement |
| Date | Trade | Price | Price Level | Per Contract ($) |
| 28-Jul-99 | Buy | 451.5 | -6 | $ 2,537.50 |
| 2-Aug-99 | Sell | 483.25 | +6 | $ 1,687.50 |
| 12-Aug-99 | Buy | 481.75 | -6 | $ 875.00 |

Dollars Saved Per Contract From Value Chart Enhancements $ 5,100.00

1) Bar located above sector:
2) Bar located below sector:
3) Bar passes all of the way through sector:
4) Entire bar is inside of sector:
5) High of bar is in sector and low of bar is below sector:
6) Low of bar is in sector and high of bar is above sector:

PRICE CHARTING SYSTEM AND TECHNIQUE

CROSS-REFERENCE TO RELATED APPLICATIONS/INCORPORATION BY REFERENCE

This U.S. patent application is a continuation of U.S. patent application Ser. No. 09/536,328 filed on Mar. 24, 2000.

FIELD OF THE INVENTION

The present invention relates generally to financial data processing and analysis, and more specifically, to an internet or a computer-implemented system and technique for producing enhanced price charts to allow investors to quickly and easily analyze the relative overbought or oversold state of any market and for generating quantifiable relative overbought and oversold price levels to drive (feed) mathematical trading systems or help investors strategically enter or exit markets.

BACKGROUND OF THE INVENTION

In today's fast-paced financial markets, investors need to access information quickly and easily in order to process trading decisions. With the significant growth of online trading, individual investors need effective market analysis tools to help them make better trading decisions. Because the saying "a picture is worth a thousand words" still holds true, traders all over the world rely on traditional bar charts to display both past and present price activity. Bar charts are valuable because they reflect the history of price movement in an easy to process format (a picture.) An investor can literally analyze a chart in a glance. Although bar charts have proven to be valuable tools in the investment field, a frequently asked question is "are traditional bar (price) charts alone the most effective way define relative overbought price levels, relative oversold price levels, or fair value?" As will be shown, price can be displayed in a format which makes is possible to define the relative valuation of any market.

With the advancement in personal computers, the Internet, and online trading, trading in the stock (bonds, and futures) market has significantly increased in popularity. Investors have significant resources to utilize when determining what stock to buy or sell. However, until now, investors have not had a powerful charting tool that can quantify relative value and identify optimal market entry or exit price levels. A market analysis tool that can identify relative overbought and oversold price levels will potentially allow investors to lower their risk exposure (to loss) by helping buyers to enter markets at relatively oversold (undervalued) price levels and sellers to exit markets at relatively overbought (overvalued) price levels. Thus, buying at lower price levels and selling at higher price levels a trader is able to enhance his or her profit potential.

Furthermore, with the recent advancements in computers, many traders are now developing mathematical computerized trading systems. These trading systems rely on quantifiable price levels to generate buy and sell signals. Until now, the most common quantifiable price levels used to drive trading systems have been the opening or closing price of a time period (day, week, month, 10-minute bar, etc.). The previous day's (or time period's) highs and lows have also been used as quantifiable reference price levels to direct trading systems to enter or exit markets. Any method or market analysis technique that could expand the number of quantifiable price levels to drive mathematical trading systems would be extremely useful to trading system designers.

SUMMARY OF THE INVENTION

Meeting these requirements, the present invention, which includes producing Value Charts™ (sometime hereafter designated "VC") and Price Action Profile™ (sometime hereafter designated "PAP"), has the potential to revolutionize price charting, online (internet) trading, and trading system design.

Introduction

The primary purpose of this summary is to present the Value Chart™ and Price Action Profile™ technical indicators in an easy to understand format.

Value Charts™ and Price Action Profile™ were designed with both the novice investor and the seasoned investor in mind. Because it was once said that "a picture is worth a thousand words," most traders rely heavily on traditional price charts and graphical indicators. Charts and graphs condense information and allow traders to quickly digest both past and present market activity. As will be described, Value Charts™ and Price Action Profile™ reveal a hidden order in the markets. These market analysis tools do not represent the "black box." Rather, they represent a valuable addition to any trader's arsenal of technical indicators. These powerful new charting techniques will allow traders at a glance to gain insight into the relative valuation of any free market.

For trading system developers, Value Charts™ opens up a whole new horizon of reference price levels that can be utilized to drive trading systems or indicators. Until now, most traders have had access to only a limited number of reference prices levels. Reference price levels are primarily used to either instruct a trading system when to enter or exit a position or they are used to calculate an indicator. For daily bar charts, the reference price levels include the opening price of the day, the closing price of the day, or a previous day's high price or low price. By utilizing Value Charts™, traders can now create trading systems that enter or exit markets at relative quantifiable price levels. The present invention provides the ability to calculate relative quantifiable price levels during a trading day or other time period to facilitate trading system development.

Quantifiable information is useful information. Many market analysis strategies rely too heavily on the opinion of the user when determining when certain rules or conditions are met. Market analysis strategies that rely on the judgement of a trader when determining trading signals often contain too much "gray area" and have little long-term usefulness. Value Charts™ and Price Action Profile™, on the other hand, generate quantifiable information that can only be interpreted one way. These innovative new market analysis tools were developed for anyone, regardless of trading experience, to learn and use.

The Limitations of Traditional Price Charts

Most traders and market analysts utilize some form of traditional price charts to analyze markets. This is primarily because price charts are easy to read and they condense information, which saves us time. The most common form of traditional price charts is the bar chart, which displays the open, high, low, and close of the market under consideration (as seen in FIG. 1).

The S&P 500 futures market in FIG. 1 serves as a good example of a traditional bar chart. As we all know, each price bar is plotted with respect to zero. Zero serves as the reference point for every traditional price chart. For example, the S&P 500 market closed at 1440.70 above zero. These charts are valuable for displaying both the current and the historical price activity of a market. Traditional price charts, however, are not effective in identifying relative value. In hindsight we can identify overbought and oversold price levels but they are all but impossible to identify real-time using traditional bar charts. Because the goal of every market participant is to enter into a market at a good value, we must develop a way to present price bars that effectively define a good value.

Four daily price bars are shown in FIG. 2, with the last three daily price bars B, C, and D appearing similar. In fact, the last three price bars represent different values even though they have the same open, high, low, and closing prices.

At first this statement may not make a lot of sense. Analyzing the last three price bars, it is noted that they are different because each price bar represents a different day (time period). When the last three days are analyzed in terms of value, day (C) is a better value than day (B) and day (D) is a better value than days (B) and (C). If you were looking to buy into the market displayed in FIG. 2 after the first day (price bar A) has ended, which price bar close would you select to enter a long position on, if only given the choice between days B, C, or D? Because days B, C, and D all traded at identical prices, day D would represent the best value. This can be explained by the fact that your cost or margin, the money necessary to buy into the market, could have been left in an interest bearing account or another investment for days B and C instead of in the market where no profits would have been generated. Although traditional bar charts present the last three bars in a way that they appear to be at the same relative value, each day actually has a different relative value. Value is established in large part by our memory of recent price history. If we have seen a market trade at the same price for several days, we might feel more comfortable in paying that price ourselves because the price has been established as an acceptable, or fair, value by the market. So we as humans establish value in large part by what others have regarded as value, which is reflected in historical price activity. This observation will become apparent as the Value Charts according to the present invention are described.

Fair value in the market place is confirmed by time. If a market traded at the same price forever, one would logically assume that the buyers and sellers agree that the price is not overbought or oversold, but at fair value. The markets that we participate in are rarely ever trading at the exact same price over time, but instead they are constantly overshooting fair value, both to the up side and the down side, across every time frame. Furthermore, because we live in a constantly changing world, fair value is constantly being redefined as time goes on. Actively traded markets are always oscillating around fair value and fair value is constantly being redefined over time. Furthermore, it is possible for a market to be undervalued with respect to a short-term time frame and overvalued with respect to the long-term time frame. This phenomenon can be partly explained by the fact that short-term traders reference recent price activity when they seek to define value and long-term traders reference long-term price activity when seeking to define value. Furthermore, short-term fundamentals and long-term fundamentals can be different influencing factors on a market.

For example, with no change in the fundamental picture, a short-term trader may believe that corn is relatively undervalued and buy several corn contracts for his account at $3.00 a bushel. Being short-term in nature, he is quick to liquidate as soon as corn prices rise several cents to $3.15 a bushel. His decision to sell his profitable position is based on the fact that the relative value of corn prices has changed with respect to his perception. When corn was at $3.00 a bushel, earlier in time, he viewed the corn market as being undervalued with respect to the short-term timeframe. This may be because he remembers recent corn prices trading above $3.20 a bushel. A long-term trader who is looking to buy corn may not see $3.00 a bushel as a good value because he references long-term historical prices of corn and remembers when corn was trading around $2.00 a bushel one year earlier. Our historical reference prices, whether short-term or long-term, are built into our memories and we subconsciously reference them when we seek to establish value.

The market, made up of many individual participants, is in a constant search for fair value across every time frame. We will primarily concern ourselves with the analysis of short-term fair value when describing the Value Charts™ and Price Action Profile™ in this description. It would seem logical that most of the trading would occur around the fair value price level. Prices, as previously stated, are constantly oscillating from degrees of relative overvalue to degrees of relative undervalue and back to overvalue. Although traditional bar charts are useful when trading, they are not useful in identifying relative overbought and relative oversold price levels. As previously noted, two identical price bars on a traditional bar chart do not necessarily equate to two equal values. Knowing this, a graphical charting tool that can effectively identify relatively overbought price levels, relatively oversold price levels, and fair value would be desirable. This need to accomplish what traditional bar charts are unable to accomplish is provided by the present invention.

Like traditional bar charts, Value Charts™ allow investors to quickly analyze the historical characteristics of any market. However, in addition to this, Value Charts™ along with Price Action Profile™ allow investors to quickly analyze the current relative overbought or oversold state of any market with little effort. These innovative new market analysis techniques give investors the ability to quickly determine whether a market is overbought, oversold, or trading at fair value. In a powerful new way, these market analysis tools allow investors to quantify value in a market. In addition to these benefits, Value Charts™ now make it possible for trading system developers to create mathematical trading models that can generate buy or sell signals at Value Chart™ price levels, not just the at the open or close of a trading session. Furthermore, by using Value Charts and Price Action Profile™, computers can now scan thousands of markets to search for markets that are currently overbought or oversold, as defined by Value Charts™. Traders can use this new technology to track the overbought or oversold state of any market across different time frame price bars (i.e. 30-minute, daily, weekly, monthly, etc.).

BRIEF DESCRIPTION OF THE DRAWINGS

FIG. 4 Example calculations for generating the relative chart of FIG. 3.

FIG. 7 shows example calculations for generating the Value Chart™ shown in FIG. 6.

FIG. 13b shows a frequency histogram of the relative daily chart shown in FIG. 13a.

FIG. 14b shows a Price Action Profile™ generated from the daily Value Chart™ of FIG. 14a.

FIG. 21 shows a Price Action Profile™ analysis generated from several different markets.

FIG. 24 shows a Price Action Profile™ analysis comparison—S&P 500 (1980s vs. 1990s).

FIG. 30 shows Profits from Value Chart™ enhancements for whipsaw trades (FIG. 29a,b).

DETAILED DESCRIPTION OF THE PREFERRED EMBODIMENT

Value Charts™

Although traditional bar charts are useful for referencing the historical and current price activity of a market, we need to have the ability to chart price in a new way so that they can clearly identify relative overbought and oversold price levels. In other words, we need to chart price bars on a relative basis instead of an absolute basis.

Figure 1:
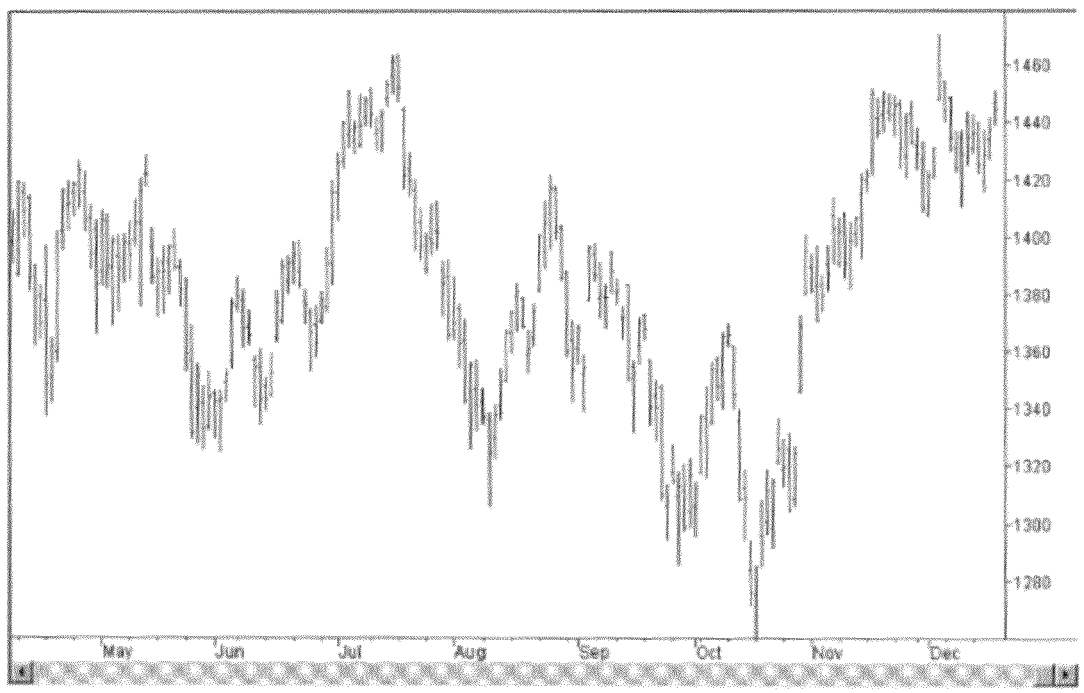
FIG. 1 shows a daily futures bar chart typical of the prior art for a particular market.
Figure 2:
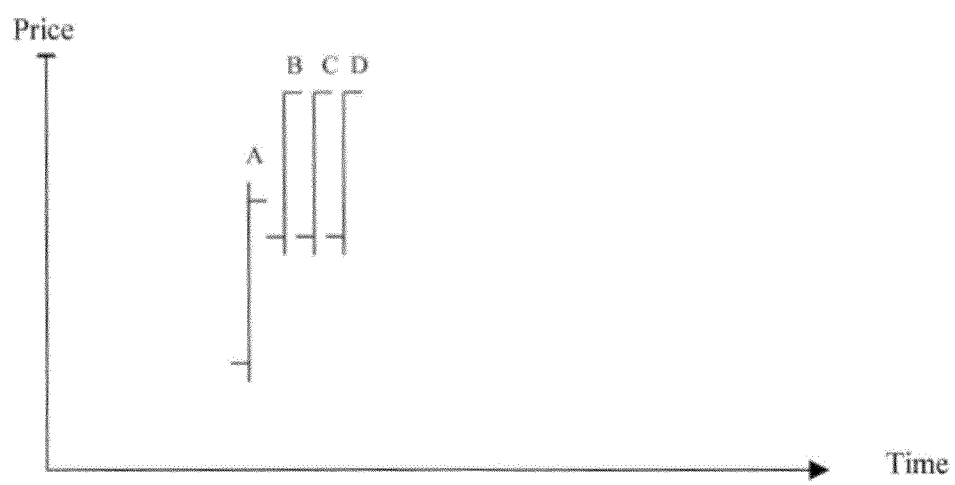
FIG. 2 shows four daily price bars.
Figure 3:
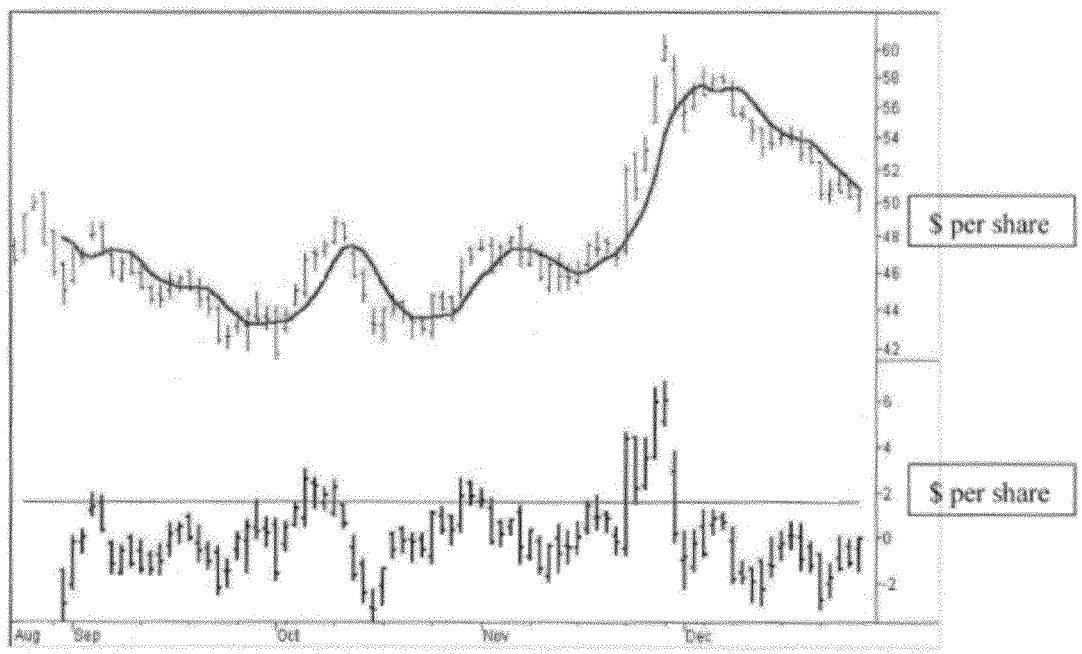
FIG. 3 shows a daily price chart (top) and relative price chart (bottom) for a particular market.

In this type of chart, such a relative basis may be based on a simple 5-day moving average of the median bar chart price (see Formulas for calculating a Relative Chart below) as the reference axis. Therefore, instead of plotting price with respect to zero, the price is plotted (open, high, low, and close) with respect to this simple 5-day median moving average, which we will refer to as the floating axis. Price given in terms of its relation to the floating axis, instead of zero, will be referred to as relative price (see FIG. 3).

Formulas for Calculating a Relative Chart

Median Price=(High+Low)÷2

Floating Axis=5-day moving average of Median Price

Relative Price=Price−Floating Axis

The date, open, high, low, and close from the daily AT&T bar chart (FIG. 3) are listed in the first five columns of FIG. 4. By utilizing the Floating Axis formula displayed above, we are able to calculate the Floating Axis in column 6. From this point calculating relative price is simple (reference FIG. 4). For example, we simply take the open price in column 2 and subtract the Floating Axis value in column 6 to get the relative open in column 7. Simply repeat this process for the high, low, and close to calculate the relative high, relative low, and relative close.

From FIG. 4 we can calculate the relative open for Aug. 31, 1999 (first Row) as follows:

| Open | | Floating Axis | | Relative Open |
|---|---|---|---|---|
| 46.437 | − | 47.894 | = | −1.457 |

Figure 5:
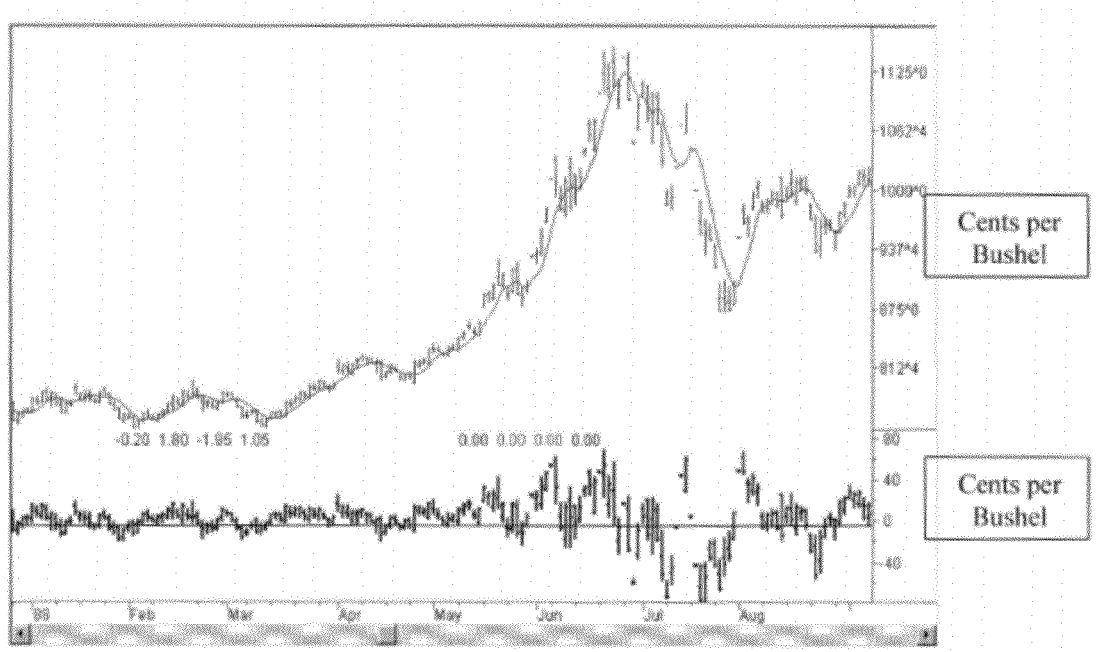
FIG. 5 shows a daily price chart (top) and relative price chart (bottom) for another market.

Now with the basic understanding of how to calculate a relative bar chart, we can view a relative chart displayed below a Soybeans traditional bar chart. This example, which displays a major bull market, will illustrate how volatility can significantly increase as a bull market progresses. FIG. 5 displays a daily Soybeans bar chart that is positioned directly above a daily Soybeans relative bar chart. Once the normal bar chart prices were converted into relative prices, they were plotted directly below their corresponding normal prices (FIG. 5) so that the traditional price chart is plotted directly above the relative price chart. This new relative chart reflects the relative movement of the Soybeans market with respect to the floating axis. When the traditional price bars move farther away from the floating axis in the top half of the chart, the relative price bars move farther away from the zero line in the bottom half of the chart.

Note that the moving average line in the top chart, which represents the floating axis, is equivalent to the zero line in the relative chart displayed below. Imagine pulling the curvy moving average line (floating axis) in the top half of FIG. 5 until it was straight. This would transform the traditional chart into the relative chart. Upon a close inspection of the Soybeans relative chart, it is evident that price tends to deviate more from the zero line (floating axis line) as markets become more volatile. Note that in FIG. 5, as the price of Soybeans became much more volatile on the right side of the chart (June through August timeframe) the relative price bars in the lower chart deviated much farther from the zero axis. Remember, the zero axis in the Relative Chart (lower chart) represents the floating axis, which is the moving average in the top chart. The relative price chart clearly did not adjust to changing volatility conditions and therefore was of little value because we want the relative chart to be able to define how far away from the zero line we should typically expect the relative price bars to deviate. Because the expected deviation from the zero line is always changing with market volatility, relative charts will not be effective in defining overbought and oversold relative price levels.

In order for a relative chart to be more useful in identifying overbought and oversold price levels, it is desirable in the preferred embodiment to have the ability to adapt to changing market volatility. This is accomplished in providing the y-axis units in the Relative Chart (displayed in FIG. 5) defined in terms of a dynamic volatility unit instead of a static price unit. This new dynamic volatility unit allows volatility adjusted relative charts to be useful in defining relative overbought and oversold price levels as market volatility changes over time. These now volatility adjusted relative charts are hereafter referred to as Value Charts™.

In the preferred embodiment, the dynamic volatility unit (DVU) is defined as 20% of the 5-day average of the volatility measurement (VM). The VM is defined as either the daily price range (High-Low) or today's close minus yesterday's close (C-C[1]), whichever is larger. We can now apply a Value Chart to the AT&T price chart displayed in FIG. 3 for the purpose of understanding the calculations behind Value Charts™. The formulas used to create a Value Chart™ from traditional bar chart prices are listed below under formulas for calculating a Value Chart™.

Formulas for Calculating a Value Chart

Floating Axis=5-day moving average of ((High+Low)÷2)

Dynamic Volatility Units (DVU)

If (High-Low)>(Close-Close[1]) then VM=(High-Low)

If (High-Low)<(Close-Close[1]) then VM=(Close-Close[1])

{Close-Close[1] means today's close minus yesterday's close}

Dynamic Volatility Units (DVU)=(5-day moving average of VM)*0.20

Value Price=(Price−Floating Axis)÷DVU

Figure 6:
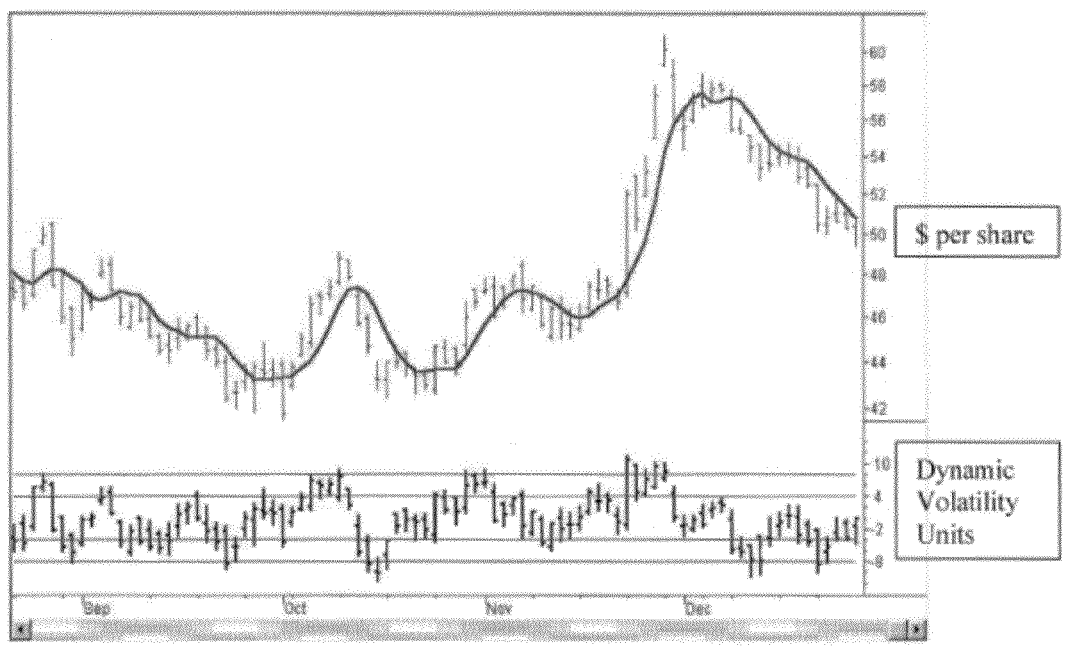
FIG. 6 shows a daily price chart (top) and a Value Chart™ (bottom) according to a preferred embodiment.

Like before, the date, open, high, low, and clo Floatingse of the daily AT&T bar chart (as seen in FIG. 6) are listed in the first five columns of FIG. 7. By utilizing the Floating Axis formula, the Floating Axis is calculated in column 6 (refer to FIG. 7 for example calculations). By utilizing the Dynamic Volatility Unit formula, the Dynamic Volatility Unit (Volatility Unit) in column 7 (of FIG. 7) is calculated. From this point calculating Value Chart price is simple. For example, we simply take the open value in column 2 and subtract the Floating Axis value in column 6, and then divide this value by the Dynamic Volatility Unit in column 7 to get the Value Chart Open (Value Open) price in column 8. Simply repeat this process for the high, low, and close to calculate the Value Chart High, Value Chart Low, and Value Chart Close.

From FIG. 7 we can calculate the Value Chart Open for Aug. 31, 1999 as follows:

| Open | | Floating Axis | Volatility Unit | | Value Chart Open |
|---|---|---|---|---|---|
| (46.437 | − | 47.894) | ÷ 0.455 | = | −3.202 |

Figure 8:
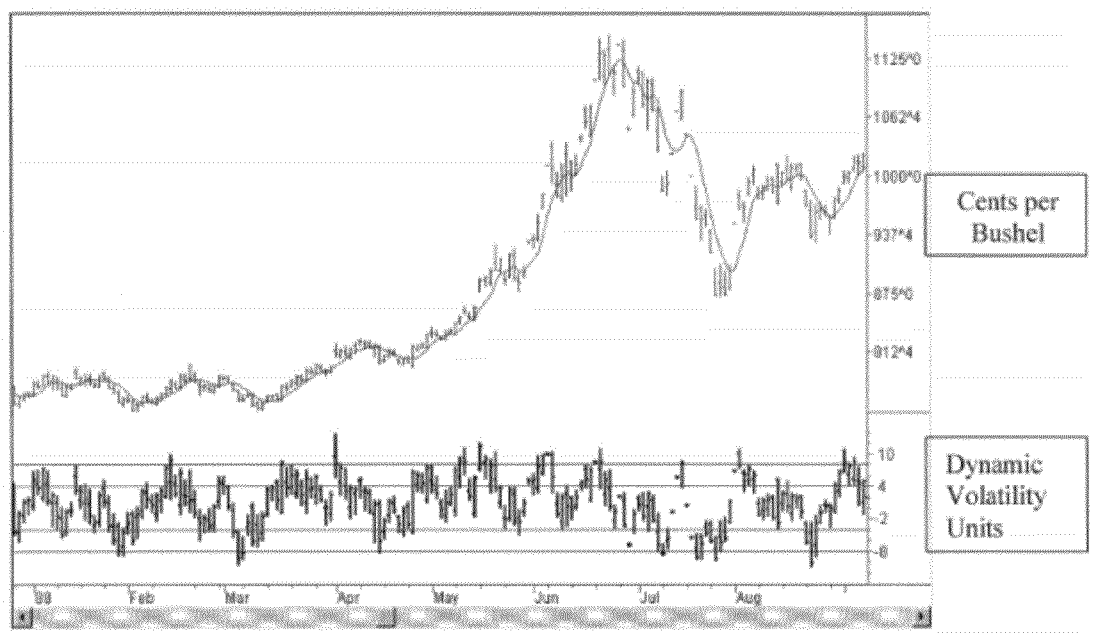
FIG. 8 shows a daily bar chart above a daily Value Chart™.

The formulas above allow us to now convert the traditional Soybeans daily price chart in FIG. 5 into a volatility adjusted relative price chart, or Value Chart™ (FIG. 8). As you can see, the daily Soybeans Value Chart™ in FIG. 8 is significantly different from the relative price chart displayed in FIG. 5. You can see in FIG. 8 that the Value Chart™ is effective in adjusting to changing volatility levels in the Soybeans bull market. It is not uncommon for markets to dramatically increase in volatility when they reach higher price levels. In fact, we all know that the volatility characteristics of every free market tend to change over time along with changing price. A Value Chart™ has the ability to adapt to different levels of volatility in any free market and still effectively define overbought and oversold relative price levels. In other words, as volatility changes, the point deviation from the zero line in a Value Chart™ that would constitute an overbought or oversold price level would theoretically remain the same. Therefore Value Charts™ can effectively identify overbought and oversold price levels in the Soybeans bull market in February 1988 (when market volatility is lower) just as well at it can effectively identify overbought and oversold price levels in August 1988 (when market volatility is higher).

Figure 9:
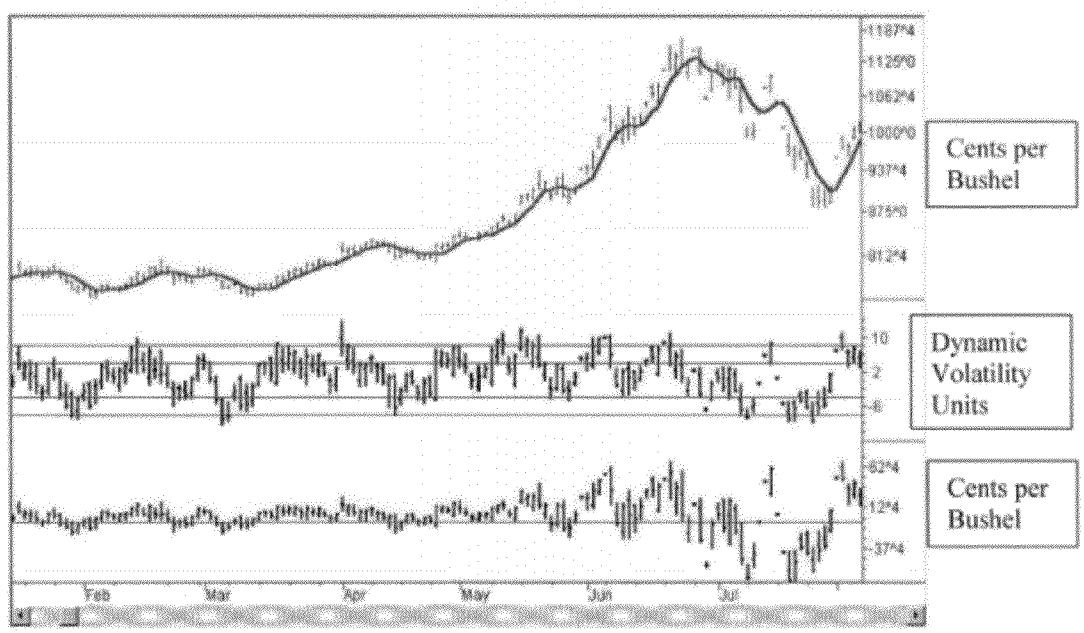
FIG. 9 shows a bar chart over a Value Chart™ (middle) and a relative chart (bottom).

Now we can begin to further understand how to use Value Charts™ when analyzing markets. A Value Chart™ is usually positioned directly below the traditional price chart that it is generated from. The Value Chart™ can also be displayed without the traditional bar chart. FIG. 9 displays both the Value Chart™ and the relative chart directly below a daily bar chart of the 1988 Soybeans bull market. During the February-March time period the relative chart deviated from zero +17 cents to the upside and −17 cents to the downside. During the July time period, when Soybeans experienced peak volatility, the relative chart deviated from zero +66 cents to the upside and −77 cents to the downside. These relative chart values represent a 390% increase in upside deviations and a 450% increase in downside deviations from the mean (zero) when the Soybeans market dramatically increased in volatility from the earlier stages of the bull market to the climax of the bull market. On the other hand, during the February-March time period the Value Chart™ deviated from zero +9.7 dynamic volatility units to the upside and −10.2 dynamic volatility units to the downside. During the July time period, when Soybeans experienced peak volatility, the Value Chart™ deviated from zero +10.7 dynamic volatility units to the upside and −9.5 dynamic volatility units to the downside. The Value Chart™ was successful in adjusting to dramatically increased volatility in the Soybeans market over the course of the 1988 bull market.

The ability of Value Charts to adjust to changing market volatility allows us to define overbought and oversold price levels even when market volatility changes dramatically over time. As shown, Value Charts can adjust to increasing volatility within a single bull market, but also can adapt to the steadily increasing volatility seen in the S&P 500 futures market over two decades. A major bull market lasting approximately 20 years in the S&P 500 futures market results in an increase of more than 400% in the value of this contract. This results in a dramatic increase in market volatility and price swings, which represent the perfect testing ground for the Value Charts™ and Price Action Profile™ concepts.

Figure 10:
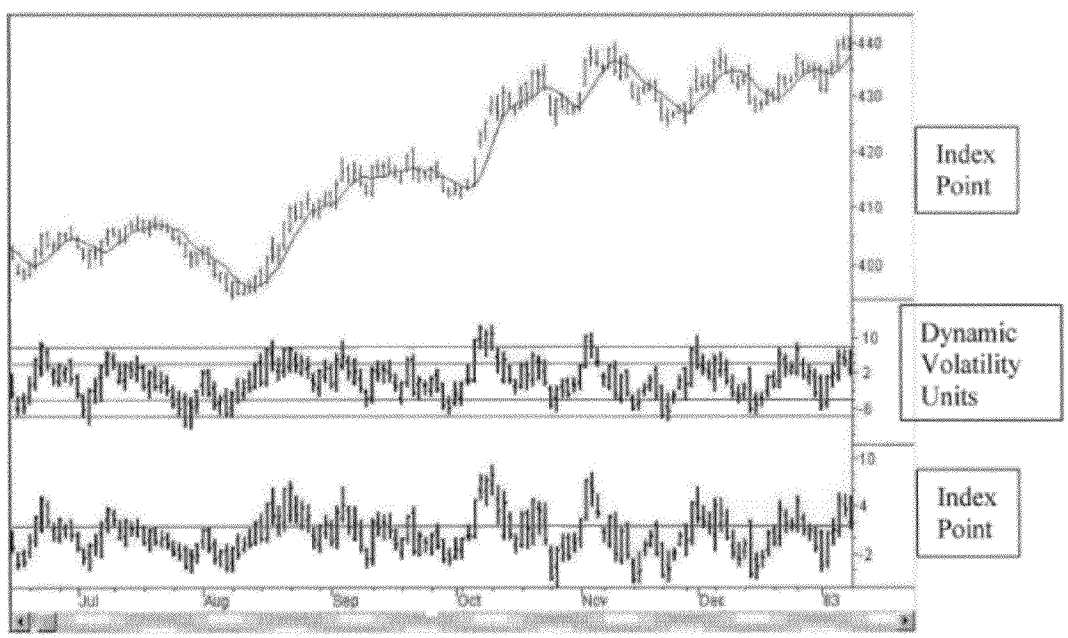
FIG. 10 shows a bar chart in 1982 over a Value Chart™ and a relative chart for the S &P 500.

Notice in FIG. 10 that the S&P 500 relative chart during 1982 experienced deviations from zero to as high as +9.0 and as low as −6.1. However, seventeen years later in 1999 when the S&P 500 market was at much higher price and much higher volatility levels (FIG. 11), the S&P 500 relative chart experienced deviations from zero as high as +59.9 and as low as −54.0. In this example, the market volatility increased significantly over the course of almost two decades. Now, referring to FIG. 10, we note that the Value Chart™ experienced deviations from zero as high as +12.5 and as low as −10.3 whereas in 1999 (FIG. 11), the Value Chart™ experienced deviations from zero as high as +11.0 and as low as −11.0. Value Charts™ were successful in adapting to the slowly increasing levels of volatility in the S&P 500 futures markets.

Figure 11:
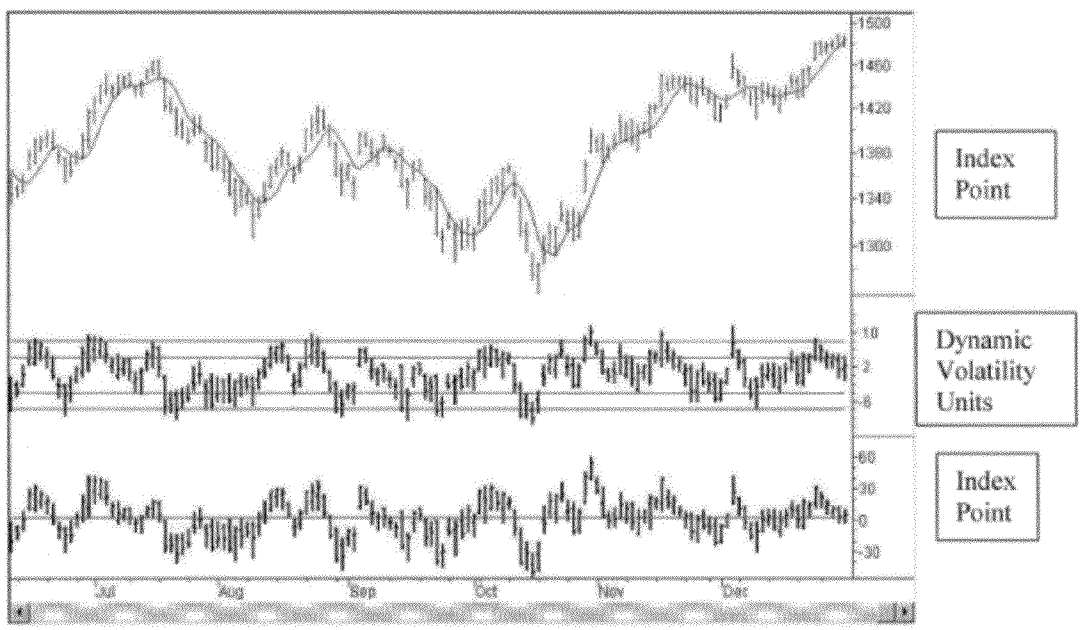
FIG. 11 shows a bar chart in 1999 over a Value Chart™ and a relative chart for the S &P 500.

Incredibly, the Value Chart™ in FIG. 9 has the same scale that the Value Charts™ have in both FIG. 10 and FIG. 11. Value Charts™ are able to adapt to changing market volatility and, at the same time, work on any free market in the same manner. As will be described, this fact is very significant because as Value Charts™ can identify relative overbought and relative oversold price levels in any free market. This will potentially allow traders to enter and exit markets at better, or more profitable, price levels. Furthermore, traders can now design trading systems that enter or exit markets at Value Chart™ price levels. Because Value Charts™ works the same across every market by using the same universal overbought and oversold point scale, trading strategies no longer have to be revised to accommodate each unique market.

It is known that, when market volatility increases, price fluctuations also increase. Given this fact, it would be expected that with increasing volatility levels, short-term overbought and oversold price levels would be characterized by even greater price deviations from a moving average reference point. In other words, a trader would expect market corrections and fluctuations to increase as volatility increased. With the development Value Charts™ and Price Action Profile™, traders are provided with a powerful market analysis tool that is capable of defining value. In the following section, it is described how Price Action Profile™ is used to verify the effectiveness of the dynamic volatility units in Value Charts™ and also how Price Action Profile™ can be used as a effective compliment to the Value Charts™ concept in developing powerful trading strategies.

Price Action Profile™

In the previous section it was observed that a Value Chart™ can be a powerful market analysis tool in identifying relative overbought and oversold price levels. The ability of Value Charts™ to adapt to changing volatility conditions in the markets and function effectively across an array of significantly different markets makes the present invention a powerful market analysis tool. However, a Value Chart™ can be powerfully enhanced with Price Action Profile™. Price Action Profile™ is simply a profile, or bell curve, that describes the historical behavior of a Value Chart™. Price Action Profiles™ display how frequently a Value Chart™ has traded above, below, or in any given Value Chart™ sector.

Creating a Price Action Profile™

Recall that a Price Action Profile™ reflects the distribution of price bars in the different volatility intervals of a Value Chart™. The Value Chart™ bars are simply "piled up" on one side, preferably left, of the Value Chart™. FIGS. 12a-12d demonstrate the development of a Price Action Profile™ from a Value Chart™. Ignore the thickness of the bars that build the Price Action Profile™ (left) and focus on how they pile up in FIGS. 12a, 12b, 12c, and 12d.

Figure 12A:
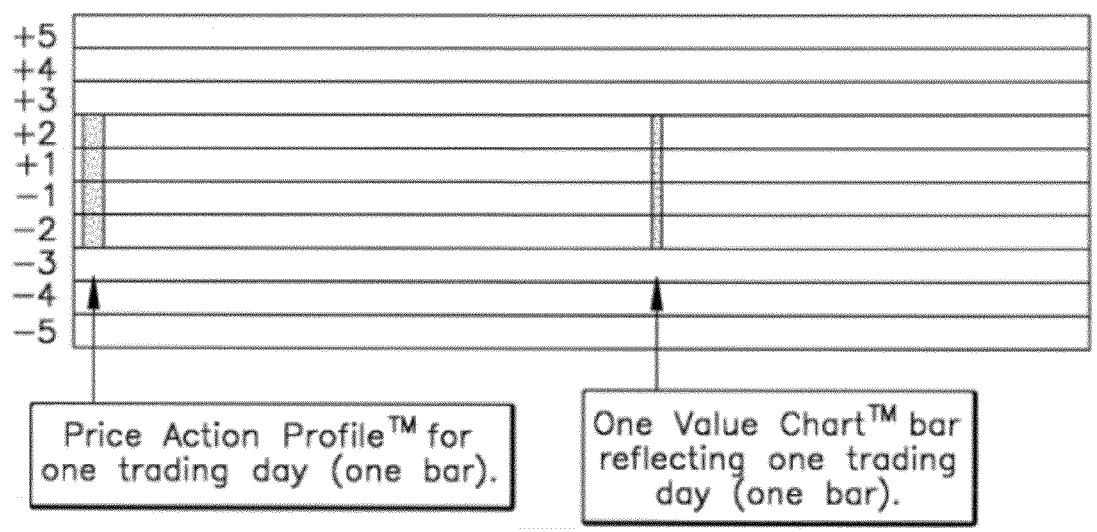
FIGS. 12(a)-12(d) show development of a Price Action Profile™ according to a preferred embodiment.
Figure 12B:
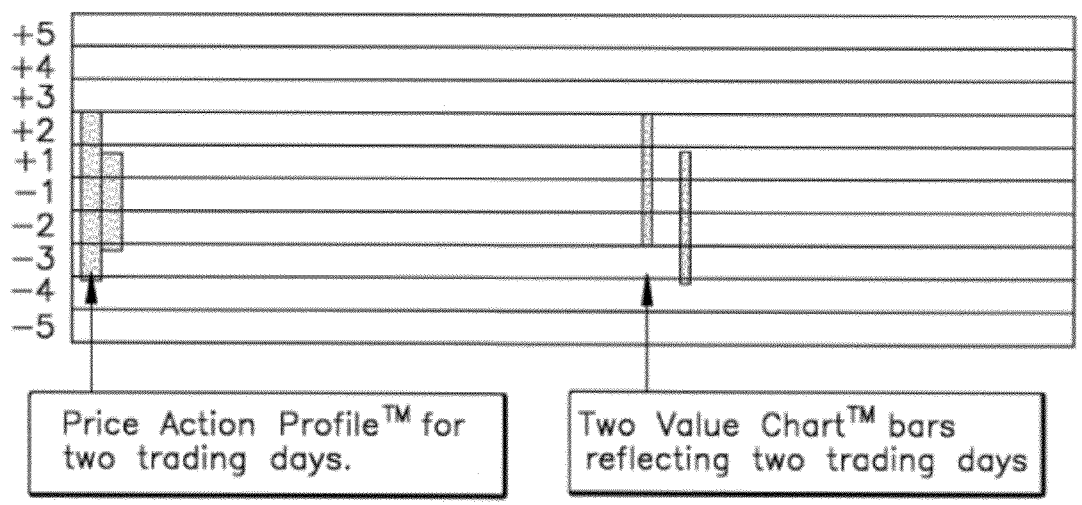
Figure 12C:
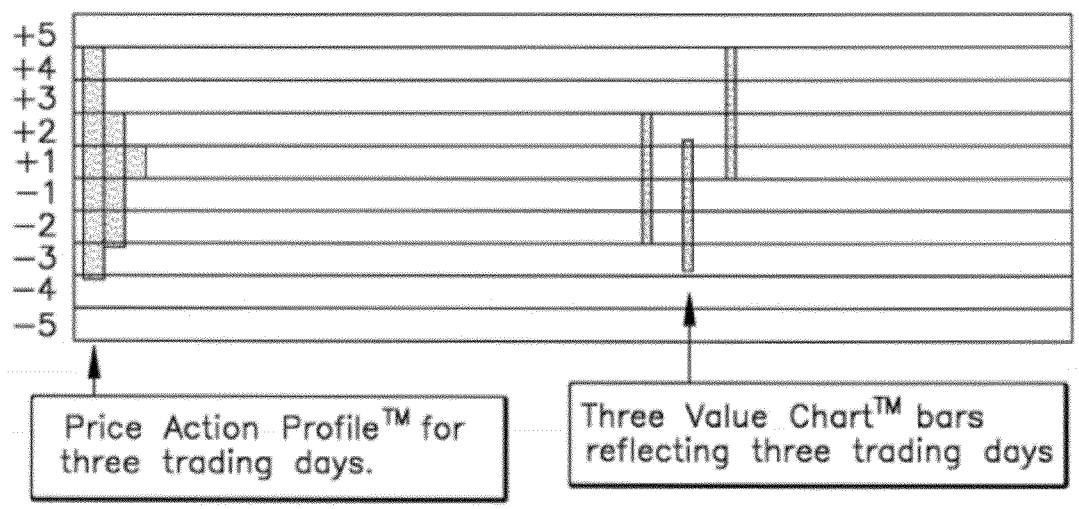
Figure 12D:
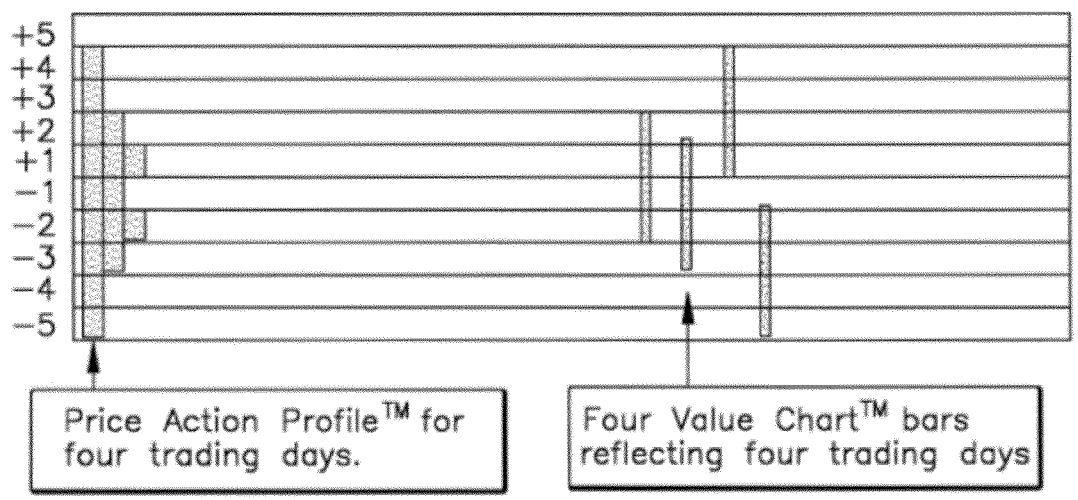

In FIG. 12a you will note that the Price Action Profile™ of just one Value Chart™ bar is simply a bar-shaped profile. The addition of many more bars is what generates a bell curve shape in a Price Action Profile™. Observe the addition of a second, third, and forth Value Chart™ bar in FIG. 12b, FIG. 12c, and FIG. 12d. Note how the additional bars effect the shape of the Price Action Profile™.

Understanding how the Price Action Profile™ is generated is fairly simple. When you examine FIG. 12d you can count how many bars trade in each volatility interval. For example, the first three bars in the Value Chart™ trade in the (+1) volatility interval. Notice that the Price Action Profile™ reflects this by having three layers in the (+1) volatility interval. As price bars are added to the Value Chart™, the Price Action Profile™ will continue to stack these bars and eventually form the shape of a mound-shaped bell curve.

Validating Value Charts™

Recall from FIG. 5 that the relative chart was the predecessor to the Value Chart™. Price Action Profiles™ facilitated determining that relative charts can be improved by conversion into Value Charts™, which are very valuable from a technical analysis standpoint. Price Action Profiles™ of both the relative chart as shown in FIG. 5 and the Value Chart™ as previously displayed in FIG. 8 are shown on the following pages.

Figure 13A:
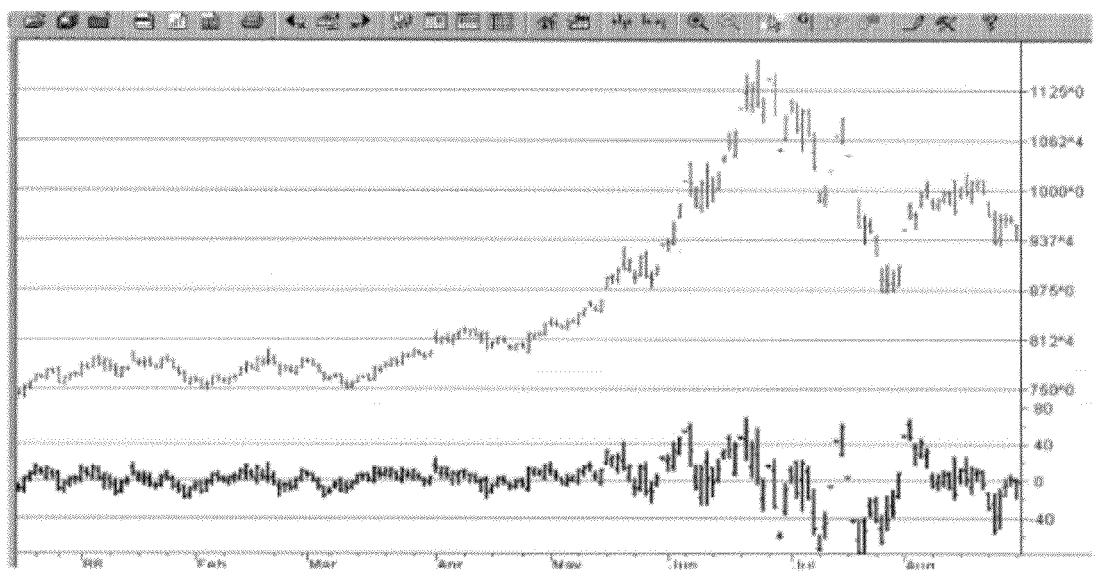
FIG. 13a shows a daily bar chart above a daily Relative Chart.

In order for a relative chart to be useful in identifying overbought and oversold price levels, it would have to have the ability to adapt to changing market volatility. The profile, or distribution (FIG. 13b), generated from the relative price activity in the Soybeans market (FIG. 13a) is of little statistical value because of its thorn like shape. This is understandable given that relative prices are always in a constant state of deviating more or less from the zero axis as market volatility changes. Therefore, historical relative price activity is of little value because historical volatility was most likely different from the present market volatility. It would be preferred to compare apples to apples, and relative charts simply do not allow us to do this.

Figure 14A:
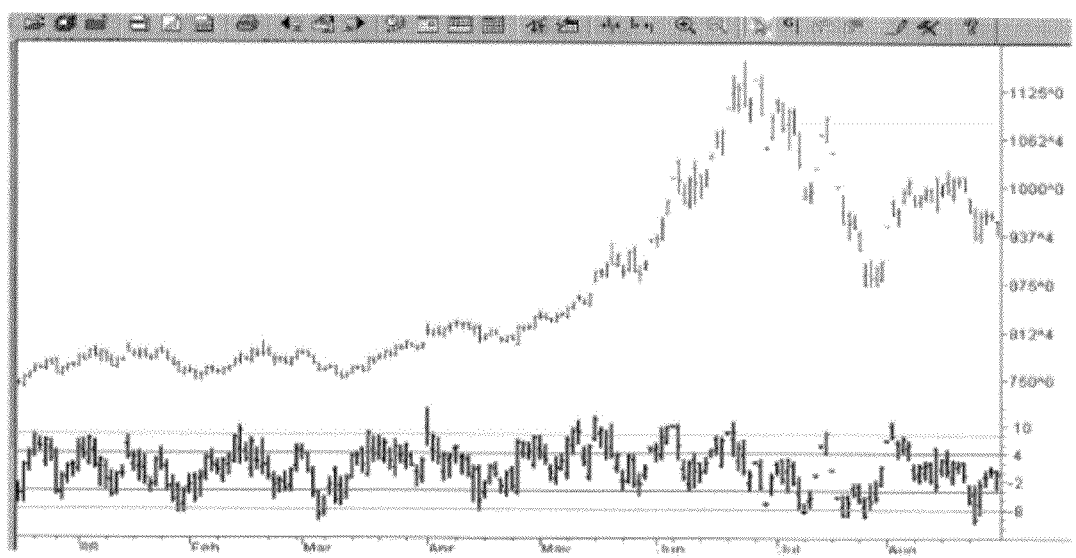
FIG. 14a shows a daily bar chart above a daily Value Chart™.

In the preferred embodiment therefore, a Price Action Profile™ is generated for the Value Chart™ displayed in FIG. 14a. The chart in FIG. 14a only displays about nine months of price datum. In the preferred embodiment, building a profile from much more extensive Value Chart™ price activity would be advantageous. Again, building a profile simply involves stacking or sliding all of the Value Chart™ daily price bars to the left of the screen. In this example, we will evaluate approximately 30 years of price datum as we develop this frequency diagram or bell curve of Value Chart™ price activity (displayed in FIG. 14b). The previous profile generated from non-volatility adjusted y-axis intervals (relative chart) was of little use from a statistical standpoint. However, as you can see, this new profile, which will be referred to as Price Action Profile™, was derived from the Value Chart™ price datum and is statistically valid in that it closely resembles the shape of a mound-shaped, or normal bell curve. This is very significant in that normal bell curves derived from a sample of datum are very useful in determining future behavior of a given population (subject matter). In other words, we can expect a future Price Action Profile™ to closely resemble a past Price Action Profile™ for a given market, as the Value Charts™ are effective in adapting to changing market volatility.

Figure 13B:
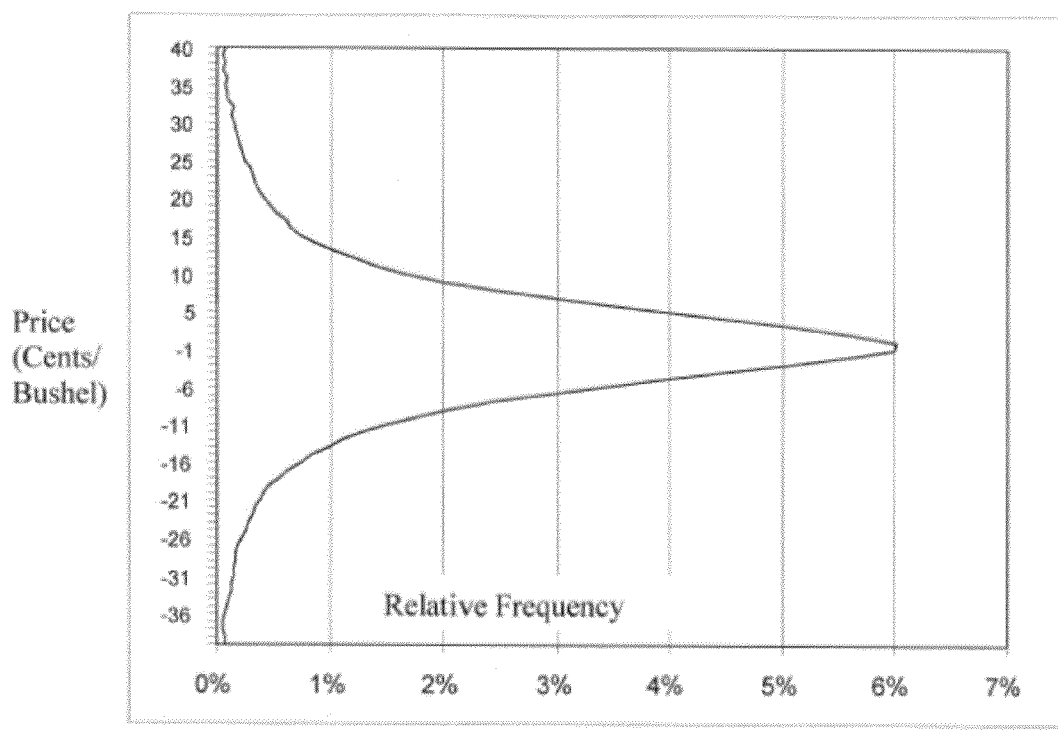
Figure 14B:
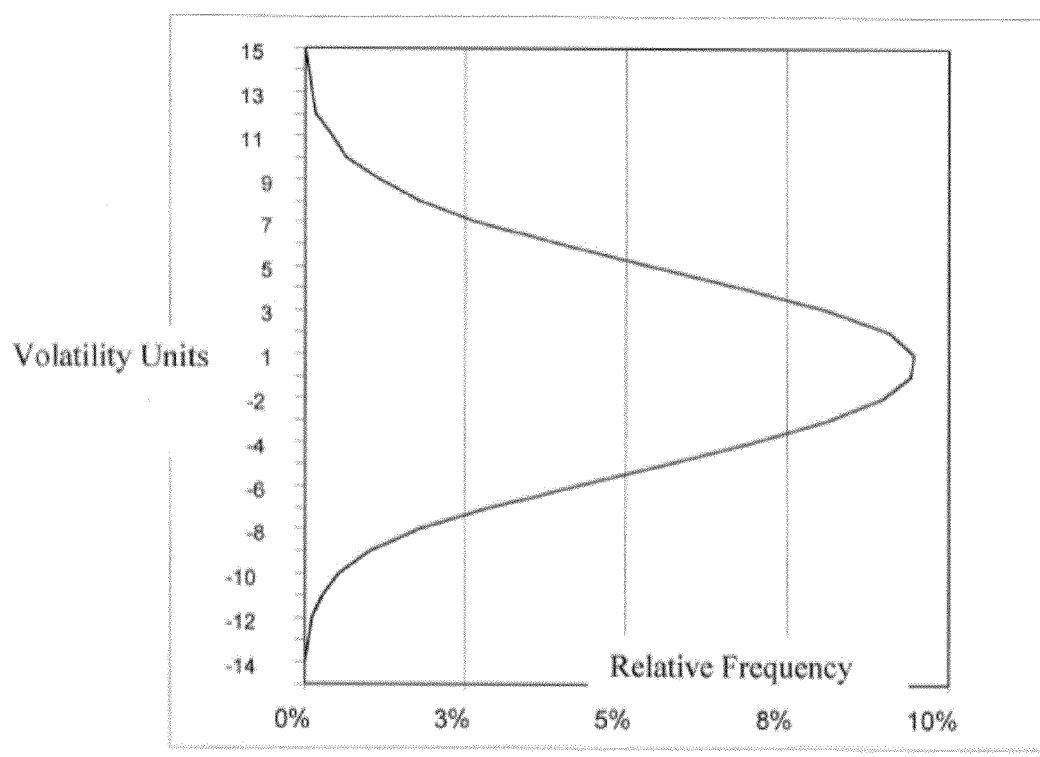

As you can see in FIG. 14b, the Price Action Profile™ resembles a bell curve whereas the profile generated by the non-volatility adjusted relative price chart in FIG. 13b resembled a thorn. Because the Price Action Profile™ in FIG. 14b closely resembles a normal bell curve, we can now make inferences about the population (future Soybean prices) by analyzing this bell curve. As should be evident, having insight on the future price behavior of any market can lead to trading profits. By analyzing the Price Action Profile™, the trader can quantify the frequency in which the Soybean market trades in each Value Chart™ interval (analysis seen in FIG. 15).

Figure 15:
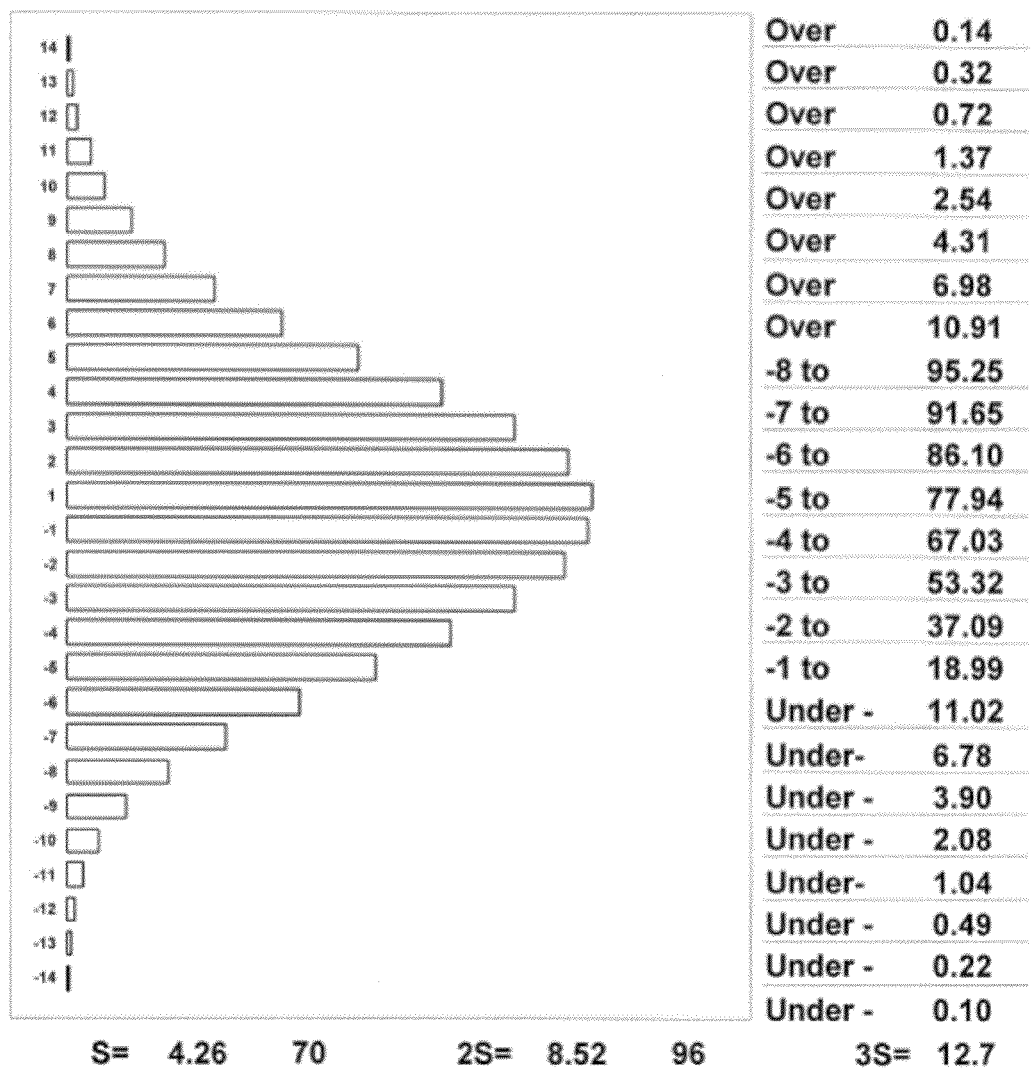
FIG. 15 shows an alternate Price Action Profile™ from a daily Value Chart™.
Figure 16:
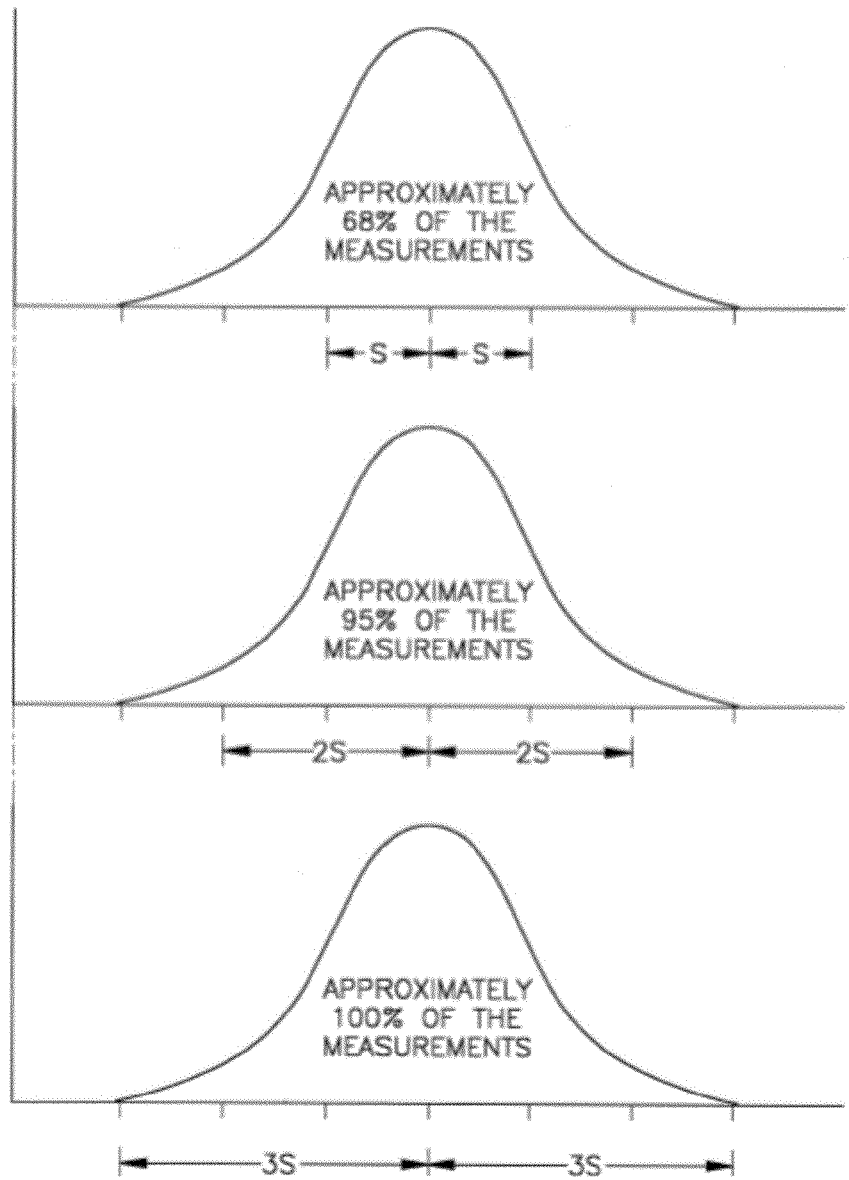
FIG. 16 shows The Empirical Rule describing normal (mound-shaped) Bell Curves.

It is noted that normal (or mound-shaped) bell curves tend to have approximately 68% of their distribution between ±1 standard deviation, approximately 95% of their distribution between ±2 standard deviations, and approximately all of the distribution within ±3 standard deviations (see FIG. 16). Because this is a rule of thumb, a rule that is observed to work in practice, it has been called the Empirical Rule (FIG. 16). The analysis displayed in FIG. 15 shows that the Soybeans Price Action Profile™ has approximately 70% of its distribution between +1 standard deviation (S=4.26), approximately 96% of its distribution between ±2 standard deviations (2S=8.52), and approximately 100% of its distribution within ±3 standard deviations (3S=12.78). These results qualify the Soybeans Price Action Profile™ as a statistically normal bell curve that would be useful in making inferences about future Soybeans Value Chart™ price activity.

The exact shape of the bell curve is not important because the rule will adequately describe the variability for mound-shaped distributions of data encountered in real life. The relative frequencies of mound-shaped distributions are largest near the center of the distribution and tend to decrease as you move toward the distribution tails. Because the ±4 Value Chart™ range closely resembles the ±1 standard deviation range and the ±8 Value Chart™ range closely resembles the ±2 standard deviation range on most Price Action Profiles™, these Value Chart™ ranges are discussed instead of standard deviation measurements, but these may be used alternatively.

Figure 17:
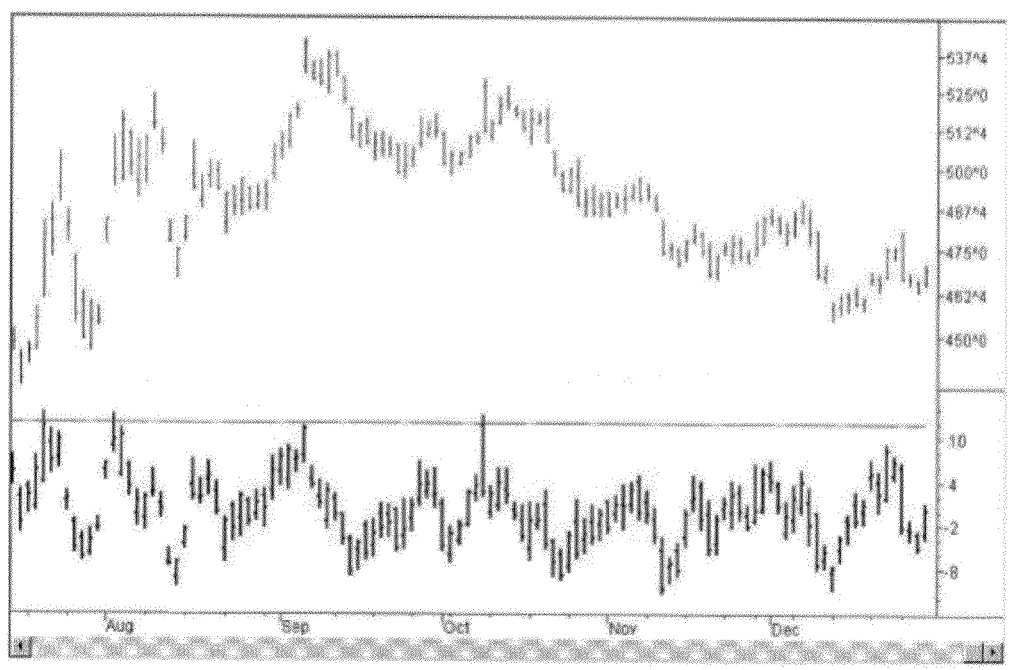
FIG. 17 shows a daily Value Chart™ with a +12 Value Chart™ line.
Figure 18:
FIG. 18 shows a daily Value Chart™ with ±2 Value Chart™ lines.
Figure 19:
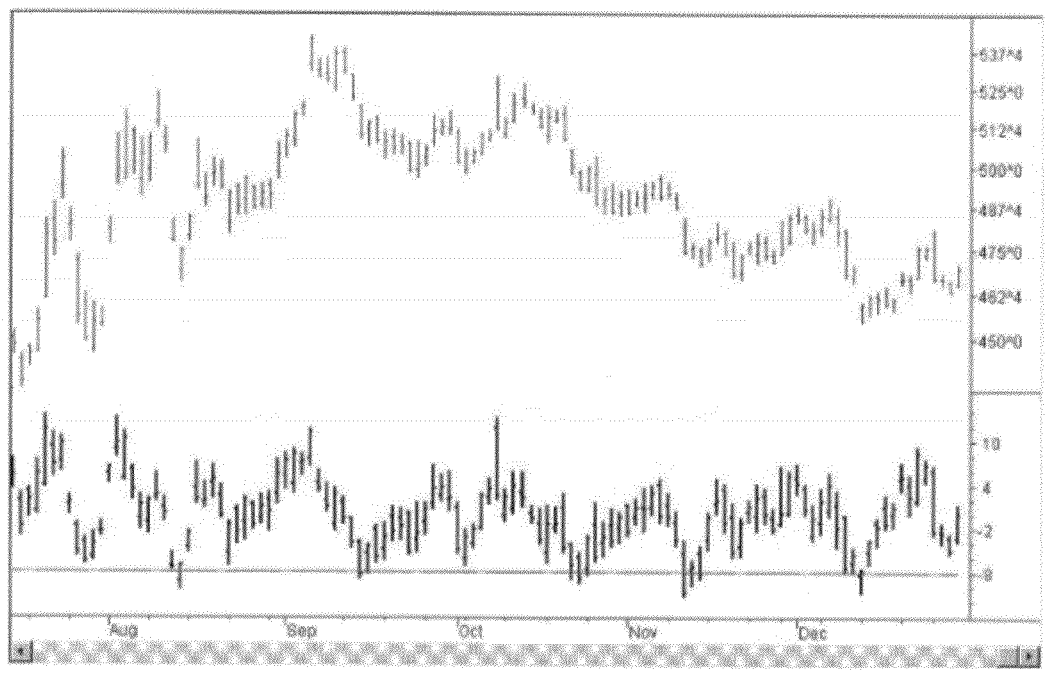
FIG. 19 shows a daily Value Chart™ with a −8 Value Chart™ line.

Referring to FIG. 15, we can observe an abundance of useful information from the Price Action Profile™ analysis of the Soybeans market. For example, it is seen from the column to the left of the Price Action Profile™ chart that the Soybeans Value Chart™ only trades above the +12 Value Chart™ price level 0.14% of the time (see FIG. 17). It is also seen that the Soybeans Value Chart trades within the ±2 Value Chart™ levels 37.08% of the time (see FIG. 18). Furthermore, the Soybeans Value Chart™ only trades below the −8 Value Chart™ level 2.08% of the time (see FIG. 19).

For the remainder of this description, Value Charts™ with lines located at the ±4 and the ±8 price Value Chart™ price levels are used. This is primarily because these Value Chart™ price levels approximately represent the ±1 standard deviation (approximately 68% of Value Chart™ price bars) and the ±2 standard deviation (approximately 95% of Value Chart™ price bars) ranges, respectively.

The Bell Curve as a Valuable Market Analysis Tool

Statistics have been a valuable tool in many different areas of business. The government is constantly releasing statistics about subjects ranging from crime to average life expectancies. Manufacturing companies rely on statistics to monitor quality control issues in their manufacturing plants. The objective of statistics is to make an inference about a population or data, based on information contained in a sample. When we refer to a population in the arena of statistics, we are referring to the set of all measurements of interest. A sample might be defined as a subset of measurements obtained from the population.

The value of bell curves in describing a sample, which should closely resemble the population, is that they are able to present information in the form of a chart. Charts are simply pictures of information. Charts effectively condense and describe information that is easily comprehended by both the novice and the veteran. The goal of traders is to have insight into how the market is behaving at present and how the market is likely to behave in the future. The Price Action Profile™ (Bell Curve) generated from the sample datum allows inferences to be made about the population of price datum (future price behavior).

Validating Value Charts™ with Price Action Profiles™

The key to allowing Value Charts™ to be useful over time is the volatility adjusted Value Chart™ intervals. These volatility-adjusted intervals (dynamic volatility intervals) allow a Value Chart™ to adapt to changing market volatility and therefore remain useful in quantifying relative overbought and relative oversold price levels. Therefore, similar Price Action Profiles™ (or Value Chart™ distribution bell curves) would be generated when Value Charts™ are applied to different markets even though the characteristics of individual markets might differ significantly.

Value Charts™ and Price Action Profile™, as market analysis tools, pass two important tests that verify confidence in them as valid technical analysis tools. First, Price Action Profiles™ (bell curves) generated from the Value Charts™ of several different markets are fairly similar. Second, a Price Action Profile™ generated from one decade of price datum is fairly similar to a Price Action Profile™ generated from another decade of price datum for any given market. As market volatility can change dramatically over time in any given market. The second test will verify that Value Charts™ can effectively adapt and remain useful when market volatility changes over time, as is often the case.

Comparing the Price Action Profiles™ of Different Markets

Generating a Price Action Profile™ from the Value Charts™ of several different markets is performed and the results are compared. The assumption is that the Price Action Profiles™ generated from several different markets will be very similar even though the characteristics of each individual market may be very different. For example, the Soybeans market tends to have huge bull markets that experience increasing volatility until the climatic top is reached where volatility reaches extreme levels. In addition, the Soybean market tends to have numerous weather scares in which the prices can erupt to the upside or downside with little notice. The Eurodollar market, on the other hand, tends to have smooth trends that reflect the long-term economic policies of the government. Although the Eurodollar market can at times become volatile, it tends to maintain a calm disposition when compared to the Soybean market. In comparing Price Action Profiles™, we would expect that the profiles from these significantly different markets to be very similar to the normal mound-shaped bell curve discussed in the Empirical Rule (FIG. 16).

Generating a Price Action Profile™ for each market, all of the historical datum that is commonly available for each market is preferably used. Because the futures markets have gaps between the prices of different contract months, a continuous adjusted contracts is created to perform the analysis. For each market under consideration, we will generate a Price Action Profile™ and calculate the corresponding profile characteristics as shown in the columns at the right hand side of FIG. 15. Analyze the Price Action Profiles™ from several futures markets obtained from different market sectors like the grains, foods, currencies, energies, metals, financial instruments, and stock indexes indicates there aspects of the invention. Furthermore, Price Action Profiles™ from several popular stocks are also analyzed. Analyzing a sample of vastly differing markets indicates the universal effectiveness of the Value Chart™ and Price Action Profile™ concepts. Displayed in FIG. 21, a table compares the characteristics of all of the Price Action Profiles™ generated from the markets shown in these examples.

As the Price Action Profile™ analysis table displayed in FIG. 21 is reviewed, the similarities in the characteristics of the price distributions from each market are recognized. Observe the percentage of the Value Chart™ price bars fall between the ±4 and the ±8 Value Chart™ price levels for each different market.

After reviewing FIG. 21, which represents a comparison of all of the Price Action Profiles™ from the different markets in this comparison, it is seen that all of the bell curves for these different markets are very similar. These markets represent a very diverse group of markets that have significantly different characteristics. However, their Price Action Profiles™ are very similar. All of the Price Action Profiles™ generated from these different markets have very similar standard deviations, equal to approximately ±4.33. One standard deviation from the mean of a normal mound-shaped bell curve should contain approximately 68% of the sample data, which in this case is daily price bars. Reference FIG. 21 for the following observations. The Price Action Profiles™ in this study on average contain 69.9% of the daily Value Chart™ price bars within ±1 standard deviation from zero. Furthermore, two standard deviations from the mean of a normal mound shaped bell curve should contain approximately 95% of the sample data. The Price Action Profiles™ on average in this study contain 96.3% of the daily Value Chart™ price bars within ±2 standard deviation from zero. The Price Action Profile™ analysis displayed in FIG. 21 confirms that Value Charts™ are effective in adapting to significantly different market environments.

Further, the Price Action Profiles™ generated from several different markets were very similar. Recalling that the Price Action Profile™ simply represents the distribution of the Value Chart™ price activity for a market, the table of results displayed in FIG. 21 demonstrate that all of these markets have very similar Value Chart™ price distributions. Therefore, regardless of the market being analyzed, Value Charts™ as a market analysis tool is effective in identifying relative overbought, oversold, or fair value price levels. From this, a convention for how overbought, oversold, and fair value Value Chart™ price levels (see FIG. 22) can be defined.

Figure 23A:
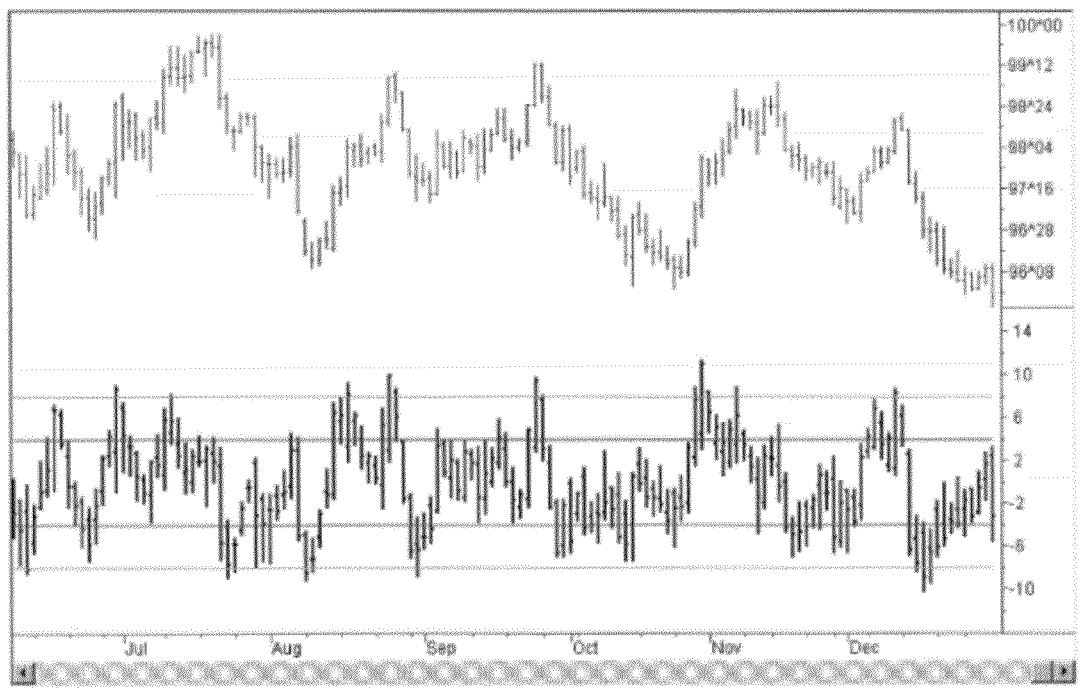
FIG. 23a shows a Daily Treasury Note price chart (above) and Value Chart™ (below).

As stated above, all Value Chart™ prices within the ±4 Value Chart™ price levels will be considered fair value. This fair value range represents approximately the range±1 standard deviations from the mean, or zero. Value Chart™ prices that trade between the +4 and +8 or −4 and −8 Value Chart™ price levels will be considered moderately overbought or moderately oversold, respectively. These moderately overbought and moderately oversold ranges represent approximately the range of Value Chart™ prices between ±1 standard deviations from the mean and ±2 standard deviations from the mean. Value Chart™ prices that trade above the +8 or below the −8 Value Chart™ price levels will be considered significantly overbought or significantly oversold, respectively. These significantly overbought and significantly oversold ranges represent approximately the range of Value Chart™ prices outside of ±2 standard deviations from the mean, or zero. Now observe this convention on a sample Value Chart™ in FIGS. 23a and 23b.

Comparing the Price Action Profiles from Two Different Decades

Another important attribute of the Value Charts™ market analysis concept is seen in analyzing the market activity from two different decades and comparing the Price Action Profiles™ generated from these different periods of time. Each time period will include approximately ten years worth of daily price bar datum in the examples shown. As you know, market volatility can significantly change from one decade to the other. During the 1980s the S&P 500 market traded around the 250 point level. During the 1990s the S&P 500 market traded up to the 1400 point level. Given the significantly different volatility characteristics from these two different decades, Value Chart™ should be able to effectively adapt to either decade and successfully identify overbought and oversold price levels. The S&P 500 Price Action Profiles™ from these two different decades should be very similar as Value Charts™ effectively adapted to the continually increasing volatility in the market.

The daily volatility of the S&P 500 futures market trading around the 1400 point level will be significantly greater than the daily volatility of the S&P 500 futures market trading around the 250 point level. If the Price Action Profiles™ from these two different decades are similar, then we will reason that the dynamic volatility intervals in the Value Charts™ are able to effectively adapt to changing volatility in the markets.

The table found in FIG. 24 display the Price Action Profile™ analysis results from the S&P 500 futures market during the 1980s (SP80) and the 1990s (SP90). The analysis used to generate each column in the table utilizes approximately ten years of daily bar chart price datum. For example, the first column in FIG. 24 labeled "SP80" displays the Price Action Profile™ analysis from the daily S&P 500 Value Chart™ price bars recorded in the 1980s. The next column displays the Price Action Profile™ analysis from the daily S&P 500

Value Chart™ price bars recorded in the 1990s. As you can see, the interval ranges representing (−4 to +4) and (−8 to +8) have bold dotted lines around them. This is because the ±4 on the Value Chart™ is approximately one standard deviation from the mean and ±8 on the Value Chart™ is approximately two standard deviations away from the mean. It is seen that the results from these two different decades of trading activity (FIG. 24) are similar. In the 1980s, the Value Chart™ range from −4 to +4 contained 69.5% of the Value Chart™ price bars while in the 1990s this same Value Chart™ range contained 69.8% of the Value Chart™ price bars. Further, the fact that during 1980s and the 1990s the range from −8 to +8 contained 96.8% of the Value Chart™ bars, representing identical distribution measurements indicates the adaptive nature of the invention. These results are achieved even though the volatility increased so dramatically during the 1990s in the S&P 500 futures market.

Figure 25:
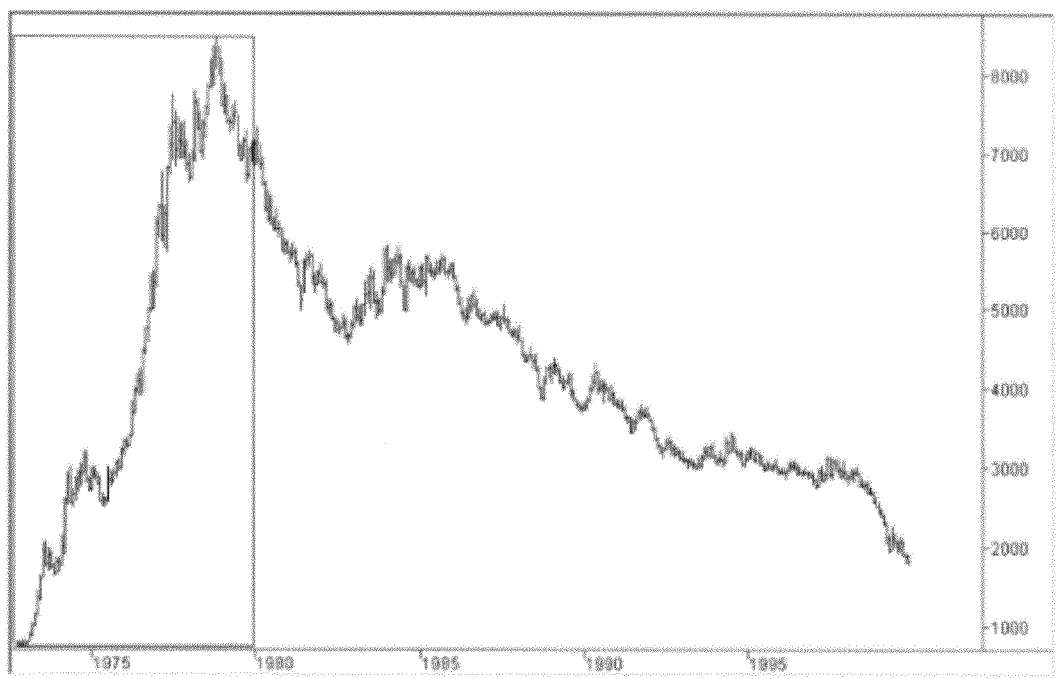
FIG. 25 shows a Monthly price chart of Cocoa (box encloses the 1970s).

It is possible for the Price Action Profiles™ from two different decades in a given market to differ more significantly than the Price Action Profiles™ did from the S&P 500 example. For example, the Cocoa market in the 1970s experienced an explosive decade long bull market. However, Cocoa in the 1980s and the 1990s experienced a prolonged bear market (see FIG. 25).

Figure 20:
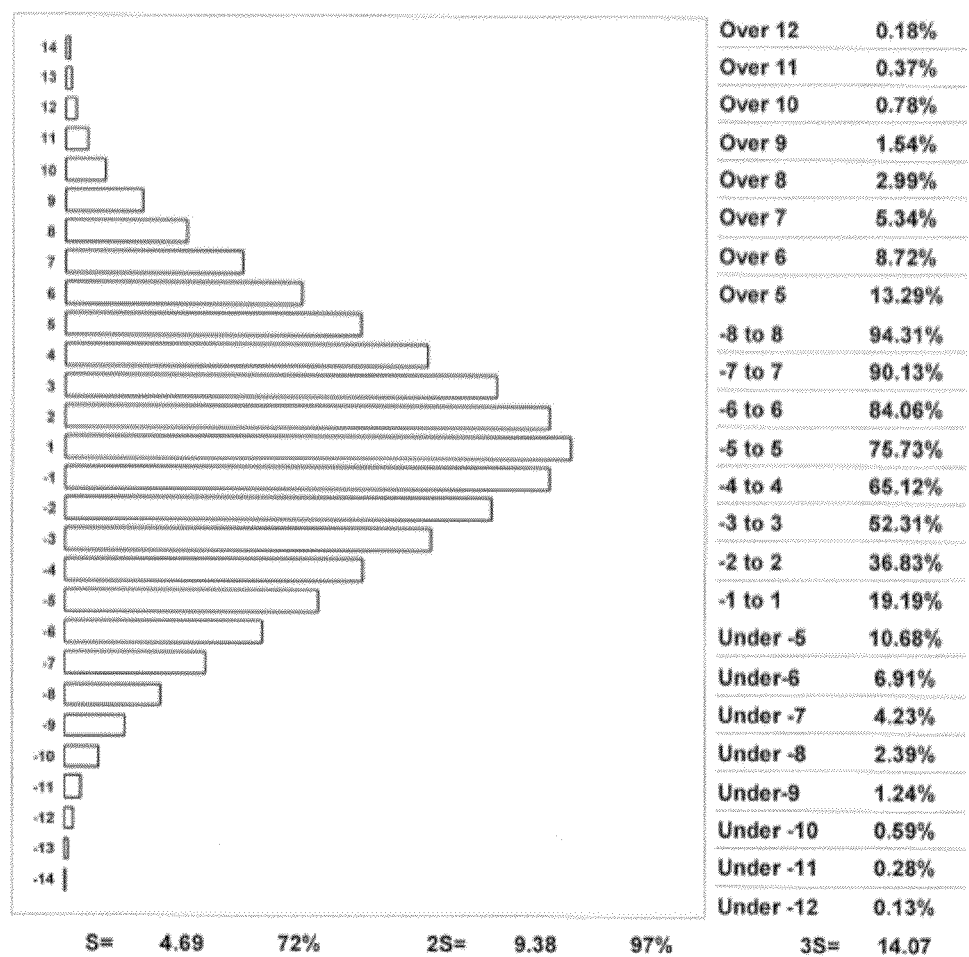
FIG. 20 shows a Price Action Profile™ from a daily Value Chart™.

We would expect the Cocoa Price Action Profile™ from the 1970s, generated from daily Cocoa Value Charts™, to be skewed so that more than 50% of the profile would appear in the positive Value Chart™ intervals. In the 1980s and the 1990s the profile should appear to be more normal in appearance. Often differences in the Price Action Profiles™ from two different time periods can be explained by major prolonged bull or bear markets. When a Price Action Profile™ is generated from a long enough time period that is inclusive of up and down market cycles, it should appear very similar to those displayed in FIGS. 15 and 20.

As previously indicated, any type of price datum, including, but not limited to, tick charts, bar charts, candle stick charts, point & figure charts, any type of price charts, technical charts and charting indicators, can be converted to Value Charts™. Traditional bar charts typically include the Open, High, Low, and Close prices (with respect to zero). Value Charts™ plot the Open, High, Low, and Close prices with respect to a defined "floating axis".

The floating axis can be defined as any function of price. The distance that price lies away from the floating axis is directly related to the degree of buying and selling that has come into the market at that time. We will designate F as the function that generates our floating axis values. The function (F) is user defined and can be any function of price. In our example, F will be defined as a five-day moving average of the median price in each of the five latest price bars. Value Charts™ can be easily customized because we have the capability to use any function of price that we want for the floating axis. However, the sensitivity to price change that the user desires will dictate how many price bars (or price data points) will be taken into consideration in the calculation. The ability to customize the function for the floating axis gives the user the power to tailor PAP's and VC's to his own specifications. It should be noted, however, that certain functions of F produce better Price Action Profiles™, or bell curves, from the Value Chart™ price behavior.

Exemplary Floating Axis Calculation $$M=\text{Median Price}=(H+L)/2$$

$$F=\text{Floating Axis Function}=(M+M[1]+M[2]+M[3]+M[4])/5$$

Brackets denote number of days ago: [Number of days ago]

Example: M[1]=Median price from one day ago (yesterday)

Once the floating axis has been defined, we must define an interval to represent the unit value on the y-axis (dynamic volatility unit). This dynamic volatility unit will be used to define the point value for the Value Chart™. This interval can be any function of price. However, these dynamic intervals should be designed to expand and contract along with changing market volatility. We will denote our interval function as function (DVU). Like the function F for the floating axis, the function DVU is user defined and can be any function of price. For our example, we will define the DVU as a function that generates a dynamic volatility unit by taking a five-day moving average of a bar's trading range (H-L) or today's close minus yesterday's close, whichever is greater, and then dividing this value by 5. DVUs give Value Charts™ the ability to adapt to changing market volatility. This allows Value Charts™ and Price Action Profiles™ to be effective in defining overbought and oversold price levels in changing volatility conditions.

Exemplary Dynamic Volatility Unit Calculation $$R=(\text{Price Range})=(H-L) \text{ or } (C-C[1]) \text{ \{The greater of the two values\}}$$

$$A=\text{Average 5-Day Price Range}=(R+R[1]+R[2]+R[3]+R[4])/5$$

$$DVU=\text{Dynamic Volatility Unit}=A/5$$

Brackets denote number of days ago: [Number of days ago]

Example: R[1]=Price Range one day ago (yesterday)

Value Charts™ will assume that the x-axis will reflect time. The y-axis on the Value Charts™ will be defined in terms of volatility units. The x-axis on Price Action Profiles™ will be defined in terms of DVUs. The y-axis of Price Action Profiles™ will be defined as a percentage of the relative frequency of occurrences of Value Chart™ price bars contained in each corresponding dynamic volatility unit.

Now that the floating axis function (F) and the dynamic volatility unit function (DVU) are defined, a Value Chart™ and Price Action Profile™ can be generated. It is important to note that Value Charts™ can plot any price chart. Price Action Profiles™ simply represent the distribution of Value Chart™ prices across the dynamic volatility unit range. For our examples we will use traditional bar charts to create the Value Charts™ (VCs) and Price Action Profiles™ (PAPs). The next step in creating a VC and a PAP is to convert the traditional price values of the Open, High, Low, and Close from their absolute values to their corresponding Value Chart™ values. Again, there also is the ability to take tick datum, candlestick charts, or any price datum, and generate Value Charts™ and Price Action Profiles™. VCs can be charted as bar charts, tick charts, candle stick charts, or any other price representation that mirrors (if desired) the traditional chart being transposed. The major unit value on the x-axis of the Value Chart™ will be the designated time interval of the traditional price or bar chart being converted as defined by the user (i.e. Weekly, Daily, 5-Minute, etc.). VCs can be plotted either with (preferable) or without the traditional chart that it is being calculated from. Typically, when viewing a bar chart, if you move one unit to the right or left on the x-axis (time axis) of a Value Chart™, you will move to the same corresponding time interval on the traditional chart that will preferably be displayed above the VC. The major units on the y-axis will be equal to one unit as defined by the dynamic volatility unit function (DVU). We will convert the bars (prices datum) as follows:

Exemplary Calculation of Value Chart™ Prices with Dynamic Volatility Intervals

VCopen=Value Chart Open=(Open-F)/DVU

VChigh=Value Chart High=(High-F)/DVU

VClow=Value Chart Low=(Low-F)/DVU

VCclose=Value Chart Close=(Close-F)/DVU

VCprice=Value Chart Price=(Price-Floating Axis)/(Dynamic Volatility Unit)

Once the absolute price datum has been converted to Value Chart™ prices, the Value Chart™ can be generated by simply plotting the values on a chart with time reflected on the x-axis and Value Chart price reflected on the y-axis, which is defined in terms of dynamic volatility units.

Finally, in creating a Price Action Profile™, it is determined how often the Value Chart™ prices trades in each dynamic volatility unit interval. In other words, we need to determine the frequency that the Value Chart™ price has traded in each dynamic volatility unit range (sector.) Once we know the frequency that Value Chart™ price has traded in each sector, we can create a Price Action Profile™. Calculating a frequency diagram from tick datum simply involves summing up all of the tick values for each sector and, if desired, dividing that sum by the total number of ticks to give a percentage of price ticks in each sector or a relative frequency histogram. For these examples, price bars are used. We will not concern ourselves with the distribution of trading activity within each individual price bar, although this can be taken into consideration for more advanced Price Action Profile™ studies.

Figure 31:
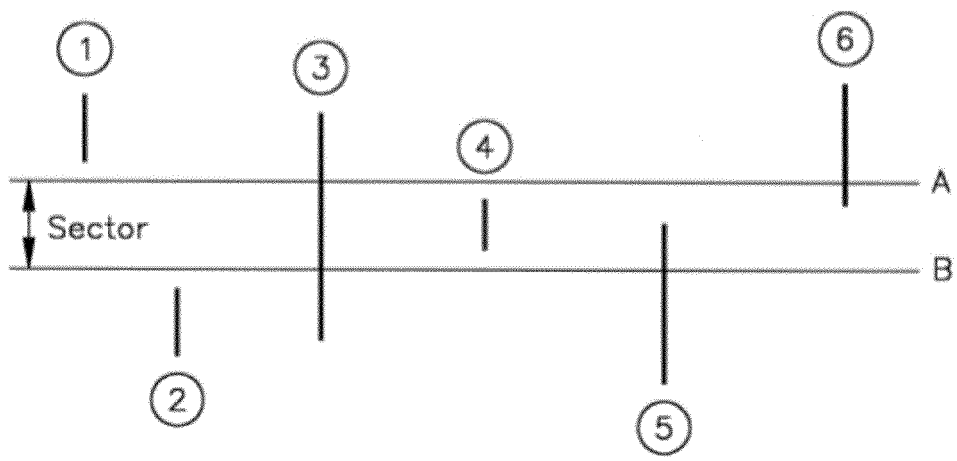
FIG. 31 is a diagram that illustrates six different ways a price bar can trade relative to a Value Chart™ interval.
Figure 32:
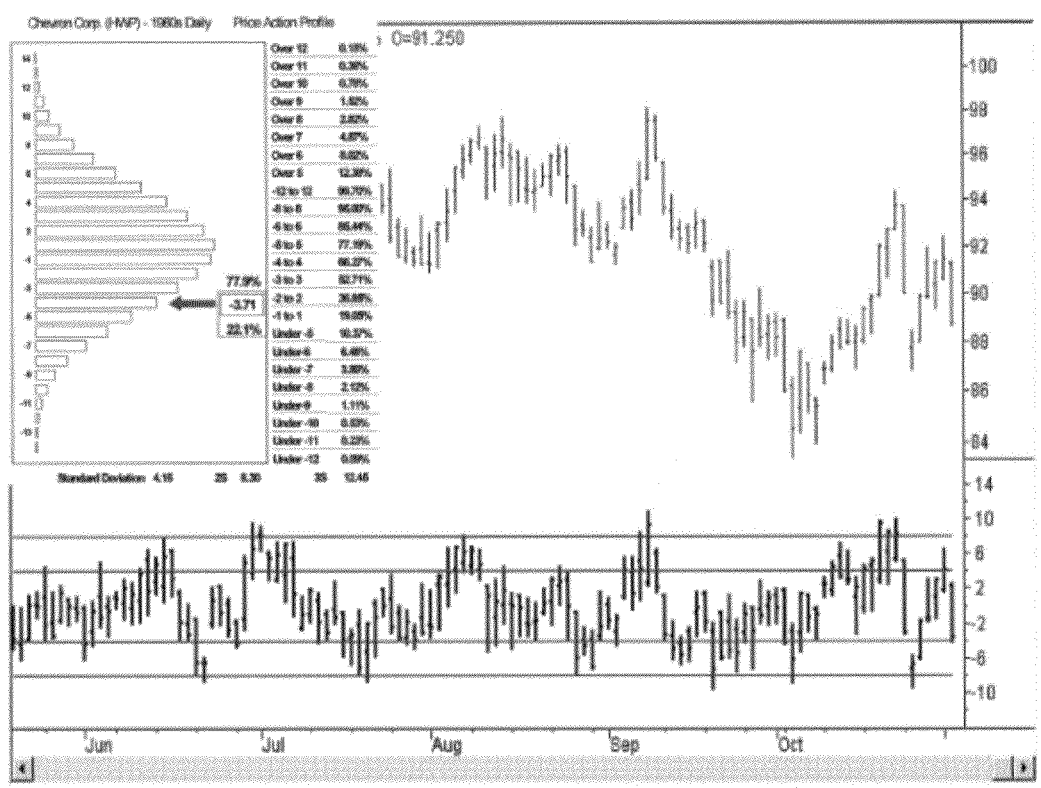
FIG. 32 is an example trading screen of the Value Charts™ and Price Action Profile™ concept applied to a daily chart of a market.
Figure 33:
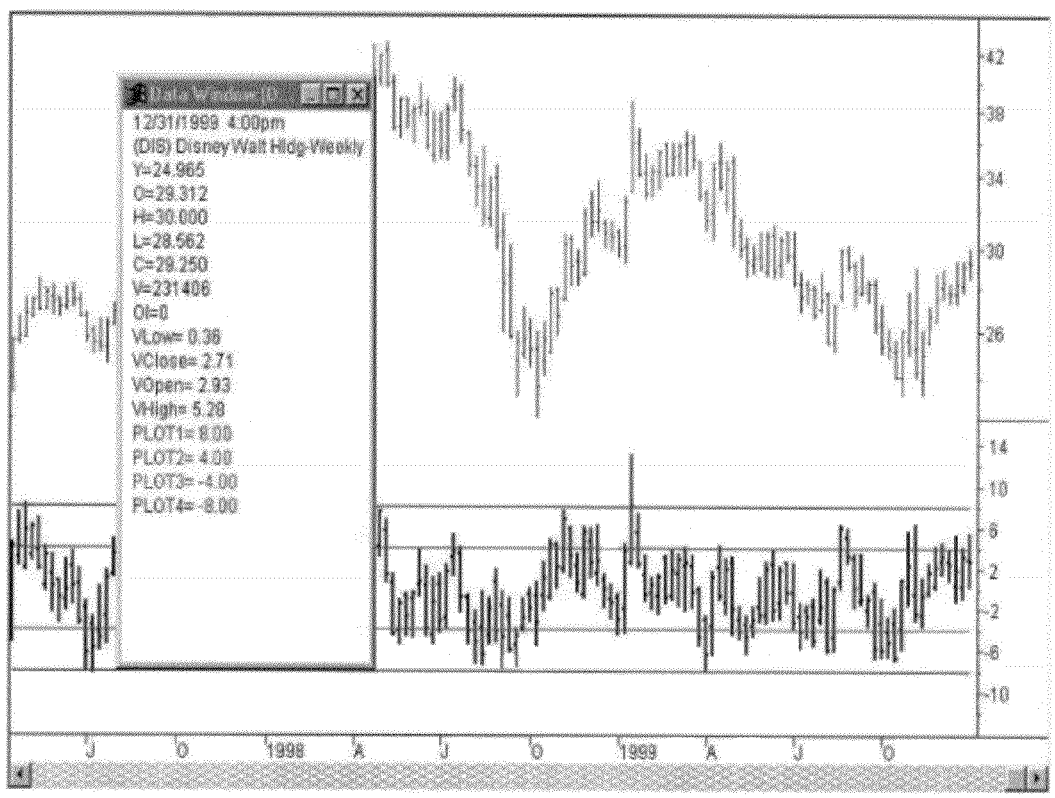
FIG. 33 is an example trading screen of the Value Charts™ concept applied to a weekly chart of a market (data window is displayed).
Figure 34:
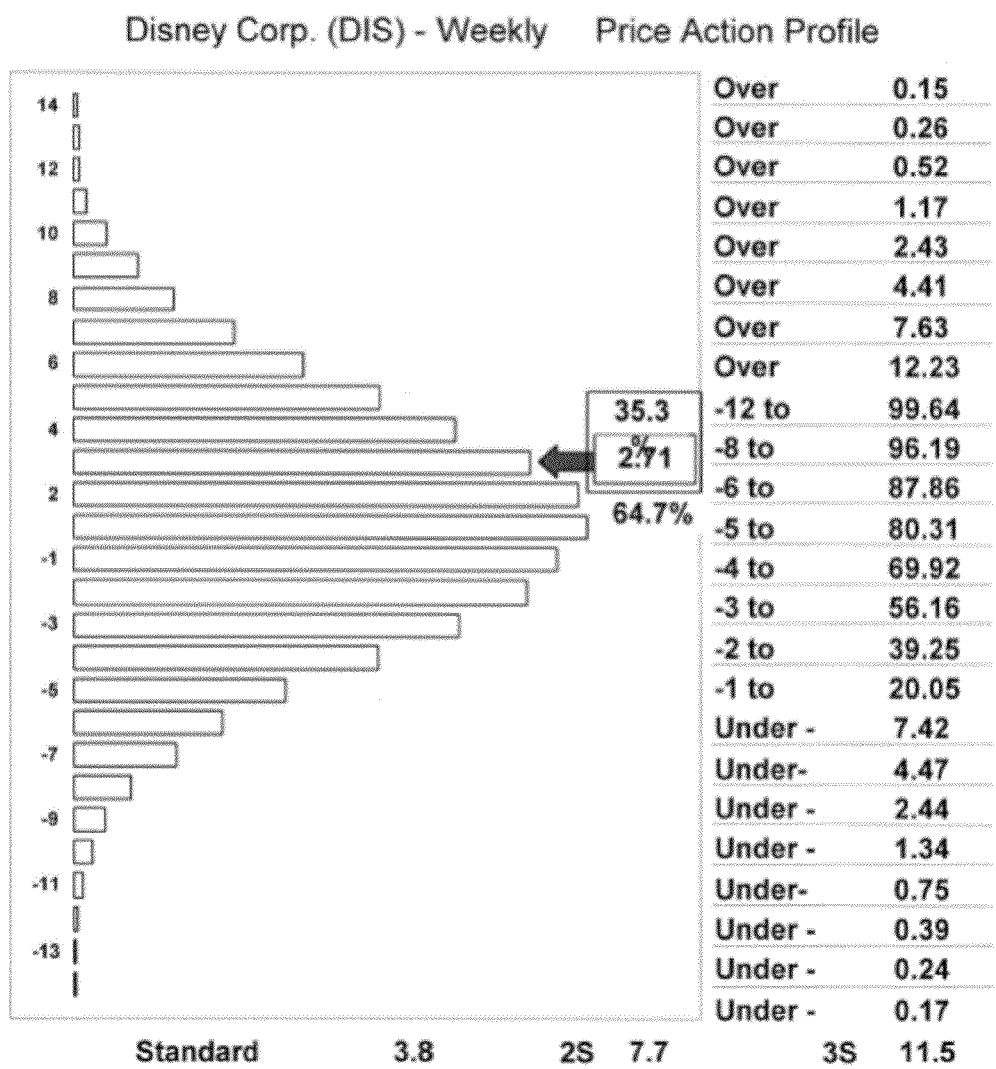
FIG. 34 is an example trading screen of the Price Action Profile™ concept applied to a weekly chart of a market (displayed in FIG. 33).
Figure 35:
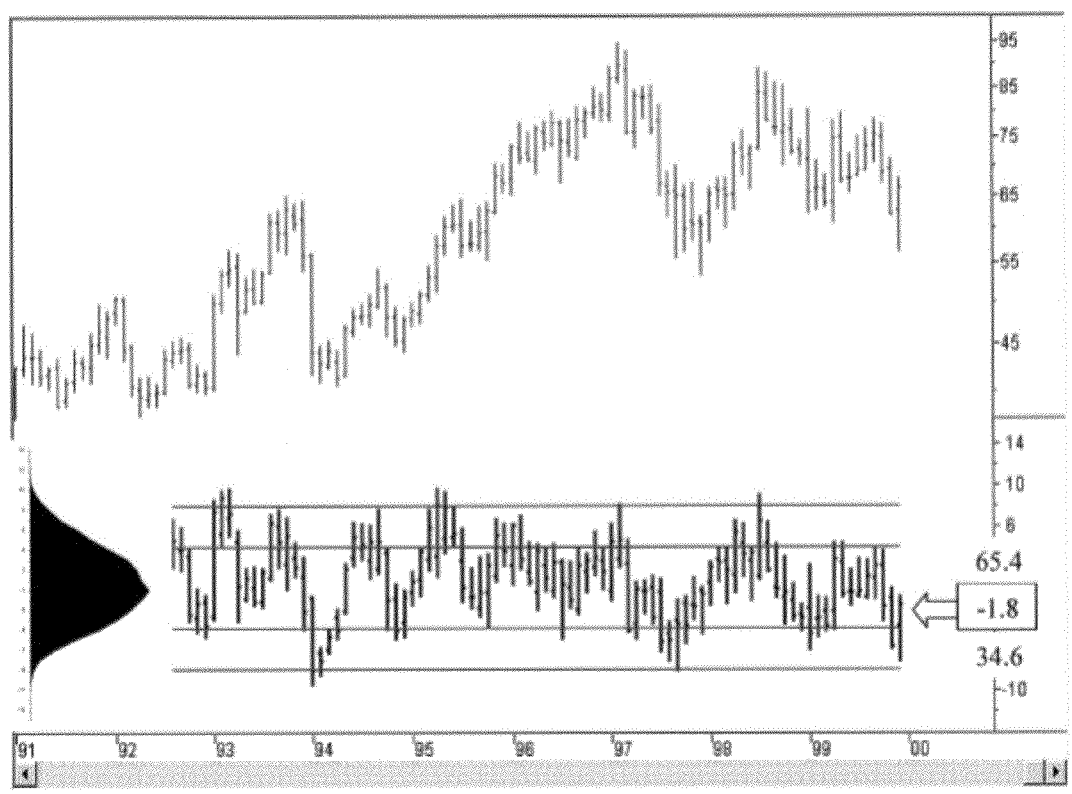
FIG. 35 is an example trading screen of the Value Chart™ and Price Action Profile™ concept applied to a monthly chart of a market.
Figure 36:
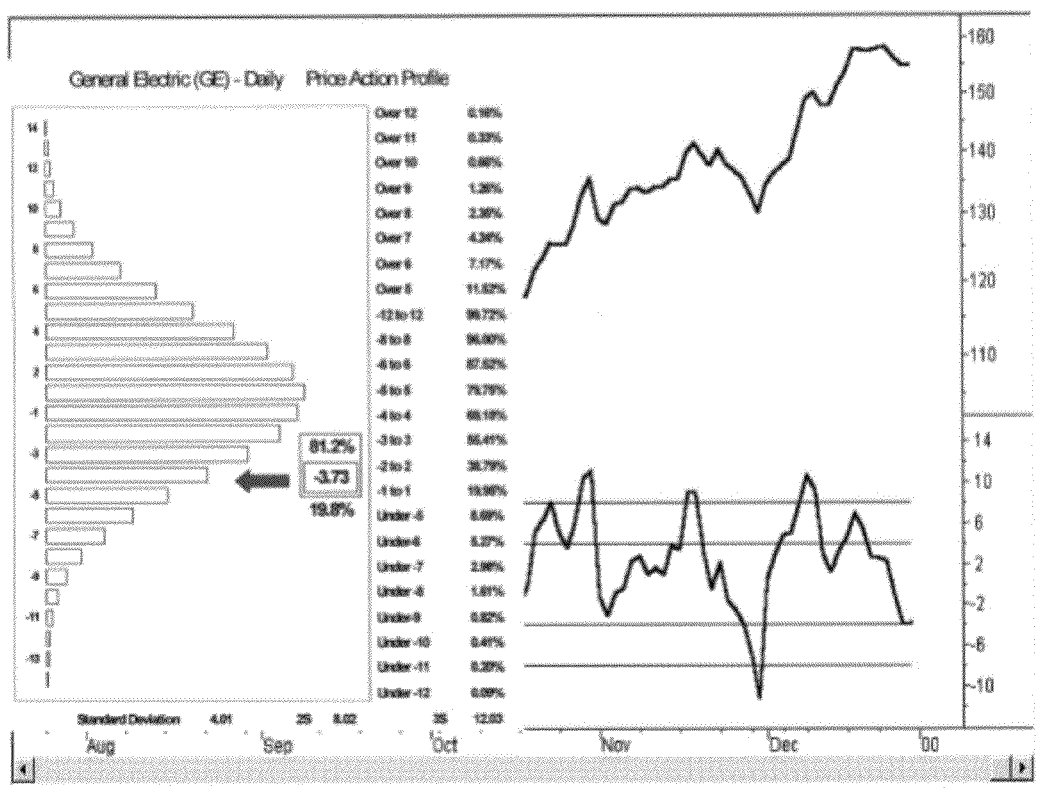
FIG. 36 is an example trading screen of the closing price and the Value Chart™ close and Price Action Profile™ (line) concept applied to a daily chart of a market.
Figure 37:
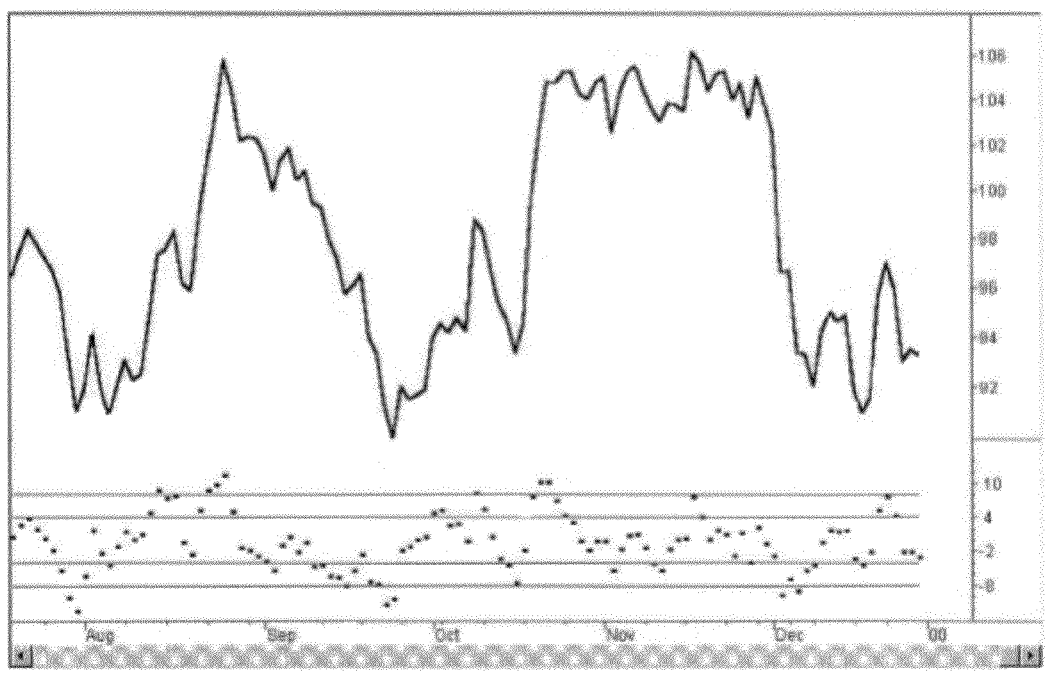
FIG. 37 shows an example trading screen of the closing price and the Value Chart™ close concept applied to a daily chart of a market.

As illustrated in FIG. 31, there are six different scenarios to consider when determining what percentage of a price bar has traded in each DVU interval range. We will define the area between two interval lines on the y-axis as a Sector (Dynamic Volatility Unit Interval Range) The six scenarios are listed below:

1) Bar located above sector:
2) Bar located below sector:
3) Bar passes all of the way through sector:
4) Entire bar is inside of sector:
5) High of bar is in sector and low of bar is below sector:
6) Low of bar is in sector and high of bar is above sector:

Using If-Then logic, we will determine what percentage of each bar lies in each corresponding sector. If we were analyzing tick data points, we would simply count how many tick data points occurred within each sector.

$N^P$=Percentage of the bar that is located in the P sector.
P=Sector Number (i.e. P=1 is the 1$^{st}$ sector between 0 and +1)
A=Top interval value of sector.
B=Bottom interval value of sector.
A–B Sector range or Dynamic Volatility Unit Interval (or major unit)
VCP=Value Chart price (i.e. VCL=Value Chart low, VCH=Value Chart high)
1) If VCLow>A then $N^P$=0.
2) If VCHigh<B then $N^P$=0.
3) If VCHigh>A and VCLow<B then $N^P$=(A–B)/(VCH–VCL)
4) If VCHigh<A and VCLow>B then $N^P$=100%
5) If VCHigh>B and VCLow<B then $N^P$=(VCH–B)/(VCH–VCL)
6) If VCLow<A and VCHigh>A then $N^P$=(A–VCL)/(VCH–VCL)

Once we are finished determining where each bar is located (or divided across the sectors), then we can create a Price Action Profile™ bell curve (frequency diagram.) The Price Action Profile can be displayed as a smooth bell curve, frequency histogram, relative frequency histogram, etc. To determine what percentage of trading occurred in each Value Chart™ sector, we simply take the sum of all of the partial or complete trading ranges $\Sigma(N^P)$ that traded in that particular sector and divide by the total number of bars.

Percentage of trading in a sector=$\Sigma N^P$/(total # Bars)

Once we calculate the percentage of trading in each sector then we can create a Price Action Profile™ bell curve (frequency diagram.) (See FIG. 23b for example diagram.) Note that we will position the Price Action Profile™ (displayed in FIG. 23b) so that the histogram sectors are aligned with the Value Chart™ dynamic volatility unit intervals.

When a Price Action Profile™ is generated from the price datum of any stock, futures, or bonds, markets (etc.) and from the formulas displayed above, the resulting bell curve displays statistically valid bell curve attributes. Most importantly, the bell curves generally contain approximately 68% of the price distribution within one standard deviation and approximately 95% of the price distribution within two standard deviations (See Empirical Rule in FIG. 16). If these profiles of Value Chart™ price activity were generated on a non-volatility adjusted basis, the resulting profile would resemble a thorn shaped profile (See FIG. 13b) and would therefore have little practical application. However, the volatility adjusted price intervals create a statistically valid bell curve that can be used to make statistical inferences on future market activity (see FIG. 14b).

Practical Application

There are numerous potential applications of the Value Charts™ and Price Action Profile™ concepts. These concepts can be used either independently or in conjunction with a traditional bar or price chart or other market indicators and charting techniques. Listed below are several example applications of these innovative new concepts.

Identifying Low Risk Exposure Market Entry (or Exit) Points Using Value Charts™

Now that the creation of Value Charts™ and Price Action Profiles™ is understood, different examples of how these market analysis tools can be applied to the markets are described. One of the most powerful applications of the Value Charts™ and Price Action Profile™ concepts lies in the ability to identify optimal entry points in a trending market (see FIG. 26). Upon examining a S&P 500 Price Action Profile™, we observe that the S&P 500 futures market only trades below the –6 Value Chart™ price level 4.87% of the time. Amazingly, nine out of seventeen buy opportunities that were identified in FIG. 26 had no risk exposure to loss for the 100 days plus following each buy signal. The other eight buy opportunities identified in FIG. 26 experienced minimal risk exposure during the several days following each buy signal. The –6 Value Chart™ price level was selected because it appeared to work well in identifying low risk buy points in several past S&P 500 bull markets. It is important to note that the S&P 500 bull market example in FIG. 26 represented the ideal conditions for this particular trading strategy.

Figure 26:
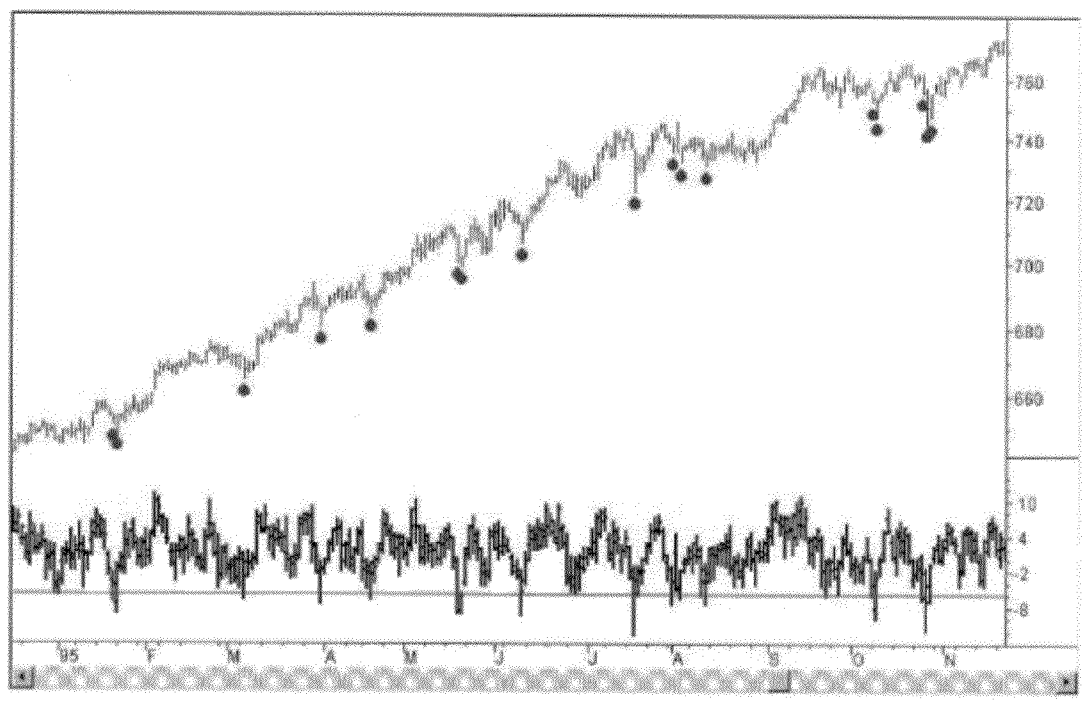
FIG. 26 shows Buy points (identified by Value Charts™) with low risk exposure.
Figure 27:
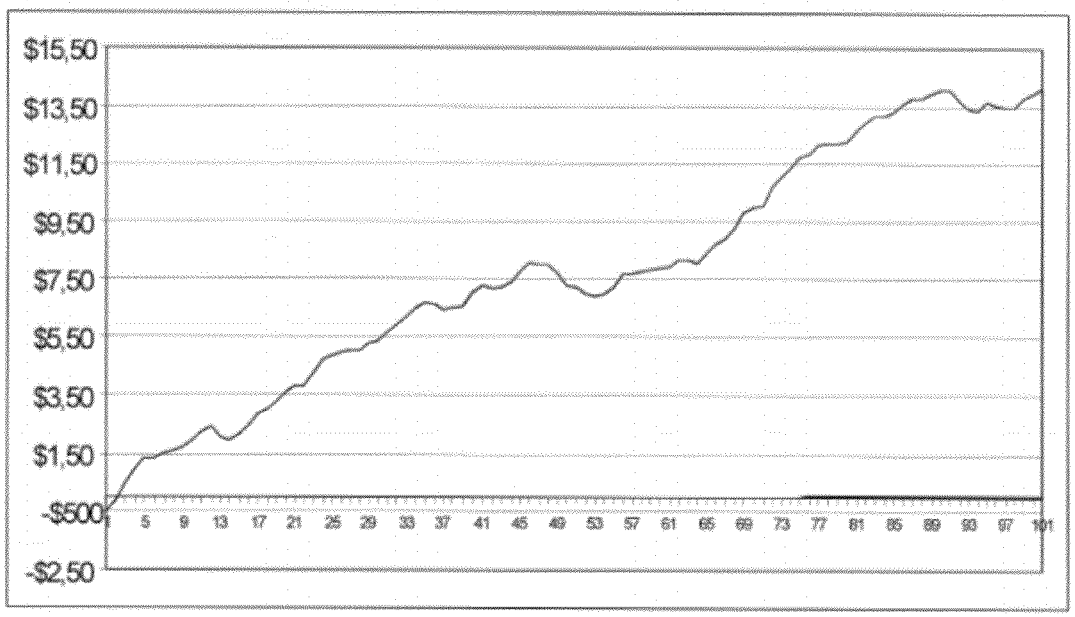
FIG. 27 shows Average worst exposure profitability graph from buy points in FIG. 26 (x-axis represents days following average market entry).

Now that we have demonstrated that Value Charts™ has the ability to identify low risk exposure market entry points, we can view the average worst exposure profitably graph (FIG. 27) generated from all seventeen buy points in FIG. 26. FIG. 27 simply subtracts the Value Chart™ entry buy price from the low price of the 100 days following each market entry point. All seventeen profitability graphs are then averaged to form FIG. 27. Note that Value Charts™ allowed us identify seventeen low risk exposure buy points, as verified by the profitability graph in FIG. 27. Although the S&P market was in a strong bull market during the 1995 calendar year, Value Charts™ was very successful in identifying many optimal buy points in this particular bull market.

The average worst exposure profitability graph in FIG. 27 represents the average profitability of each of the seventeen buy points from FIG. 26 for the 100 days following each buy signal. Incredibly, within three days from each point where the S&P 500 futures traded below the −6 Value Chart™ price level, the average trade was profitable. The buy signals in FIG. 26 are as close to the perfect buy signals as one would hope to attain. FIG. 26 also serves as an example of how traditional bar chart bars can be "flagged" with a dot (or arrow, etc.) when certain Value Chart™ price levels are penetrated.

Figure 28:
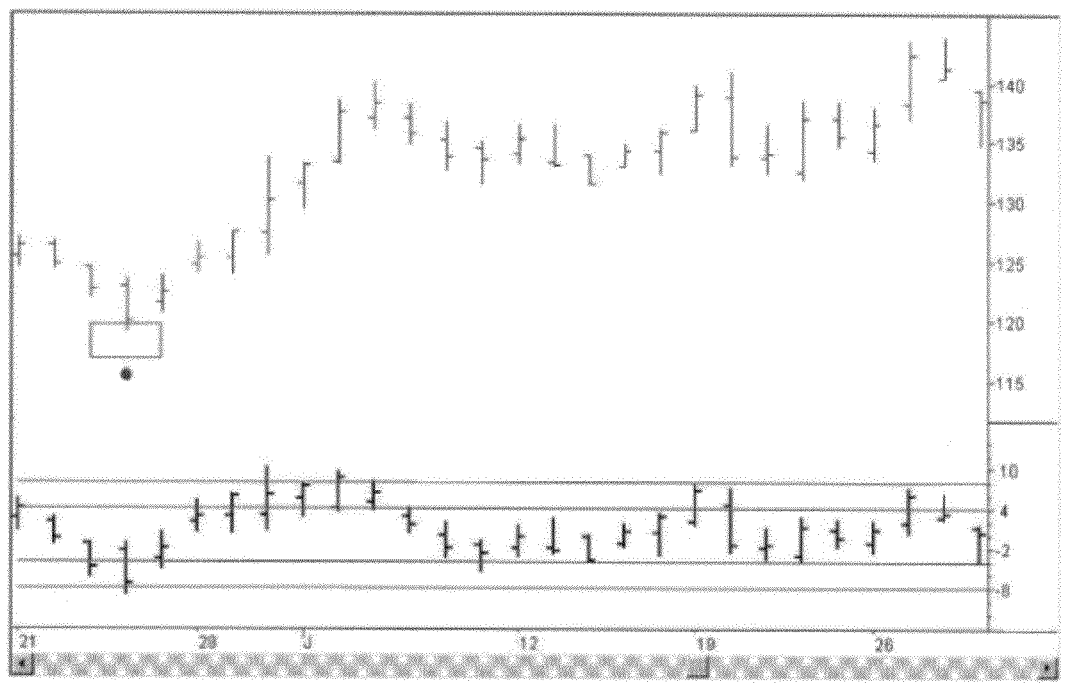
FIG. 28 shows Low risk exposure buying point on daily American Express price chart.

The buy signal displayed in FIG. 28, generated from trading activity that penetrated below the −8 Value Chart™ price level on an American Express daily chart, included the bottom $0.50 portion of the American Express price bar on Jun. 24, 1999. The maximum exposure to loss was a $0.50 short-lived losing period between the entry level ($119.635) on Jun. 24, 1999, and the low of the same trading day ($119.125). This position became immediately profitable after the signal day and soon generated profits of $18.25 per share as American Express closed seven days later (on Jul. 6, 1999) at a price level of $138.25. Although the trading signal displayed in FIG. 28 was an ideal scenario, it nevertheless exemplified the potential that Value Charts™ and Price Action Profile™ have to identify low risk exposure market entry price points. These powerful market analysis tools can also be used to identify market exit points also. Value Charts™ and Price Action Profile™ can be used in conjunction with any other effective market analysis tools in order to develop powerful trading strategies.

Designing Trading Systems with Value Charts™

Figure 29A:
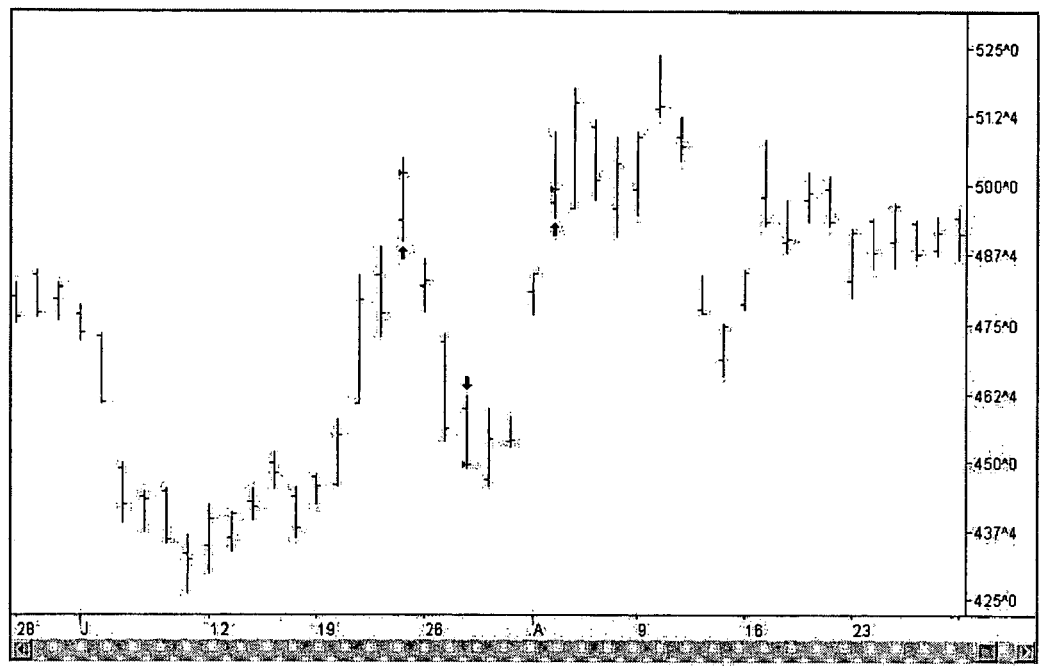
FIG. 29a shows Trend-following system whipsawed in Soybeans.

The buy and sell signals in FIG. 29a, which displays daily price bars from the Soybeans futures market, were generated from a stop-and-reverse trading system. As seen, the buy and sell signals in FIG. 29a were initiated at undesirable price levels. An analysis of these trades can be found in the table displayed in FIG. 30.

Figure 29B:
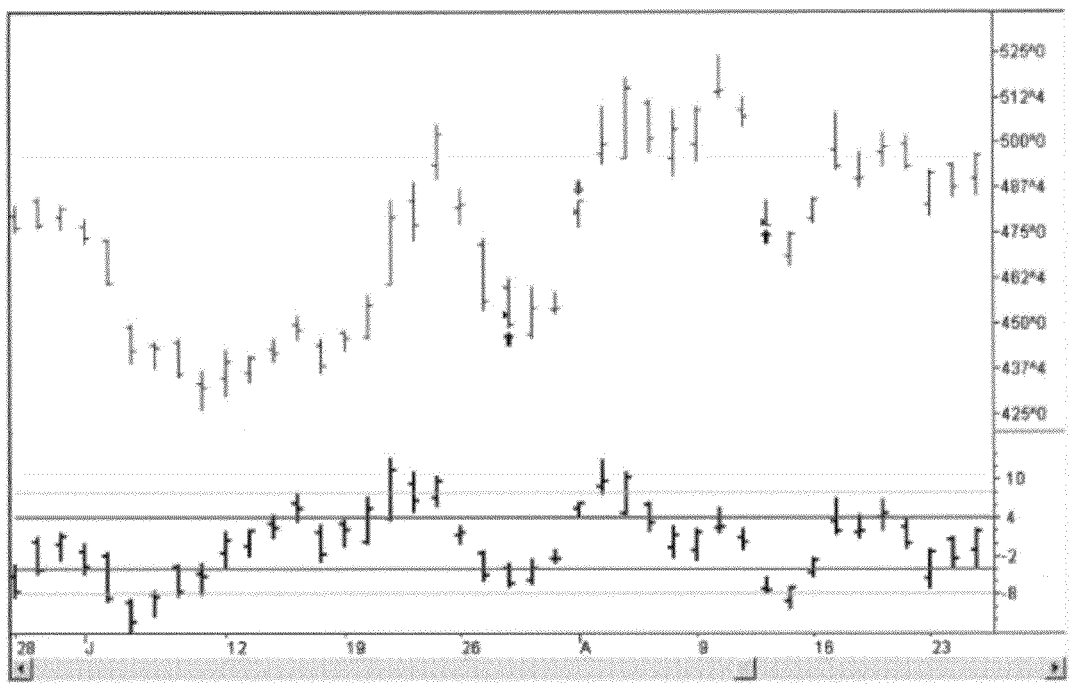
FIG. 29b shows how Value Charts™ can improve fill prices in choppy markets.

The trend-following system displayed in FIG. 29a performed poorly during the choppy Soybeans market that unfolded during the summer of 1999. Trend-following systems often incur losses during choppy market conditions. With the development of Value Charts™, there is now the ability to quantify relative price levels that can potentially improve the performance of trading systems during choppy climates like these. The trading signals generated from the enhanced trend-following system (displayed in FIG. 29b), which utilizes the power of Value Charts™ and Price Action Profile™, were significantly improved with better entry and exit price levels over the normal trading system signals. Instead of acting on the buy and sell signals generated from the trend-following system, we waited until the Value Chart™ price penetrated the −6 Value Chart™ price level for buy signals and the +6 Value Chart™ price level for sell signals. Thus; original trading system was used as a filter and used Value Chart™ price levels to enter and exit the Soybeans market. As we can see from the table listed in FIG. 30, the total savings realized from the improved entry prices was $5,100 per contract. Both of the normal buy signals listed in the top half of the table in FIG. 30 were signaled at significantly overbought relative price levels. This is evident by the fact that the Soybeans market has historically traded at or above these overbought relative price levels only 1.37% of the time. The normal sell signal was generated at a moderately oversold Value Chart™ price level in which the Soybeans market only trades at or below 6.78% of the time.

The user can determine when to activate the Value Chart™ enhanced version of the trading program. There is also discretion in determining the Value Chart™ price level at which a trader will enter a choppy market. The present invention provides a powerful tool that can be incorporated into any trading approach. The concepts can be used to exit trading positions at profit targets and pyramid into large positions. There are literally thousands of different examples of how these powerful concepts can be incorporated into trading approaches and trading systems, and the invention contemplates and allows integration into any such system.

Tracking the Overbought or Oversold Condition of Hundreds of Markets

Utilizing Value Charts™ and Price Action Profile™, we now have the ability to define relative value for any market. We now have the ability to scan through literally thousands of stocks, bonds, futures, etc. markets to identify significantly overbought or significantly oversold markets (see FIGS. 22 and 23b). Having the ability to define relative value allows us to write programs that trigger alarms or alerts when any market reaches an overbought, oversold, or fair value price level. We can then use this capability to track and trade in more markets. Once we receive an alarm signaling, for example, that a market that we want to buy has just penetrated an oversold (undervalued) Value Chart price level, we can move in and enter the market with precision.

Although there are many potential applications of this concept, several additional practical applications are described below:

1) An elementary application for any investor will be to simply use the Value Bars™ in conjunction with the Price Action Profile™ to quickly and easily identify statistically attractive buying and selling price levels. These charts are powerful in that they give an investor the ability to rapidly process (at a glance) relative value in a market at the current price level. PAPs and VCs can identify overbought, oversold, or fair value with changing market volatility. Traditional bar charts do not in themselves give investors the ability to do this. Even the novice, who knows virtually nothing about statistics, can utilize this information by observing how overbought or oversold a particular investment is. Also, these charts can be used in determining where not to buy. Often investors get caught up in chasing overextended markets where they buy at overbought or sell at oversold price levels. These trades often result in high risk exposure trades. When the inevitable price correction comes, they get driven out of the market with a loss even though they may be right about the long-term direction of the market. Depending on the size of the investment, this information might result in the savings of thousands, even millions of dollars.

2) Both the Value Charts™ and the Price Action Profile™ can be easily customized. For example, an investor can choose to customize any one of the following setups (and many more):

Floating Axis=any function that involves price or price and time.

Dynamic Volatility Units=Dynamic Volatility Units can use any function of price or price and time.

Time Period=Bar charts, candle stick charts, etc. can be customized to any time frames (monthly, weekly, daily, 60-minute, etc.) This makes Value Charts™ very flexible.

It should be noted that this concept works better on some time frames versus other time frames. The Price Action Profile™ should confirm the validity or lack of validity for every customized Value Chart 3) When evaluating a daily Value Chart™, for example, the investor can display both the weekly Price Action Profile™ at the left end of the screen and display a daily bar chart on the weekly Value Chart™ axes. Users therefore can set the PAP to a weekly (or longer time period) chart and the VC to a weekly chart, which would be plotted on the weekly scale. A daily Value Chart™ can then be plotted on the weekly Value Chart™intervals. This allows investors to track daily Value Bars™ on a weekly scale (or against a weekly bell curve.)

4) Many trading system developers have traditionally used the open and close of the day to generate trading signals because these prices were the only basic quantifiable price datum that have been available to drive trading systems. Now, in addition to using the open and close of the day, system developers can generate buy and sell commands from quantifiable Value Chart™ price levels. This ability to quantify relative overbought, oversold, or fair value price levels literally allows trading system developers to significantly expand the set of quantifiable values that can be used to drive a systematic trading system. For example, a trading system designer might type "If Value Chart price trades at or below −2 then Buy 1 contract at the market. Exit the long position when the Value Chart price trades above +3"

5) Many time investors have a good fundamental picture of where a market is going to trend. However, they have not had the tools to buy or sell at attractive low risk exposure price levels. Now, a bullish fundamental trader can accumulate a stock when the Value Chart™ gets oversold (undervalued) or simply reaches fair value. This new strategic market entry strategy would prove to get the investor in the market at much more desirable price levels than an arbitrary market entry approach. They can now identify low risk exposure market entry and exit points. Traders can complement VCs and PAPs with a momentum indicator for the purpose of identifying key market entry or exit price levels.

6) Value Chart™ price levels can be used to customize the appearance of any traditional bar chart or price chart. For example, normal or traditional bar chart sections (one bar can have different colors if it trades across several Value Chart™ price levels) or price chart values can be displayed with different colors corresponding to the different overbought, oversold, or fair value price levels on the Value Chart™. These colors can be defined by the user. Bar charts or price charts can be colored different colors corresponding to how may standard deviations they trade away from the floating axis or mean. Traditional price bars (or price in any form) can be "flagged" when certain conditions are met.

7) The Price Action Profile™ can be customized to reflect the distribution of price, with respect to any user defined floating axis, for any set of price datum. This set of datum could simply reflect the datum used to chart the traditional bar or price being analyzed or reviewed. If the price datum of the market being reviewed is limited, the Price Action Profile™ can access a file with more extensive price history of the market being analyzed and use this more extensive data to generate more extensive Value Chart™ history, and then a more accurate Price Action Profile™ (bell curve or frequency diagram). The user may use customized formula (or condition) to define when to collect price datum for the Price Action Profile™. For example, a user could define a condition that only collected price datum when the market price or price bar was trading above the 30-Day moving average of the closing price for that market and thus deemed to be in a bull or rising market. These Conditional Price Action Profiles™ are useful in defining the characteristics of a market when in a bull market, for example, as defined by a user defined bull market condition.

8) Users can place a Performance Stop™ in the market for the purpose of exiting their position if their expectations are not met. For example, "If Value Chart™ price does not exceed +5 before 5 days after the market entry date then exit the long position at the close." In other words, traders can track Value Chart™ price to confirm that their expectations were being met.

9) With the power of computers to track literally hundreds of stocks, bonds, or futures markets at a time, Price Action Profile™ and Value Charts™ can be used to track the overbought or oversold level of every market that an investor is interested in tracking. A mutual fund manager can track the average overbought or oversold level of every stock that he or she trades and compare this to the overbought or oversold level of any stock index for any given day, week, month, etc. Another example could include the case where an investor has his or her computer sound an alarm if a particular market reaches a particular Value Chart™ price level.

Figure 38A:
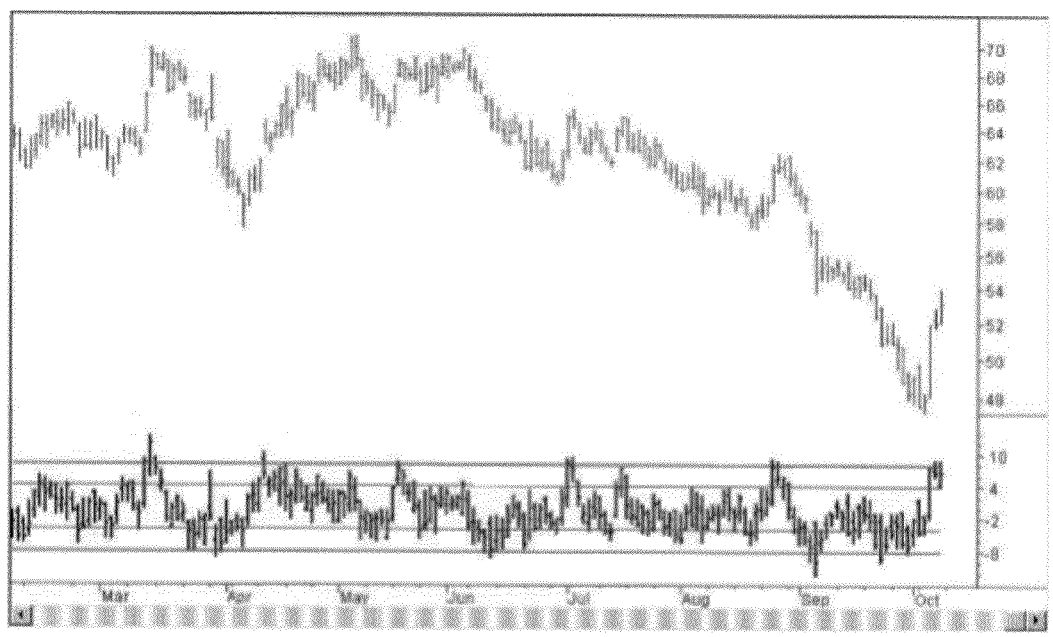
FIG. 38a shows daily Coca Cola with Value Chart™.
Figure 38B:
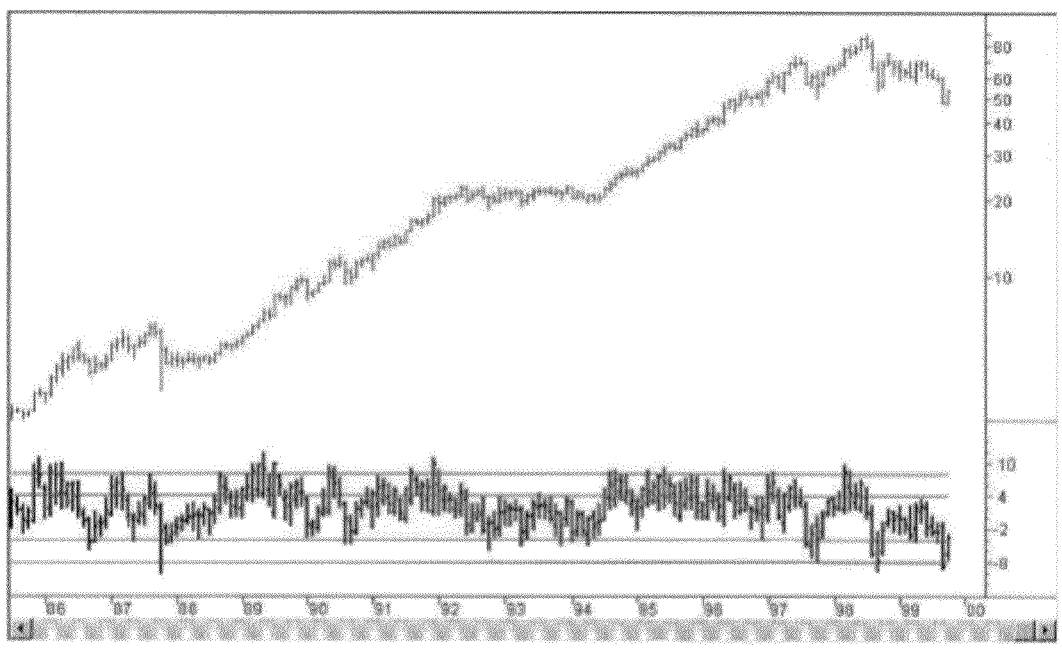
FIG. 38b shows monthly Coca Cola with Value Chart™.
Figure 39:
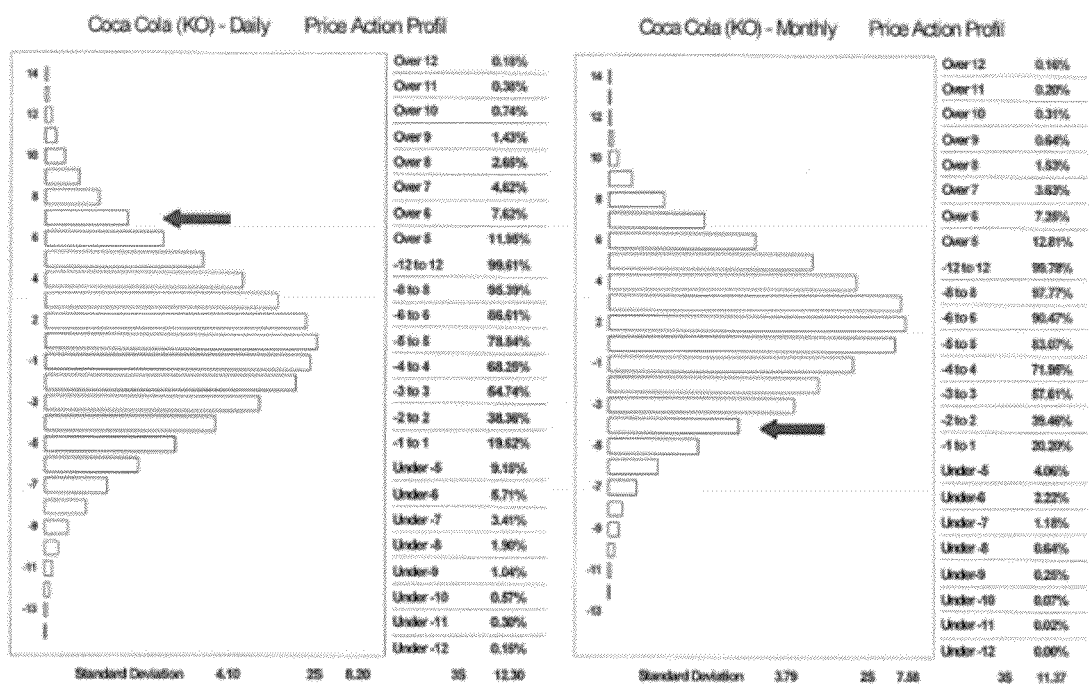
FIG. 39 shows Price Action Profiles™ of Daily and Monthly Coca Cola Value Charts™ through Oct. 8, 1999.

10) An investor can track the overbought or oversold state of a market across several timeframes. For example, in FIG. 38a the daily Value Chart™ is displayed for Coca Cola and in FIG. 38b the monthly Value Chart™ is displayed for Coca Cola. Both charts end on Oct. 8, 1999. FIG. 39 displays the Price Action Profiles™ for both for both of the Value Charts™ displayed in FIGS. 38a and 38b. The daily Coca Cola chart closed at the 6.67 Value Chart™ price level while the monthly Coca Cola chart closed at the −3.55 Value Chart™ price level. As you can see, on Oct. 8, 1999, Coca Cola was moderately overbought on a daily basis and slightly oversold on a monthly basis. Value Charts™ and Price Action Profiles™ from several different time frames can be displayed in any combination on a single screen or display.

11) A screen, or Time Valuation Grid, can be displayed for a market (FIGS. 40 and 41) to show the most recent Value Chart price with respect to the Price Action Profiles from several different time frames in the same market (5-minute, 30-minute, daily, weekly, etc.). This would give an investor the ability to quantify the overbought or oversold level of a market across several different time frames.

12) A screen, or Market Valuation Grid, can be displayed for several markets (FIGS. 42 and 43) to show the most recent Value Chart price, for each market, with respect to the Price Action Profiles from each market under consideration. This would give an investor the ability to quantify the overbought or oversold levels of several different markets at the same time. The same or different time frames can be displayed for the markets. The Market Valuation Grid and the Time Valuation Grids can be combined to form a single grid if desired.

Figure 44:
FIG. 44 displays a Value Chart™ transposed into an absolute chart shown on the bottom portion thereof.

13) Value Chart prices can be transposed back to an absolute basis to form a volatility adjusted bar chart (see FIG. 44).

This can be accomplished by simply adding the new Value Chart price bar values to the previous day's volatility adjusted (or transposed) close. Using the Value Chart™ formulas, a volatility adjusted absolute chart can be generated by simply adding the Value Chart™ open, high, low, and close prices to the previous Value Chart™ close. In other words, instead of plotting Value Chart™ prices with respect to the floating axis, this new volatility adjusted absolute chart at the bottom of FIG. 44 adds the next price bar (price) to the previous bars close.

Figure 40:
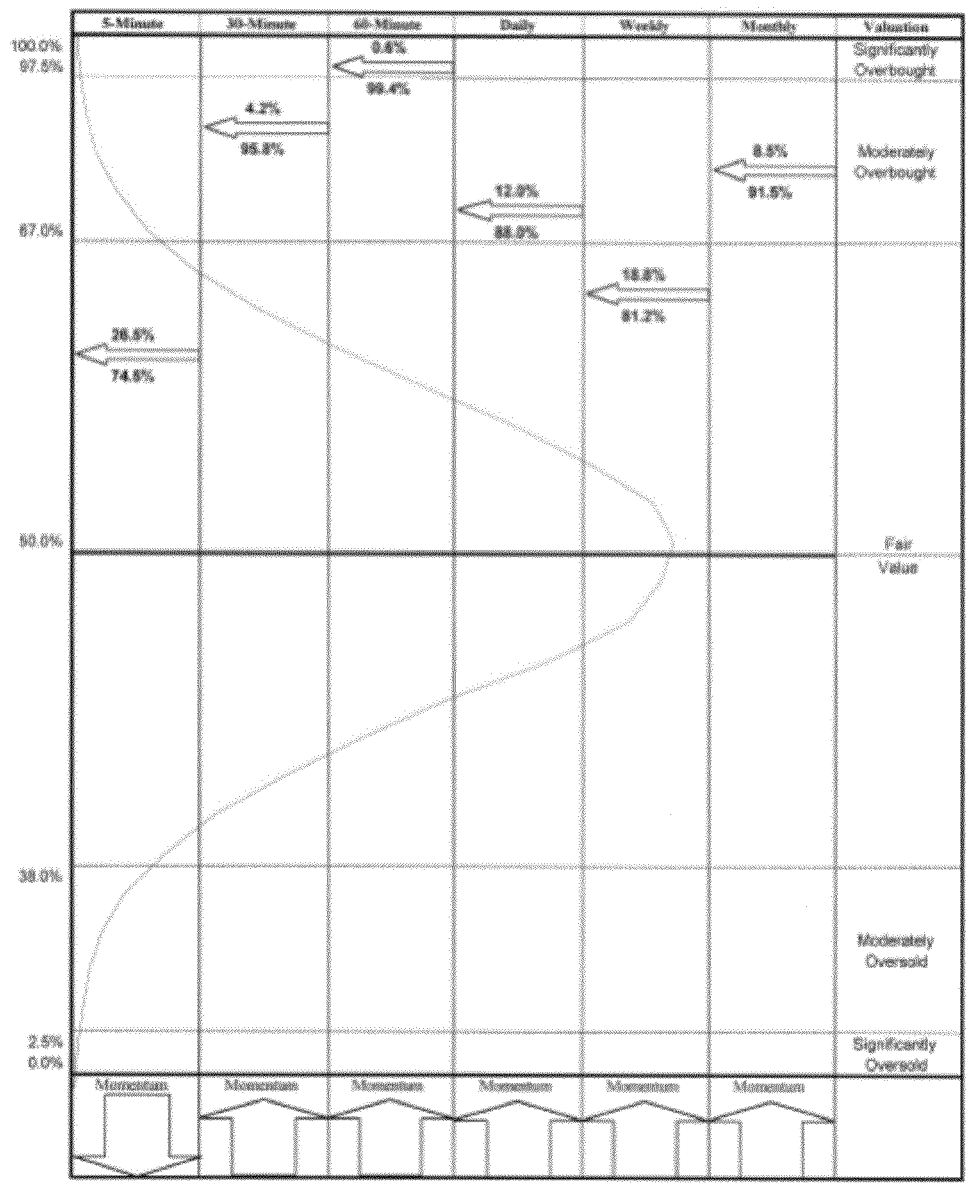
FIG. 40 displays the current valuation of the Crude Oil market across several different timeframes as defined by Price Action Profile™.

The current valuation of the crude oil market over different time frames is shown in FIG. 40. The arrows display how overbought or oversold Crude Oil is on, for example, the daily timeframe (see arrow under "daily" column). In this case, Crude Oil trades above this overbought state 12.0% of the time and below this overbought state 88% of the time. The fair value section, as defined by plus or minus one standard deviation, is colored green, the moderately overbought and oversold section, as defined by plus or minus one standard deviations to plus or minus two standard deviations, is colored yellow, and the significantly overbought and oversold section, defined as beyond plus or minus two standard deviations, is colored red. The momentum arrows at the bottom of each column indicate increasing upward momentum (up arrow colored green), decreasing upward momentum (up arrow colored yellow), increasing downward momentum (down arrow colored red), and decreasing downward momentum (down arrow colored yellow).

Figure 41:
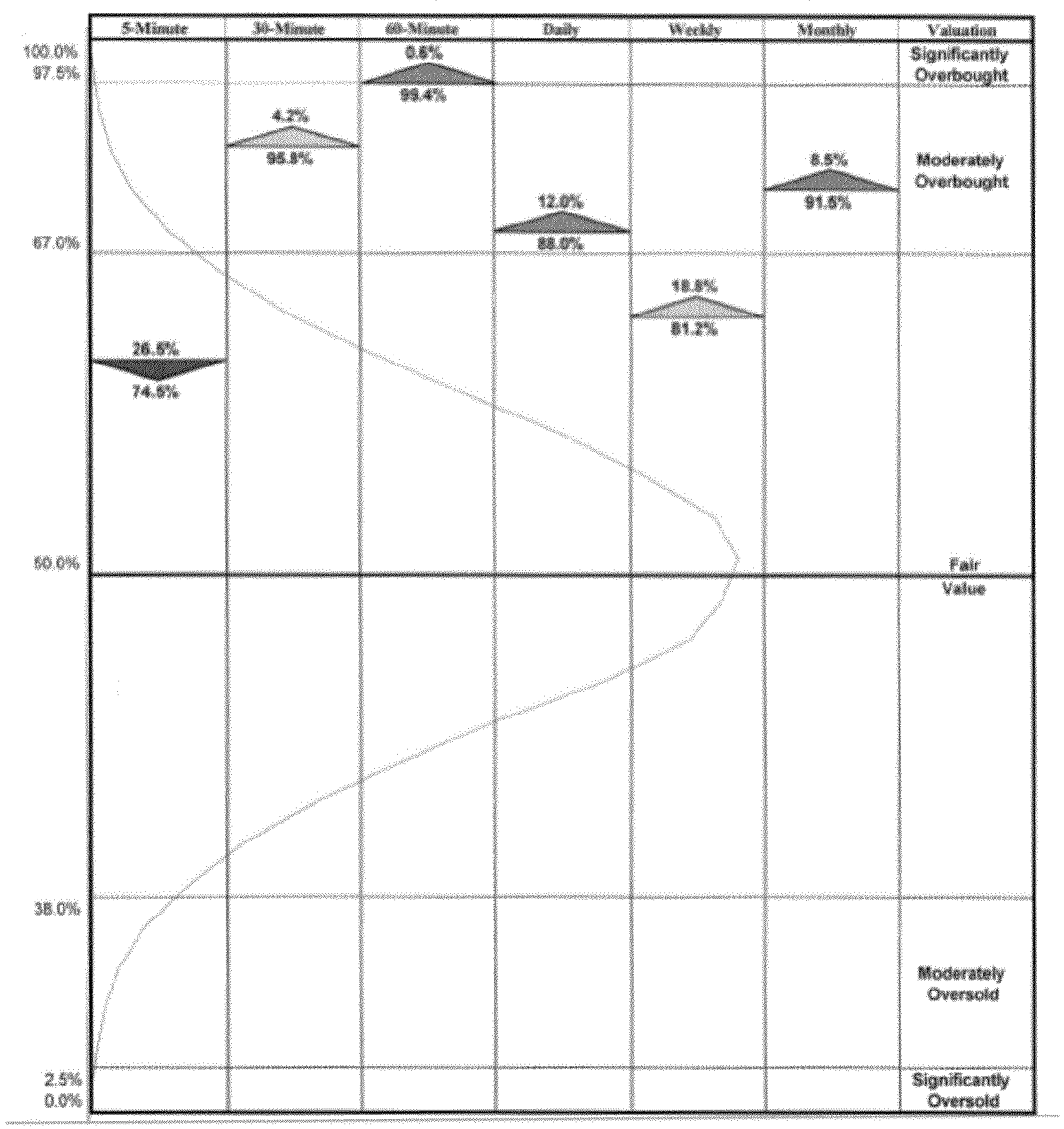
FIG. 41 displays the current valuation of the Crude Oil market across several different timeframes as defined by Price Action Profile™.

The current valuation of the crude oil market over different time frames is shown in FIG. 41. The arrows display how overbought or oversold Crude Oil is on, for example, the daily timeframe (see arrow under "daily" column). In this case, Crude Oil trades above this overbought state 12.0% of the time and below this overbought state 88% of the time. The fair value section, as defined by plus or minus one standard deviation, is colored light green, the moderately overbought and oversold section, as defined by plus or minus one standard deviations to plus or minus two standard deviations, is colored green, and the significantly overbought and oversold section, defined as beyond plus or minus two standard deviations, is colored dark green. The momentum arrows located in each column represent valuation of each time period with respect to the corresponding Price Action Profile™ and, in addition, indicate increasing upward momentum (up arrow colored green), decreasing upward momentum (up arrow colored yellow), increasing downward momentum (down arrow colored red), and decreasing downward momentum (down arrow colored yellow).

Figure 42:
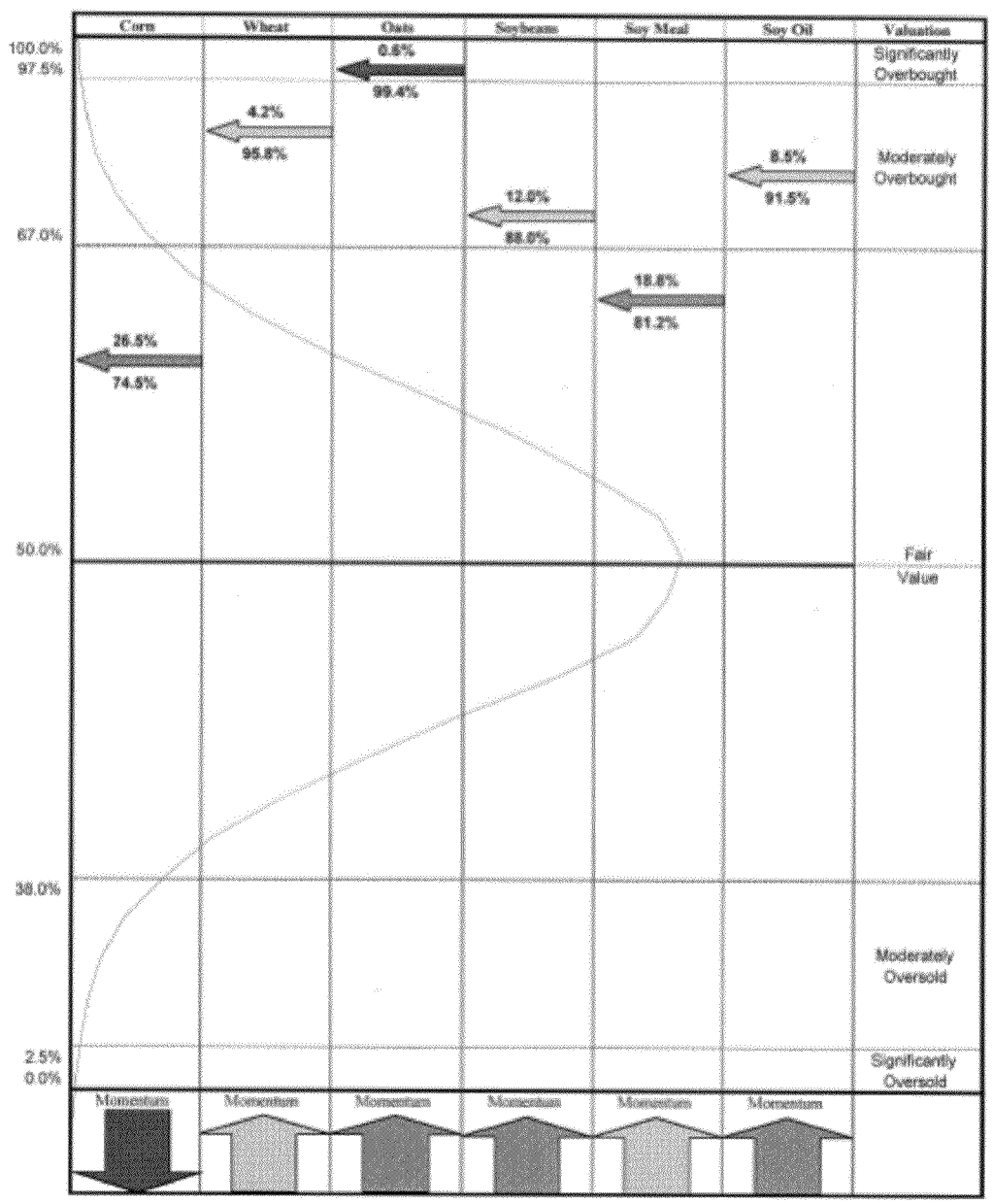
FIG. 42 displays the current valuations of several user defined markets (in this case grains) as defined by Price Action Profile™.

The current valuation of the crude oil market over different time frame is shown in FIG. 42. The arrows display how overbought or oversold the different markets are and show momentum for each daily market. For example, Soybeans trades above the current overbought state 12.0% of the time and below the current overbought state 88% of the time. The fair value section, as defined by plus or minus one standard deviation, is colored green, the moderately overbought and oversold section, as defined by plus or minus one standard deviations to plus or minus two standard deviations, is colored yellow, and the significantly overbought and oversold section, defined as beyond plus or minus two standard deviations, is colored red. The momentum arrows at the bottom of each column indicate increasing upward momentum (up arrow colored green), decreasing upward momentum (up arrow colored yellow), increasing downward momentum (down arrow colored red), and decreasing downward momentum (down arrow colored yellow).

Figure 43:
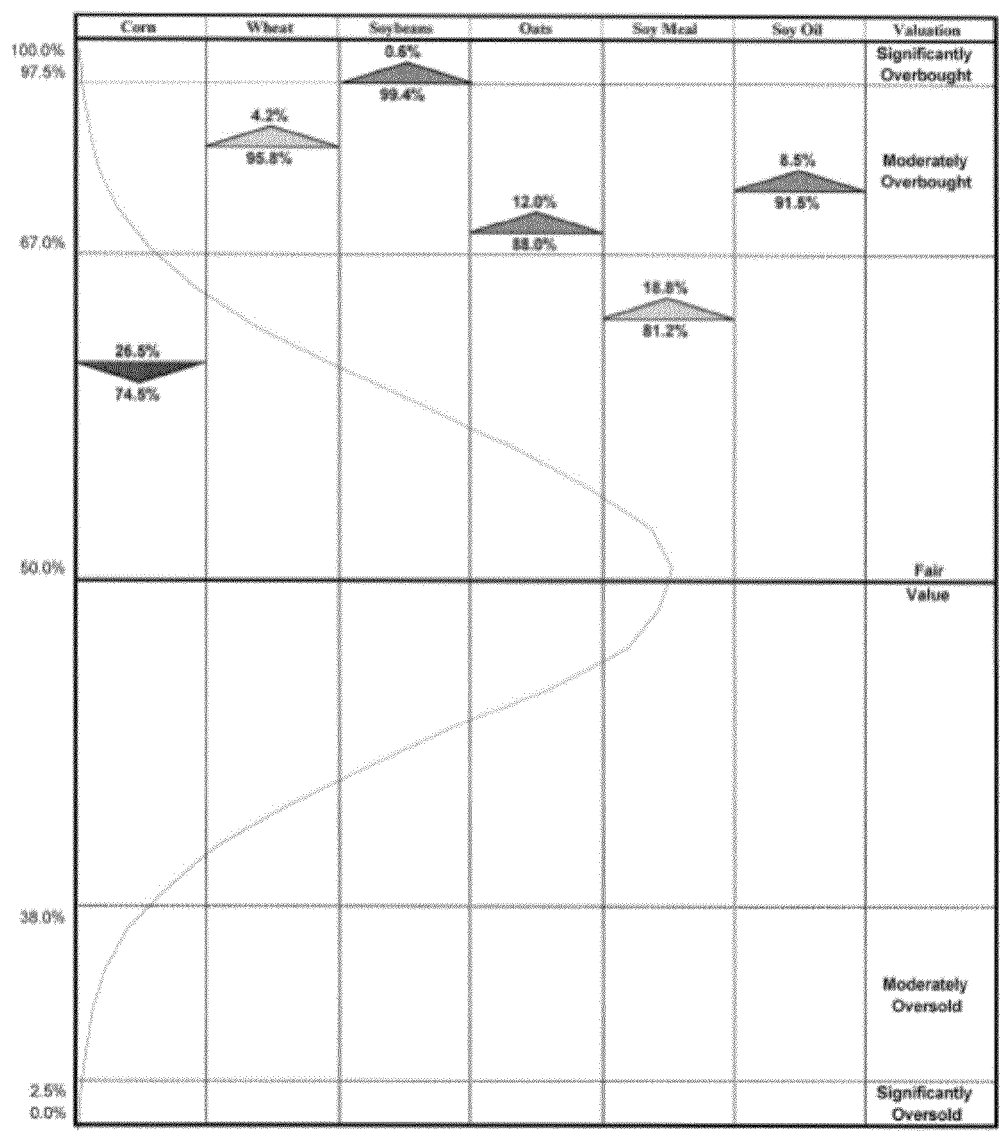
FIG. 43 displays the current valuations of several user defined markets (in this case grains) as defined by Price Action Profile™.

The current valuation of the crude oil market over different time frames is shown in FIG. 43. The arrows display how overbought or oversold the different markets are and show momentum for each daily market. For example, Soybeans trades above the current overbought state 12.0% of the time and below the current overbought state 88% of the time. The fair value section, as defined by plus or minus one standard deviation, is colored light green, the moderately overbought and oversold section, as defined by plus or minus one standard deviations to plus or minus two standard deviations, is colored green, and the significantly overbought and oversold section, defined as beyond plus or minus two standard deviations, is colored dark green. The momentum arrows located in each column represent the valuation of each market with respect to the corresponding Price Action Profile™ and, in addition, indicate increasing upward momentum (up arrow colored green), decreasing upward momentum (up arrow colored yellow), increasing downward momentum (down arrow colored red), and decreasing downward momentum (down arrow colored yellow).

As the potential applications of Price Action Profile™ and Value Charts™ are unlimited, the scope of the invention is contemplated to include all such applications. The potential applications of Value Chart™ and the Price Action Profile™ are almost endless because these charting applications are easily customizable and these charting applications can quantify relative value for any market participant. Furthermore, these powerful charting techniques can relay real-time market information at a glance and therefore do not require the investor to expend much energy in deciphering or interpreting text data or indicator values.

---

Formulas Usable for the Floating Axis and Y-Axis Volatility Intervals

1) Vchart (Function) - This Function returns Value Chart prices.
Inputs: NumBars(Numeric), Price(NumericSeries);
Variables:VarNumBars(0),Var0(0),LRange(0),YDiv(0),RanVar4(0),VOpen(0),VHigh(0),
VLow(0),VClose(0),
  VarA(0),VarB(0),VarC(0),VarD(0),VarE(0),VarP(0),VarR1(0),VarR2(0),VarR3(0),VarR4(0),VarR5 (0);
{Insure NumBars is between 2 and 1000}
If NumBars<2 then VarNumBars = 2;
If Numbars>1000 then VarNumBars = 1000;
If Numbars >= 2 and NumBars <=1000 then VarNumBars = NumBars;
VarP=Round(VarNumBars/5,0);
If VarNumBars >7 then begin
VarA=Highest(H,VarP)-Lowest(L,VarP);
If VarA = 0 and VarP=1 then VarR1=absvalue(C-C[VarP]) Else VarR1 = VarA;
VarB=Highest(H,VarP)[VarP+1]-Lowest(L,VarP)[VarP];
If VarB = 0 and VarP=1 then VarR2=absvalue(C[VarP]-C[VarP*2]) Else VarR2 = VarB;

-continued

Formulas Usable for the Floating Axis and Y-Axis Volatility Intervals

VarC=Highest(H,VarP)[VarP*2]–Lowest(L,VarP)[VarP*2];
If VarC = 0 and VarP=1 then VarR3=absvalue(C[VarP*2]–C[VarP*3]) Else VarR3 = VarC;
VarD=Highest(H,VarP)[VarP*3]–Lowest(L,VarP)[VarP*3];
If VarD = 0 and VarP=1 then VarR4=absvalue(C[VarP*3]–C[VarP*4]) Else VarR4 = VarD;
VarE=Highest(H,VarP)[VarP*4]–Lowest(L,VarP)[VarP*4];
If VarE = 0 and VarP=1 then VarR5 =absvalue(C[VarP*4]–C[VarP*5]) Else VarR5 = VarE;
LRange=((VarR1 +VarR2+VarR3+VarR4+VarR5)/5)*.2;
End;
If VarNumBars <=7 then Begin
If AbsValue(C–C[1]) > (H–L) then Var0=AbsValue(C–C[1]) else var0=(H–L);
If H=L then Var0=absvalue(C–C[ 1]);
LRange=Average(Var0,5)*.2;
End;
If Price = Open then
VChart=((Open–Average((H+L)/2,VarNumBars)))/(LRange);
If Price = High then
VChart=((High–Average((H+L)/2,VarNumBars)))/(LRange);
If Price = Low then
VChart=((Low–Average((H+L)/2,VarNumBars)))/(LRange);
If Price = Close then
VChart=((Close–Average((H+L)/2,VarNumBars)))/(LRange);
2) Value Chart (Indicator) - This Indicator plots Value Chart prices.
Inputs:     NumBars(5);
Variables:  Vopen(0),VHigh(0),VLow(0),VClose(0);
{Calculate Value Chart}
VOpen = VChart(NumBars,Open);
VHigh = VChart(NumBars,High);
VLow = VChart(NumBars,Low);
VClose = VChart(NumBars,Close);
{Plot Value Chart- Disregards the first 20 bars because Omega doesn't process them
correctly}
If BarNumber> Numbars then Begin
    Plot1(VOpen,"Vopen");
    Plot2(VHigh,"Vhigh");
    Plot3(VLow,"VLow");
    Plot4(VClose,"Vclose");
End;
If BarNumber>Numbars then Begin
    Plot1(VOpen,"Vopen");
    Plot2(VHigh,"Vhigh");
    Plot3(VLow,"VLow");
    Plot4(VClose,"Vclose");
End;
3) Price Action Profile (Indicator) - This Indicator plots a Price Action Profile of Value Chart
Prices
Inputs NumBars(5);
Variables:VarNumBars(0),Var1(0),Var2(0),Var3(0),Vopen(0),VHigh(0),VLow(0),Vclose(0);
Arrays:Dist[50](0);
{Calculate Value Chart}
VOpen = VChart(NumBars,Open);
VHigh = VChart(NumBars,High);
VLow = VChart(NumBars,Low);
VClose = VChart(NumBars,Close);
{Calculate Price Action Profile}
For Var1=–25 To 25 Begin
    Var2=Var1 + 25;
If Var1<0 then begin
    If  Vhigh <  (Var1+1)  and VLow >  (Var1) then
Dist[Var2]=Dist[Var2][1]+1;
    If  VHigh >  (Var1+1)       and VLow <  (Var1) then
Dist[Var2]=Dist[Var2] [1]+((1)/(VHigh–Vlow));
    If VHigh < Var1 or VLow> (Var1+1) then Dist[Var2]=Dist[Var2][1];
    If VHigh < (Var1+1) and VHigh > Var1 and VLow < Var1 then
Dist[Var2]=Dist[Var2][ 1] + ((Vhigh–Var1 )/(Vhigh–VLow));
        If VHigh > (Var1+1) and VLow > Var1 and VLow < (Var1+1) then
Dist[Var2]=Dist[Var2][ 1]+ (((Var1 + 1)–VLow/(Vhigh–VLow));
    End;
    If Var1 >0 then begin
        If Vhigh<   (Var1) and  Vlow >   (Var1–1)   then
Dist[Var2]=Dist[Var2][1]+1;
        If Vhigh>   (Var1) and   VLow <   (Var1–1)   then
Dist[Var2]=Dist[Var2][1]+((1)/(VHigh–VLow));
        If VHigh < (Var1–1) or VLow > (Var1) then Dist[Var2]=Dist[Var2][1];
        If VHigh < (Var1) and Vhigh > (Var1–1) and VLow < (Var 1–1) then
Dist[Var2]=Dist[Var2][ 1] + ((Vhigh–(var1 –1))/(Vhigh–VLow));
        If VHigh > (Var1) and VLow > (Var1–1) and VLow < (Var1) then
Dist[Var2]=Dist[Var2][ 1] + (((Var1)–VLow)/(Vhigh–VLow));

| Formulas Usable for the Floating Axis and Y-Axis Volatility Intervals |
| --- |

```
        End;
        If Var1=0 then Dist[Var2]=0;
        End;
Var3=Var3[1]+1;
{Print data to file}
IF LastBarOnChart=true THEN BEGIN
    For Var1=-25 To 25 Begin
        Var2=Var1 + 25;
        If Var1 <> 0 then Dist[Var2]=((Dist[Var2])/Var3);
        If Var1=0 then Dist[Var2]=0;
        If Var1<>0 then begin
        PRINT(FILE("C:\PAP\us5w"),
        Var1: 4:0,",",
        Dist[Var2]: 8: 7);
        End;
    End;
END;
4) VCLevel (Function) – This Function returns Value Chart price levels.
Inputs: NumBars(Numeric),VLeveI(Numeric);
Variables:VarNumBars(0),Var0(0),LRange(0),YDiv(0),RanVar4(0),VOpen(0),VHigh(0),
VLow(0),VClose(0),
       VarA(0),VarB(0),VarC(0),VarD(0),VarE(0),VarP(0),VarR1(0),VarR2(0),VarR3(
0),VarR4(0),VarR5(0);
{Insure NumBars is between 2 and 1000}
If NumBars < 2 then VarNumBars = 2;
If Numbars > 1000 then VarNumBars = 1000;
If Numbars > = 2 and NumBars <=1000 then VarNumBars = NumBars;
VarP=Round(VarNumBars/5,0);
If VarNumBars >7 then begin
VarA=Highest(H,VarP)–Lowest(L,VarP);
If VarA = 0 and VarP=1 then VarR1=absvalue(C–C[VarP]) Else VarR1 = VarA;
VarB=Highest(H,VarP)[VarP+1 ]–Lowest(L,VarP)[VarP];
If VarB = 0 and VarP=1 then VarR2=absvalue(C[VarP]–C[VarP*2]) Else VarR2 = VarB;
VarC=Highest(H,VarP)[VarP*2]–Lowest(L,VarP)[VarP*2];
If VarC = 0 and VarP=1 then VarR3=absvalue(C[VarP*2]–C[VarP*3]) Else VarR3 =
VarC;
VarD=Highest(H,VarP)[VarP*3]–Lowest(L,VarP)[VarP*3];
If VarD = 0 and VarP=1 then VarR4=absvalue(C[VarP*3]–C[VarP*4] ) Else VarR4 =
VarD;
VarE=Highest(H,VarP)[VarP*4]–Lowest(L,VarP)[VarP*4];
If VarE = 0 and VarP=1 then VarR5=absvalue(C[VarP*4]–C[VarP*5]) Else VarR5 =
VarE;
LRange=((VarR1+VarR2+VarR3+VarR4+VarR5)/5)*.2;
End;
    If VarNumBars <=7 then Begin
If AbsValue(C–C[1]) > (H–L) then Var0=AbsValue(C–C[1]) else var0=(H–L);
If H=L then Var0=absvalue(C–C[1]);
LRange=Average(Var0,5)*.2;
End;
VCLevel = Average((H+L)/2,VarNumBars)+((LRange)*VLevel);
5) VCLevel (Indicator) - This Indicator plots Value Price level on the traditional bar chart.
Inputs:RSILeng(20),UpBand(56),LowBand(44),NumBars(5),BuyLevel(–2),SellLevel(2);
Variables:Var1 (–1 ),Var2(0),Var3( 1),Var4(0),Var5(0),Var6(0), Var7(0),Var8(0), Var9(–
1),Var10(1);
If RSI(Close,RSILeng)>UpBand and RSI(Close,RSILeng)[1] < UpBand and Var1=–1
Then Var1=1;
If RSI(Close,RSILeng)<LowBand and RSI(Close,RSILeng)[1] > LowBand and Var1=0
Then Var1=–1;
Var2=VCLevel (Numbars,BuyLevel);
If Var1=1 and Var1[1]=–1 then Var5=C;
If Var1=1 and L <Var2 and H > Var2 then Var6=(Var5–Var2) else Var6=0;
If Var1=1 and H <Var2 then Var6=(Var5–O) else Var6=O;
If Var1=1 and L <Var2 then Var1=0;
If RSI(Close,RSILeng)>UpBand and RSI(Close,RSILeng)[1] < UpBand and Var3=0
Then Var3=1;
If RSI(Close,RSILeng)<LowBand and RSI(Close,RSILeng)[1] > LowBand and Var3=1
Then Var3=– 1;
Var4=VCLevel(Numbars,SellLevel);
If Var3=–1 and Var3[1] = 1 then Var7=C;
If Var3=–1 and L < Var4 and H > Var4 then Var8=(Var4–Var7) else Var8=0;
If Var3=–1 and L > Var4 then Var8=(O–Var7) else Var8=0;
If Var3=–1 and H> Var4 then Var3=0;
Plot1(Var4);
Plot2(Var2);
{ TODO 3 of 3 Replace "Alert Description" with a short description of the alert }
If Condition 1 then
Alert("Alert Description");
```

In the preferred embodiment, the Price Action Profiles™ and Value Charts™ will be displayed on a screen, most likely the screen of a computer workstation. The computer will have a CPU and a communication device that allows it to retrieve the price datum and process and display the datum in the Price Action Profile™ and Value Chart™ formats. The communication device will preferably a CD-ROM drive or disk drive in the computer that allows the computer to access large amounts of historical datum and/or a communication device that allows the computer to access real-time datum broadcasted through a cable, modem, wire or received by a satellite dish or radio antenna. If the computer is accessing the Value Chart™ and Price Action Profile™ concept through the internet, the computer will be attached to a cable or telephone line for the purpose of sending and receiving information, charts, and any other information, alarm, etc. relating to this concept.

The CPU will process the price datum and display the price datum as Price Action Profile™ and Value Charts™. The computer will also allow the user to test trading systems using historical datum and Value Chart™ and Price Action Profile™ quantifiable values to determine how a trading system would have performed hypothetically in the past. VC and PAP quantifiable price levels allow a trading system designed to expand the set of quantifiable price values that can drive trading beyond the traditional open and close of the present day or high and low values of the past. Computer software will allow the user to optimize his or her results by testing a range of VC and PAP values and generating profit and loss results for each incremental set of parameters in that range. The computer will assume its role as a device that uses software and generates an output for each given input. The computer screen will then, when applicable, display the results of the output.

More specifically, the software of the present invention preferably will include the following features and capabilities. An icon will be made to generate the PAP/VC chart screen. This icon will generate a PAP and/or a VC on the screen with preset functions or customizable functions. The PAP and/or VC will be generated from the bar chart (price chart) located in the primary charting position on the screen. Either the VC or PAP can be generated individually without the traditional price chart, if so desired.

Figure 22:
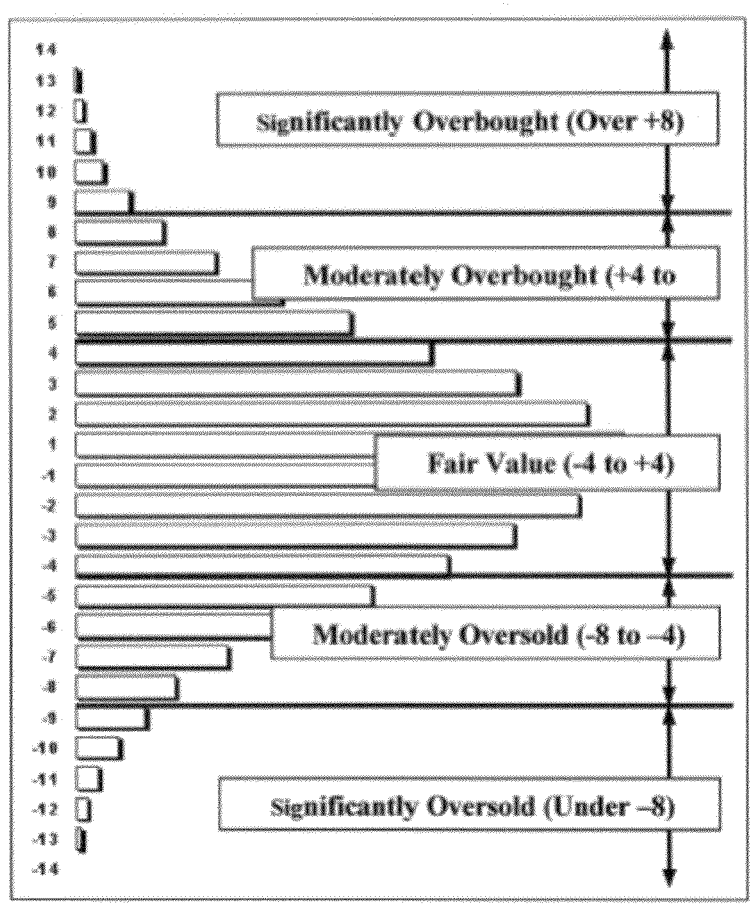
FIG. 22 shows a Price Action Profile™ relative value convention.
Figure 23B:
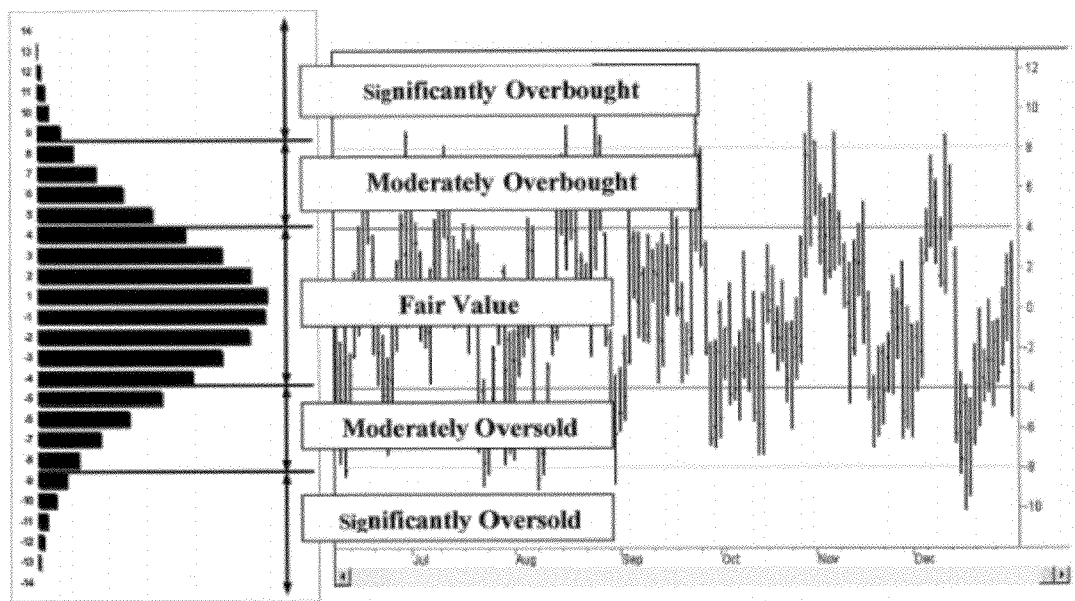
FIG. 23b shows a Valuation convention—Price Action Profile™ & Value Chart™.

1) Options for PAP/VC a) We will assume that the user has generated a bar chart (price chart) of a underlying market. The user can then generate a Value Chart™ and/or a Price Action Profile™ on the same screen. The VC will be preferably positioned below the traditional price chart. The PAP will preferably be embodied in a resizable window and placed anywhere on the screen. The VC can be displayed by itself. The PAP can be displayed by itself. Several VCs representing different timeframes of one market or different markets can be displayed on the same display. Several PAPs representing different timeframes of one market or different markets can be displayed on the same display.

b) The Floating Axis can be either preset or user defined. The Floating Axis can be any function of price.

c) The Dynamic Volatility Units can be either preset or user defined. The DVU can be any function of price but preferably should be a function of market volatility.

d) User either has the option to define relative overbought and oversold conventions or they will be preset (see FIG. 22 and FIG. 23b).

e) User can change the time period of the Value Chart™ to a shorter period and leave the PAP/VC on the designated longer period. For example, user can use a Daily PAP/VC and elect to have 60-minute bars displayed on the daily VC axis.

f) User can select different colors for each DVU sector interval of PAP and VC.

g) User has option to specify data file for PAP to access in order to get more data samples for bell curve. (C:\Genesis\Commodity\Tbonds.dat)

h) User can set an alarm (audio or graphical) that notifies user if market has penetrated designated VC price level or deviation from floating axis.

i) User can use other indicators and market analysis tools in conjunction with VC and PAP concepts.

j) User has option to resize the PAP/VC portion of the screen.

k) If user selects to display multiple VCs on the same screen, the user can elect to have the charts share the same time axis or have independent time axes (so that the short-term charts are not so spread out.)

l) User can elect to have elect to hide/display PAP for each VC. User can display PAP individually.

m) Have a pointer that will show the corresponding Traditional bar corresponding to the Value Chart™ that the user has highlighted (Vertical line through the bar, arrows over/under bar, bar changes color.)

n) Have Overbought/Fair Value/Oversold test box(es) to the right of the VC. The user can engage/disable these markers. User can make these markers turn a certain color of flash when the price is trading in their range.

o) When user expands/compress space between bars the same spacing will be applied to the VC with the same time period bars.

p) Use can color traditional price chart different colors or tag price bars when they trade in designated VC price levels or ranges or meet certain criterion involving VC and or PAP concept. For example, if momentum is decreasing and VC is trading under the −8 VC level, then color VC and traditional and VC price bars red (or any color) and/or tag bars with a dot under them.

q) VC and PAP scales for the DVUs can be preset or user defined.

r) Have option where traditional primary bar chart bars can change to the color of the overbought/fair value/oversold range that the VC is trading in, assuming that the VC valuation sectors have been designated with different colors.

s) Give the users the ability to create conditional profiles. For example, if condition A is met then collect bars for the PAP else do not collect bars for the profile. If the condition A identified a rising market then the PAP could identify a typical bell curve in rising markets and give the user a better idea of realistic entry and exit points.

t) Give user ability to color bars in both VC charts and traditional bar charts and plot them on the same screen or split screens. The user can adjust their scales to view them apart if he wants. The user can elect to format or remove the gridlines on either chart.

u) Give user option to color sectors and axis lines (specifically the zero axis) on the Value Charts™.

v) Give user the option to color the portions of the traditional bar chart the same as the sector colors that each section of each bars lies in on the Value Chart™. This coloring tool would color each single bar different colors as deemed by the corresponding sectors in Value Charts™ that each bar was located in.

w) Users can set alarms that would sound if short-term momentum slowed and the market was overbought/oversold in Value Chart™ by N points. Other custom conditions could be programmed by the user.

x) Users can draw trend lines on the Value Chart™ and real placement of the trend line would be also placed on the regular bar chart. It would be likely that the tend line would appear non-linear on the regular bar chart.

y) Have a small data window option that shows the absolute values for the Floating Axis and the DMU Interval and any VC prices for any date or time period.

aa) Have an icon that allows the user to toggle between his normal profile and a "quick check market strength" profile for N number of bars. If the user wants to know what the market strength for the last 10 days is, he hits the icon and this profile will be plotted along with its characteristics (which will compare the buying and/or selling strength has been for the most recent 10 days compared to that same period historically. The profile could show how much activity is above/below the zero line and what the spread of the profile is compared to historical spreads, etc. The following characteristics could be disclosed:

A) Profile Activity above/below zero line.
B) Standard Deviation.

bb) Create an indicator that tells how much exposure (most/least/average can be displayed in $ or DVU points), in the days following a market entry, an investor would have had in his historical testing if he would have bought the market at the value of −4 on the Value Chart™. This study could create a graph that shows the most, least, and average exposure for each N day period after a defined market entry. Another chart that could be generated could include an average low exposure for long positions and an average high line for short positions (they could be plotted on a traditional bar chart or a VC.) This study can also be done when user defined conditions are met (i.e. price>average(Close,10) and buy at −4 value on VC.).

The above features represent some of the features that the Value Charts and Price Action Profiles concepts may include. The attached figures show potential layouts for the visual displays, but are not inclusive of all of the possible combinations.

Alternatively, the concepts may be implemented in an on-line system or global computer network, or even providing hard copies of the charts and information generated. These are also just examples of how the concepts can be implemented, and any other approach is within the scope of the invention.

What is claimed is:

1. A system for facilitating the making of a trading decision by an investor, said system comprising:
a programmable computer having a central processing unit (CPU);
a communication device linked to said computer for receiving a collection of price data relating to an investment from a data source;
a software program for providing a set of instructions to said computer to receive and process said collection of price data to generate volatility-adjusted relative price data related to the investment and using the volatility-adjusted relative price data to generate an indication of a state of a market for the investment as being traded at a fair value, as overvalued or as undervalued based on the volatility-adjusted price data in relation to a function of price for the investment.

2. The system of claim 1 further comprising a display connected to said computer for showing at least one price chart comprising volatility-adjusted relative price data, the at least one price chart generated by said computer using said software program.

3. The system of claim 2 wherein said volatility-adjusted relative price data is represented on said at least one price chart relative to a floating time axis representing a financial asset price function and another axis representing a price volatility interval function.

4. The system of claim 3 wherein said volatility-adjusted relative price data is further represented on said at least one price chart as a bell curve frequency diagram showing how often an asset price determined by said financial asset price function and said price volatility interval function trades in said different volatility intervals determined by said price volatility interval function.

5. The system of claim 2 wherein said volatility-adjusted relative price data is represented on said at least one price chart as a function of a floating axis which is calculated as a function of price, relative to a calculated dynamic volatility unit, and a frequency diagram is generated from said volatility-adjusted relative price data reflecting the distribution of price data across said volatility intervals.

6. The system of claim 5 wherein said set of instructions provided in said software program includes causing said frequency diagram and said volatility-adjusted relative price data to be shown proximately to one another on said display.

7. The system of claim 5 wherein said set of instructions provided in said software program includes a command to said computer that causes said volatility-adjusted relative price data or said frequency diagram to be shown with a market status indicator, said indicator showing fair value, overbought and oversold market conditions.

8. The system of claim 1 wherein the indication is used by a mathematical trading system to enter or exit an investment on behalf of an investor according to criteria input into the mathematical trading system.

9. The system of claim 1 wherein said communication device allows said computer to access a historical price datum.

10. The system of claim 9 wherein said communication device is a storage device.

11. The system of claim 9 wherein said communication device is a media drive.

12. The system of claim 1 wherein said communication device allows said computer to access real-time price datum.

13. The system of claim 12 wherein said communication device accesses said real-time datum by a means included within a group consisting of a cable, a modem, a wire, a satellite dish, a radio antenna, and wireless communication systems.

14. The system of claim 1 wherein said set of instructions creates floating axis data and dynamic volatility unit data in order to generate said volatility-adjusted relative price data, said floating axis data and said dynamic volatility unit data being a function of historical price data.

15. The system of claim 14 wherein said floating axis data is adjusted based upon changing price data and deviations of price above or below a floating axis over time where the floating axis represents a price function.

16. A method for facilitating the making of a trading decision by an investor, said method comprising:
receiving a collection of price data relating to an investment from a data source in a processor; processing said collection of price data to generate volatility-adjusted relative price data related to the investment and using the volatility-adjusted relative price data to generate an indication of a state of a market for the investment as being traded at a fair value, undervalued or overvalued conditions based on the volatility-adjusted relative price data in relation to a function of price for the investment.

17. The method of claim 16, wherein the generated indication of a state of a market for the investment includes determining a trading frequency for said volatility-adjusted relative price data within predetermined volatility intervals and by determining a percentage for said trading frequency within each volatility interval and generating an indication of said percentage associated with said trading frequency as a relative frequency distribution.

18. The method of claim 17, wherein a plurality of relative frequency distributions are generated from the group consisting of a plurality of different time frames, a single market, different markets or combinations thereof.

19. The method of claim 16, wherein a plurality of indications are generated for volatility-adjusted relative price data in a plurality of time frames.

20. The method of claim 16, wherein the generated indication is used by trading system to enter or exit an investment on behalf of an investor according to criteria input into the trading system.

* * * * *